(12) United States Patent
Frigerio

(10) Patent No.: US 8,369,579 B2
(45) Date of Patent: Feb. 5, 2013

(54) METHODS AND APPARATUS FOR 3D SURFACE IMAGING USING ACTIVE WAVE-FRONT SAMPLING

(75) Inventor: Federico Frigerio, Chestnut Hill, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 1371 days.

(21) Appl. No.: 12/004,316

(22) Filed: Dec. 20, 2007

(65) Prior Publication Data
US 2008/0212838 A1    Sep. 4, 2008

Related U.S. Application Data

(60) Provisional application No. 60/876,490, filed on Dec. 21, 2006.

(51) Int. Cl.
*G06K 9/00*   (2006.01)
*G06K 9/46*   (2006.01)
*G06K 9/66*   (2006.01)

(52) U.S. Cl. .............. 382/107; 382/103; 382/190

(58) Field of Classification Search ............... None
See application file for complete search history.

(56) References Cited

U.S. PATENT DOCUMENTS 5,850,485 A       12/1998  Hart
2004/0155975 A1*  8/2004   Hart et al. .......... 348/335

OTHER PUBLICATIONS

Hart et al., "High resolution, ultra fast 3-D imaging", Proc. SPIE, vol. 3958, 2000, p. 2-10.*
Freeman et al., "Statistics of subpixel registration algorithms based on spatiotemporal gradient or block matching", Opt. Eng., vol. 37(4), 1998, p. 1290-1298.*
Hsueh et al., "Real-time 3D topography by speckle image correlation", SPIE Conf on Input/Output and Imaging Technologies, vol. 3422, 1998, p. 108-112.*
C. Q. Davis C. et al., "Statistics of subpixel registration algorithms based on spatiotemporal gradients or block matching," *Optical Engineering, Soc. of Photo-Optical Instrumentation Engineers*, vol. 37, No. 4, 1998, pp. 1290-1298.
R. T. Derryberry et al., "Search-based subpixel tracking," *IEEE International Symposium on Circuits and Systems (ISCAS)*, 1996, pp. S38-S40.
F. Frigerio, "3-dimensional surface imaging using active wavefront sampling," *MIT*, 2006, 130 pgs., www.dispace.mit.edu/handle/1721. 1/38258.
J. Rohaly et al., "High resolution ultrafast 3-D imaging," *Proc. SPIE*, vol. 3958, 2, 2000, pp. 2-10, www.spiedl.aiop.org/getabs/servlet/GetabsServlet?prog=normal &id=PSISDG003958000001000002000001&idtype=cvips &gifs=yes>.

*Primary Examiner* — Tom Y Lu
*Assistant Examiner* — Thomas Conway
(74) *Attorney, Agent, or Firm* — Wolf, Greenfield & Sacks, P.C.

(57) ABSTRACT

According to one aspect, a method of determining motion of at least one feature present in a plurality of images, the plurality of images captured by a single camera of a scene, each of the plurality of images resulting from light passing through an aperture positioned at a different location for each of the plurality of images is provided. The method comprises determining the motion, in integer pixel units using a first tracking algorithm, of the at least one feature between a first image of the plurality of images and a second image of the plurality of images to obtain an integer pixel measurement of the motion, offsetting the first image and the second image according to the integer pixel measurement, determining the motion, in sub-pixel units using a second tracking algorithm, between the at least one feature in the offset first image and the second image to obtain a sub-pixel measurement, and combining the integer pixel measurement and the sub-pixel measurement to form an estimate of the motion of the at least one feature.

20 Claims, 64 Drawing Sheets

0 PIXEL          1024 PIXEL

METHODS AND APPARATUS FOR 3D SURFACE IMAGING USING ACTIVE WAVE-FRONT SAMPLING

RELATED APPLICATION

This application claims priority under 35 U.S.C. §119(e) to U.S. Provisional Application Ser. No. 60/876,490, entitled "3-DIMENSIONAL SURFACE IMAGING USING ACTIVE WAVEFRONT SAMPLING," filed on Dec. 21, 2006, which is herein incorporated by reference in its entirety.

FIELD OF THE INVENTION

The present invention relates methods and apparatus for computing depth information from multiple images of scene.

BACKGROUND OF THE INVENTION

For the past 150 years or so, one of the most efficient means to convey information about the world we live in has been through the use of two dimensional images. These images have been recorded and displayed using chemical or more recently with electronic techniques, and have been very effective at capturing and conveying the light intensity, color, and x and y coordinates of targets within a scene. Since these images record the two dimensional projection of a 3D world onto an imaging plane, all quantitative depth information is lost. Only subtle cues such as shading and the mind's a priori knowledge of the scene allow the human observer to qualitatively extract depth cues from these two dimensional projections. Clearly, even these qualitative depth cues can fail the observer in situations where the target is completely unknown, or if depth ambiguities in the 2D projection exist which can easily fool the human observer.

Because of the inherent limitations of 2D technology, making the transition from 2D to 3D image capture and display is extremely desirable. In terms of 3D capture, any endeavor requiring the quantitative measurement of a target's dimensions would benefit from a sensor system that could also measure depth. Some obvious applications include quality control of parts on an assembly line, facial recognition for security, autonomous vehicle navigation, measurement and registration of tissues during medical procedures, and 3D model capture for the movie and entertainment industries. Indeed, it is difficult to imagine any imaging application where the added capability to measure a target's depth along with its color, intensity, and its x and y position would not be welcome.

In terms of transitioning to 3D display technologies, only the latter can take advantage of the human user's "built in" stereoscopic vision system to further enhance the sensation of depth. Just as the use of fully rendered and shaded 2D projection graphics was a huge improvement over the previous use of point clouds, wireframe drawings or flat color projections, the jump to full fledged 3D display represents a huge improvement in how the user can perceive and manipulate target information. Indeed, the final addition of the stereoscopic depth cue should allow for the creation of near perfect virtual optical input; so perfect that the user has difficulty in differentiating between a real scene and its recorded version.

In order to overcome the inherent limitations of standard 2D imaging techniques, research into technologies that can capture and display the full three dimensional information in a scene has been very active. A survey of current technology suggests that image recording and display technology is in a transition stage from two dimensional to three dimensional techniques. In the case of 3D recording techniques, one of the oldest approaches to capturing depth information has been through the use of a pair of 2D recording devices whose relative orientation is known. Much like the optical system of predator animals in nature, this depth from stereo approach is a triangulation technique that relies on the difference or disparity between the recorded position of each target point on the two imaging sensors. For each target feature, the magnitude of this disparity is directly related to that feature's distance from the imaging system. Some of this technique's shortcomings include occlusion (where a target feature is visible to one sensor but not to the other), the need to constantly calibrate the system due to camera alignment difficulties, high cost due to the use of multiple camera/lens systems, and high computational cost due to large target feature disparities between one sensor and the other.

Laser scanning systems represent another approach that utilizes triangulation in order to capture the depth information in a scene. In a typical system, a laser sheet is swept across the target object and the position of the resultant line (which is the laser sheet's projection onto the target surface) is recorded by a camera. Just like in stereo camera systems, the relative position and orientation of the recording camera and the laser projector are known, so that the calculation of the laser line's position uniquely determines the distance from the sensor of target features along that line. Though laser scanners are amongst the most accurate 3D imaging systems available, some of this technique's inherent shortcomings include high cost, size and complexity, and scanning times on the order of seconds or minutes.

Time of flight range scanners, meanwhile, measure the time taken by a pulsed laser beam to bounce off a target and return to its source. These systems are often used in surveying applications as their operating range reaches up to 100 meters. Their positional accuracy is typically about 6 mm at 50 m distances, but their disadvantages include their complexity and expense, as well as prolonged operation time required to scan a full target scene.

Much progress has also been made in the development of devices that can use and display 3D data. For decades, computer graphics libraries have existed that allow the display and manipulation of shaded, photo realistic 2D projections of 3D objects on standard 2D displays. The ability to handle 3D data and display realistic 2D projections of that data has been useful in fields ranging from computer aided design (CAD) to entertainment applications like movies and video games. More recently, devices that seek to give the user an actual sensation of the target's depth (as opposed to just displaying the 2D projection of a 3D object) have become more common in the marketplace. For example, wearable display glasses that transmit the left and right stereoscopic views to the user's corresponding eyes have been in use for some time and are quite good at creating a virtual reality effect. Computer screens with modified LCD screens are also appearing in the marketplace with some success. These create the impression of depth by having part of the LCD screen project the left image so that it is only visible to the user's left eye, and by having the other part of the LCD screen project the right image so that it is only visible to the user's right eye. Holography based technologies are also being developed that allow multiple users to achieve the same depth sensations from differing vantage points. A similar effect can also be obtained by projecting different 2D views of the 3D data on a rapidly rotating screen.

Technologies to manipulate and display 3D datasets (either in full 3D fashion or simply through 2D display of photorealistic projections) are more widely diffused than 3D recording devices. This gap between 3D input and output technologies will need to be filled by improvements in current measurement devices, as well as by the development of entirely new approaches to the problem. One such approach may well be 3D surface imaging using active wavefront sampling.

SUMMARY OF THE INVENTION

Some embodiments include a method of determining motion of at least one feature present in a plurality of images, the plurality of images captured by a single camera of a scene, each of the plurality of images resulting from light passing through an aperture positioned at a different location for each of the plurality of images, the method comprising determining the motion, in integer pixel units using a first tracking algorithm, of the at least one feature between a first image of the plurality of images and a second image of the plurality of images to obtain an integer pixel measurement of the motion, offsetting the first image and the second image according to the integer pixel measurement, determining the motion, in sub-pixel units using a second tracking algorithm, between the at least one feature in the offset first image and the second image to obtain a sub-pixel measurement, and combining the integer pixel measurement and the sub-pixel measurement to form an estimate of the motion of the at least one feature.

Some embodiments include a method of determining motion of at least one feature present in N images, the N images captured by a single camera of a scene, each of the N images resulting from light passing through an aperture positioned at a different location for each of the N images, N being a number greater than two, the method comprising selecting an anchor image from the N images, determining the motion of the at least one feature between the anchor image and each of the other N images to obtain a plurality of motion measurements, averaging the plurality of motion measurements to obtain a single motion measurement.

Some embodiments include a method of calibrating a camera to compensate for at least some lens aberration in computations to determine motion of at least one feature present in a plurality of images, the plurality of images captured by the camera of a scene, each of the plurality of images resulting from light passing through an aperture positioned at a different location for each of the plurality of images defining a lens aberration model characterized by a plurality of parameters, obtaining at least one image of a known target with the camera, processing the at least one image to obtain at least some values for the plurality of parameters to obtain an instance of the lens aberration model for the camera, determining the motion of the at least one feature between at least a first image of the plurality of images and a second image of the plurality of images to obtain at least one motion measurement, and modifying the at least one motion measurement according to the instance of the lens aberration model to at least partially compensate for error introduced by lens aberration.

DETAILED DESCRIPTION

The active wavefront sampling (AWS) approach to 3D surface imaging has several attractive attributes. Its most important characteristic is that, unlike stereoscopic systems, it requires only one optical path to capture depth information. This attribute reduces system costs by halving the cost of the optics, and also allows the technique to be applied to a wide range of currently available 2D imaging systems such as cameras, endoscopes, and microscopes. AWS also reduces system cost by dispensing with expensive laser based target illuminators, and minimizes target acquisition time by not having to slowly sweep an illumination sheet across the target. Instead, the AWS approach can calculate a 3D depth map with as little as two image frames (like a stereo system), thereby allowing real time (>30 Hz) operation.

Figures 1, 17:
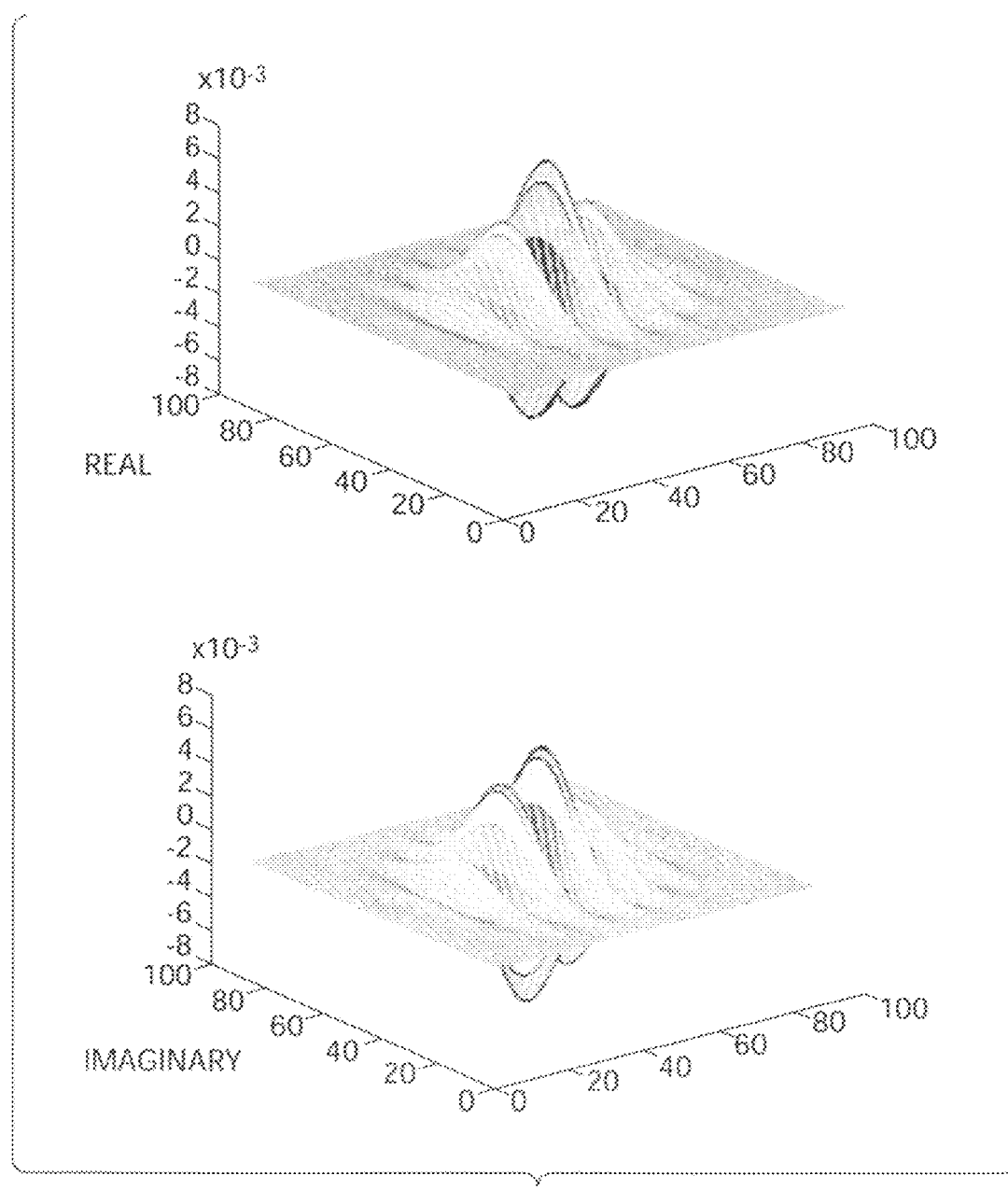
FIG. 17 illustrates two 2D Gabor filters (left and right) with different scales and orientations.
Figures 2, 17:
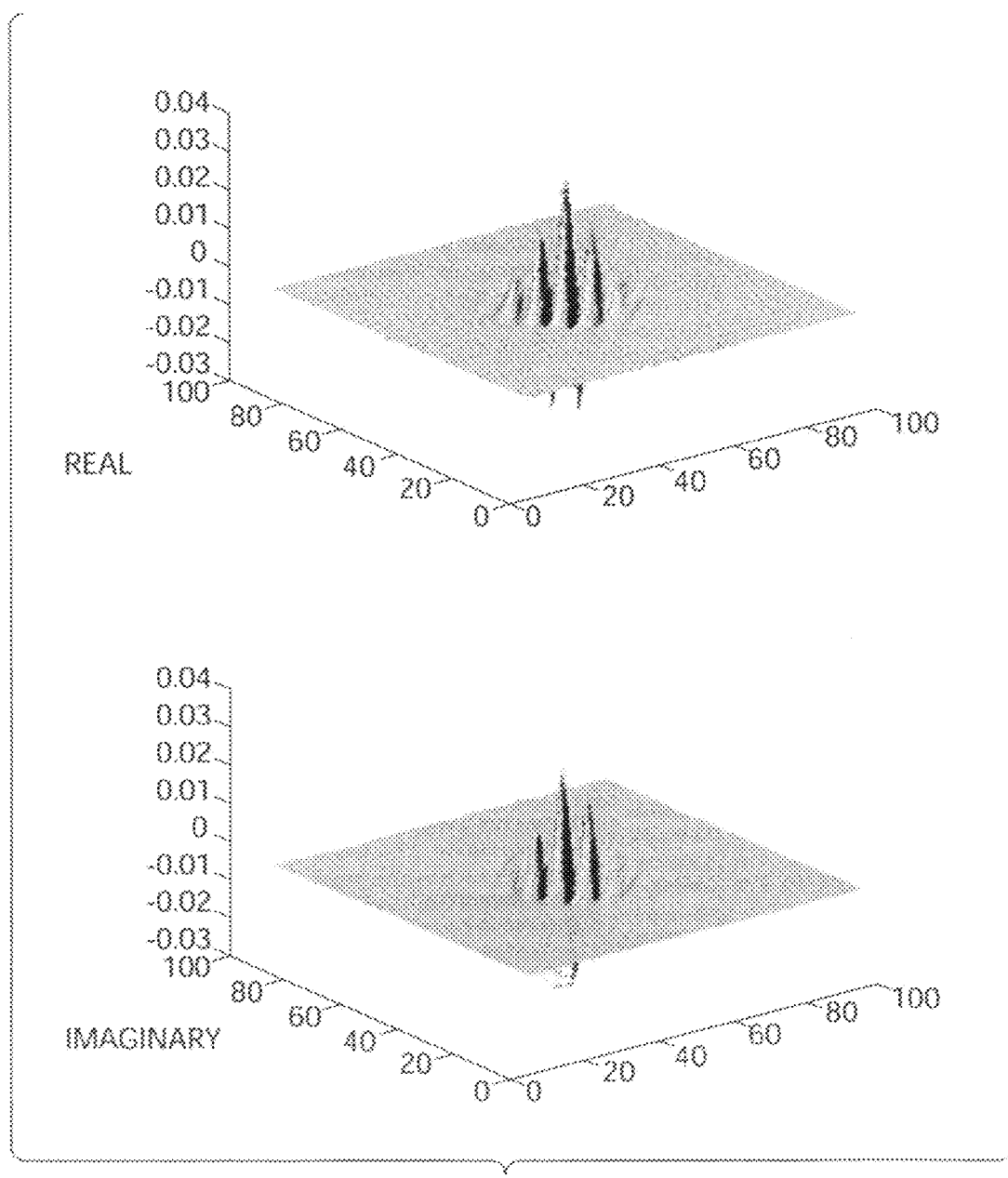

In order to understand the fundamental principle behind the use of AWS to calculate depth, one must first analyze how a target feature's depth is encoded by the diameter of its defocus blur on the sensor plane. This principle is well known and is the basis for an entire range of 3D surface imaging techniques known as depth-from-defocus. As can be seen in Figure 1.5, the diameter of a target feature's defocus blur is directly related to that feature's distance from the optical system's in-focus plane. If the feature is situated on the in-focus plane, the target is in perfect focus and the defocus blur diameter is zero (neglecting diffraction effects). As the target feature moves away from the in-focus plane, however, the diameter of the defocus blur increases. A straightforward geometrical optics analysis of the system reveals that the image plane blur diameter can be calculated using the following expression:

$$\frac{d}{D} = 1 - \frac{\left(\frac{1}{f} - \frac{1}{Z_t}\right)}{\left(\frac{1}{f} - \frac{1}{Z_{fp}}\right)} \quad (1.1)$$

In equation 1.1, d is the disparity at the image plane in pixels, D is the diameter of the lens exit pupil, f is the focal length of the lens, $Z_t$ is the distance of the target to the lens, and $Z_{fp}$ is the distance of the in-focus plane to the lens' principle plane. Remembering that the denominator in Equation 1.1 is nothing but the distance of the lens' principle plane to the imaging sensor, $Z_{CCD}$, the expression can be rewritten as follows:

$$\frac{d}{D} = Z_{CCD} \times \left(\frac{1}{Z_t} - \frac{1}{Z_{fp}}\right) \quad (1.2)$$

Figure 1A:
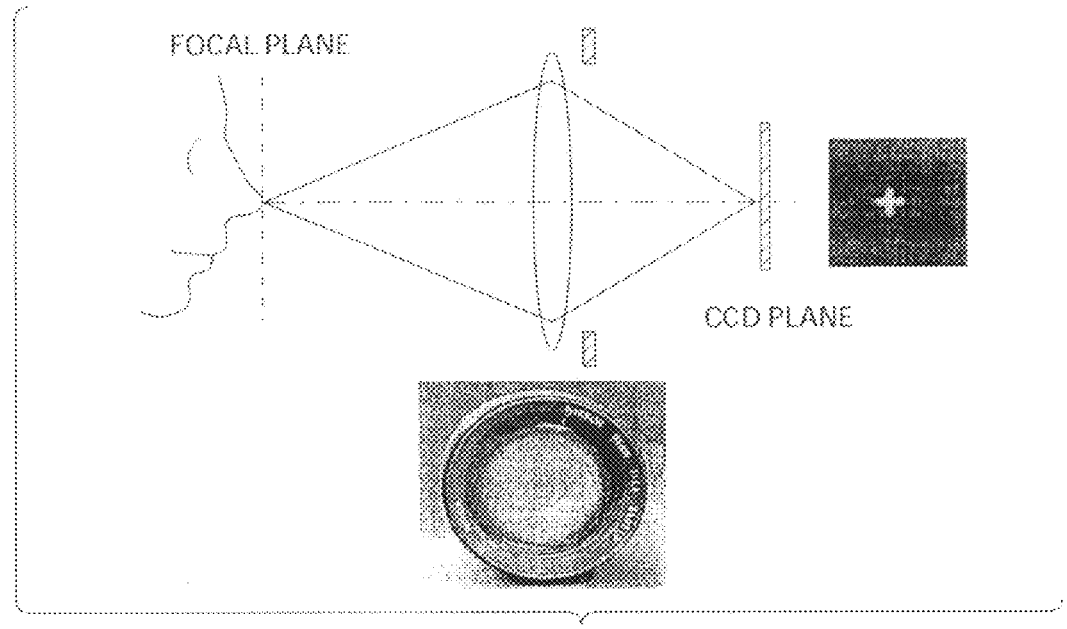
FIG. 1A is a schematic of depth-from-defocus wherein the target feature of interest is located on the lens in-focus plane.
Figure 1B:
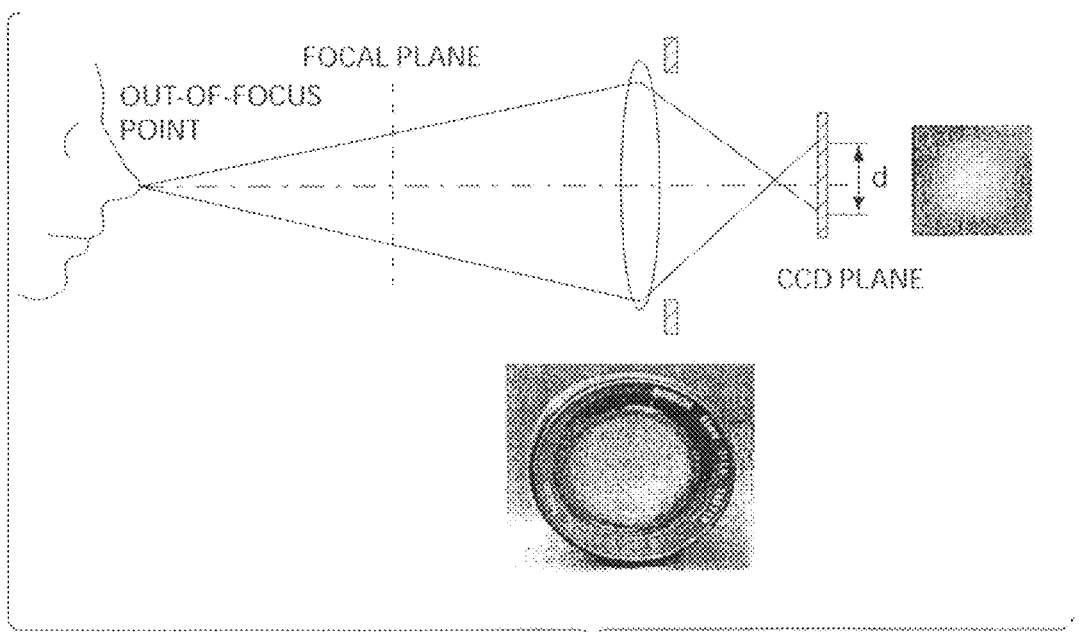
FIG. 1B is a schematic of depth-from-defocus wherein the target feature of interest is located some distance from the lens in-focus plane.
Figure 2:
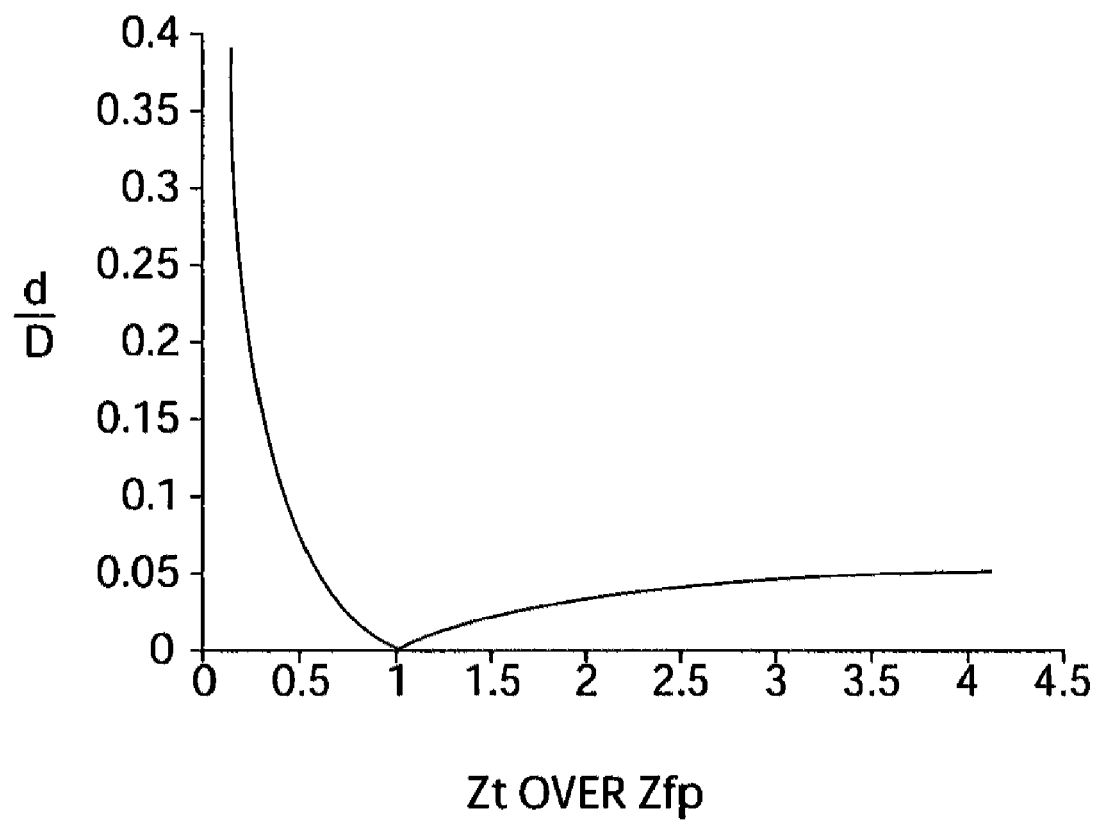
FIG. 2 illustrates a plot of normalized blur spot diameter vs. normalized target distance to the principal plane, wherein "d" is the blur spot diameter, "D" is the diameter of the lens exit pupil, "Zt" is the target distance to the principal plane, and "Zfp" is the distance of the focal plane to the principal plane.

When this expression is evaluated over a range of normalized target depths, the plot in FIG. 2 is obtained. As expected, this plot shows that the blur diameter drops to zero when the target is located on the in-focus plane and that the blur diameter rises as the target moves away from the in-focus plane. It should be noticed that the sensitivity or accuracy of this method is directly proportional to the slope of the line in FIG. 2, since a larger slope implies a greater disparity change on the image plane (which is what is being measured) for a given change in target depth (which is what is being calculated). In a typical depth-from-defocus system, the optical train's entire wavefront is allowed to travel through and hit the imaging plane. The challenge is then to calculate the diameter of each target feature's blur spot in order to determine its depth. The difficulty of accurately calculating the blur spot diameter and complications related to having overlapping blur spots from feature rich targets have traditionally limited the utility of depth-from-defocus techniques.

Figure 3:
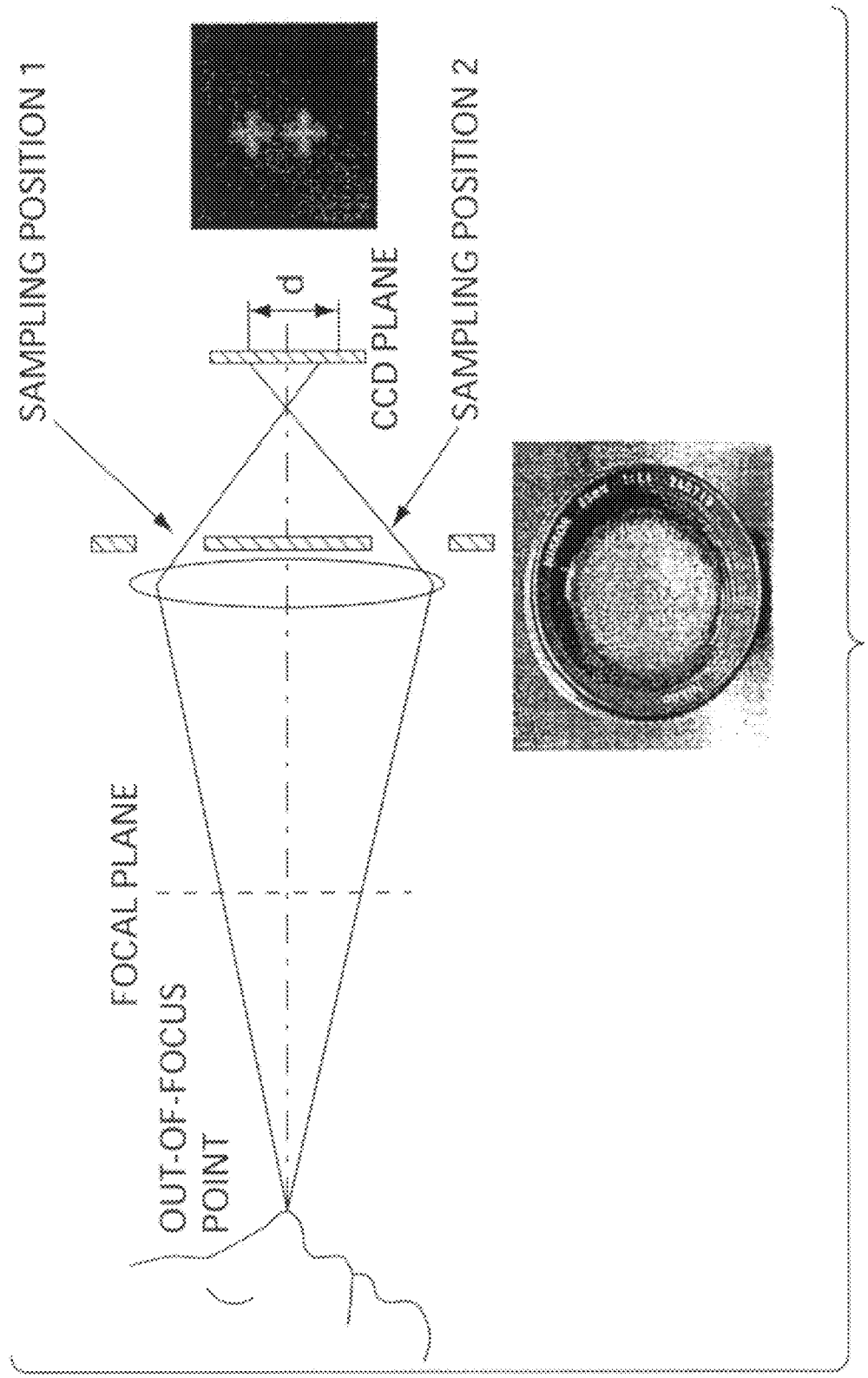
FIG. 3 illustrates static sampling of the wavefront with two diametrically opposed apertures separated by a distance equal to the overall aperture diameter, resulting in two quasi-focused images separated by the same distance d recorded on the image plane.

Certain limitations in standard depth-from-defocus techniques can be overcome by switching to a wavefront sampling approach. Unlike depth-from-defocus systems, the wavefront sampling approach only allows specific parts of the optical train's wavefront to reach the imaging plane. The simplest sampling pattern that allows the calculation of a target feature's depth is a sampling plane with two apertures, as shown in FIG. 3. This static wavefront sampling results in the formation of two quasi-in-focus images of the target feature. If the two static apertures are separated by a distance equal in magnitude to the full exit pupil diameter of the depth-from-defocus case shown in FIG. 2, then the separation between the two quasi-in-focus images resulting from the static wavefront sampling will be exactly equal to the blur spot diameter resulting from the depth-from-defocus approach (for the same optical train and target position conditions). In effect, one can think of wavefront sampling in terms of sampling the defocus blur. With a two aperture static wavefront sampling mask, the separation between the two images of the same target feature needs to be calculated in order to determine that feature's depth (determined by equation 1.1).

There exist several motion tracking algorithms available, ranging from block matching methods (autocorrelation, etc. . . . , optical flow techniques, and Fourier domain algorithms that can be used to determine this separation distance to within a small fraction of a pixel. However, the fact that multiple images of the same feature are recorded on each frame can still cause overlap problems when the target is feature rich and can also result in a depth ambiguity. Indeed, looking once again at FIG. 2 shows that for a given disparity measurement, there are two possible target positions. One possible target position is located between the lens and the in-focus plane, and the other possible target position is located beyond the in-focus plane. Without any a priori knowledge of the target's position, it is impossible to tell from a double exposed image resulting from a static mask which of these two possible target positions is correct.

Figure 4:
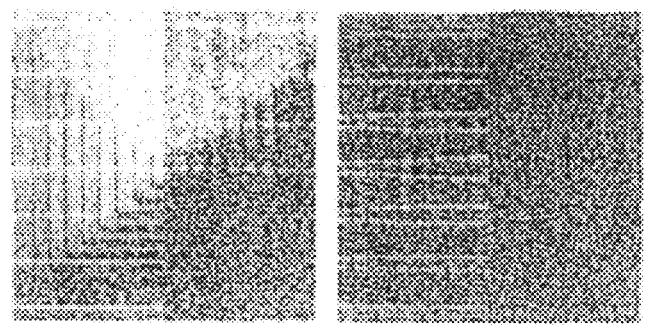
FIG. 4 illustrates a schematic of a typical image obtained from BIRIS range finding system.
Figure 4:
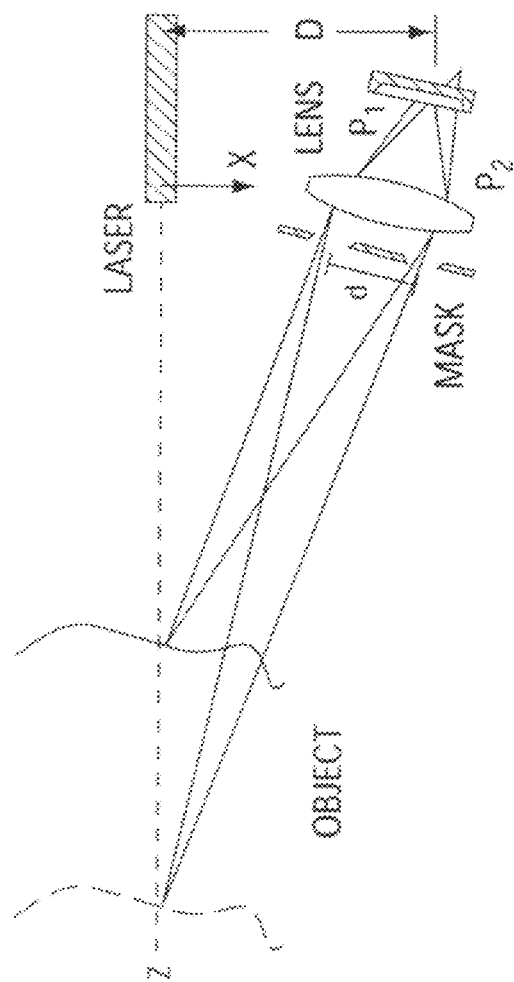

One implementation of a two aperture static sampling system has been carried out by researchers at the National Research Council of Canada. The BIRIS sensor comes in various versions but essentially consists of a camera and lens equipped with a two aperture mask, as well as a laser that projects a sheet onto the target (see FIG. 4). In FIG. 4, a two aperture mask is used to get an initial depth estimate, and triangulation between the laser projector and the camera is then used to obtain a higher accuracy depth estimate, wherein, a square pyramid (top) is illuminated with several laser light stripes and the resulting image with the lines doubled due to the two aperture mask is shown below. The distance between the two lines on the image is proportional to the depth of that part of the target.

Because of the two apertures, the laser line produces two images on the sensor plane and the depth of the target points illuminated by the laser is calculated by measuring the distance between the two image lines. The target depth is then calculated using equation 1.1. Just like with a regular laser scanner, this system needs to gradually scan the laser line across the target in order to obtain the entire depth map. Recent versions of the BIRIS system also takes advantage of triangulation between the camera and the laser projector to get a second estimate of the depth, and the final output is the result of taking a weighted average of the wavefront sampling derived depth and of the triangulation derived depth. Because of this, the BIRIS system can be considered to be a hybrid approach between a laser scanning system and a true wavefront sampling system.

By simple extension, more than two sampling positions can be used to estimate depth. A sampling mask with three or more apertures would result in pictures with a corresponding number of target images. Measurements of the displacement between the various images of each target feature can be used to back calculate the actual depth of that feature. The exact transformation from the image displacement measurement to actual depth will depend on the pattern of the sampling mask, but is generated in a similar fashion as equation 1.1. Clearly, a higher potential depth estimation accuracy is attained with a greater number of sampling positions but at the same time a greater confusion is caused due to multiple image overlap with a feature rich target.

As was shown above, sampling the wavefront of an optical system with several apertures allows one to estimate the depth of a target feature. However, the use of static aperture masks results in a depth ambiguity (one cannot determine whether the target is located in front of or behind the in-focus plane) and can lead to confusion due to overlapping images from feature rich targets. One solution to both problems is to use an active wavefront sampling approach. With this technique, a single aperture is moved from one position to another in the sampling plane and a single image is recorded at each spot. This results in clear single exposure images of the target with no confusion due to multiple image overlap, and the depth ambiguity present with a static mask is resolved so long as the motion of the aperture on the sampling plane is known. If, for example, a single aperture is rotated in a circle centered on the optical axis of the lens and images are taken at regular angular intervals, a movie of the resulting images would show the target also rotating in a circular pattern.

Under these operating conditions, the depth information for each target feature is coded by the diameter of its rotation; a feature located right on the in-focus plane would have a zero diameter rotation (and would appear stationary) while features located at increasing distances from the focal plane would rotate along circles of greater and greater diameter. Furthermore, a target feature located beyond the in-focus plane will rotate 180 degrees out of phase with a target feature located between the lens and the in-focus plane. This phase difference therefore allows the resolution of the depth ambiguity present in depth-from-defocus and static aperture mask systems described earlier.

Of course, a circular pattern of aperture motion is not the only possible path that can be used with AWS. The aperture can be simply translated in a horizontal, vertical, or diagonal line; or the aperture path can be chosen to follow any arbitrary closed loop. As long as the aperture path is known, target depth can in theory be recovered by tracking the resulting motion of each target feature from one image to the next. However, a simple circular aperture motion does have at least two major attractive qualities: the first is that it is relatively simple to implement mechanically, and second is that it presents certain advantages for the processing algorithms used to track target features from one image to the next. These advantages will be discussed in further detail below.

Besides resolving the discussed depth ambiguity and the multiple image overlap problem, the active wavefront sampling approach allows the user to select from a wide range of operating regimes within the high accuracy/low speed—low accuracy/high speed domain. Indeed, for high speed imaging applications where some measurement accuracy can be sacrificed, as little as two wavefront sampling positions can be used to estimate a target feature's diameter of rotation. In this scenario, the displacement between the two images is taken as the estimate of the rotation diameter. For applications where higher accuracy is required but acquisition speed can be sacrificed, more sampling positions can be used. In this multiple sampling position scenario, a circle can be fitted in the least square sense to the image positions, and the accuracy of the depth estimate will rise with the number of sampling positions.

As was discussed above, the idealized optical performance characteristics of the active wavefront sampling (AWS) approach are identical to those of the classic depth-from-defocus approach, as described quantitatively by FIG. 2. Again, this figure shows that as a target feature moves farther away from the in-focus plane, the motion diameter of its image rotation caused by a circular aperture sampling pattern increases. This diameter increases more steeply if the target feature moves toward the lens than away from the lens. Also, it can be seen that if the target feature is moved away from the lens, the diameter asymptotically reaches a constant value. These characteristics suggest that the optimal operating regime for AWS based systems is defined by having the target located between the in-focus plane and the lens, where system sensitivity to depth is highest. This sensitivity can be calculated by taking the derivative of equation 1.2 with respect to target depth, and rearranging slightly:

$$\frac{\partial d}{\partial Z_t} = -D \times Z_{CCD} \times \frac{1}{Z_t^2} \tag{1.3}$$

All other things being equal, the field of view of the optical system decreases as the target is brought closer to the lens. It is therefore instructive to generate a disparity sensitivity expression where the size of the field of view (in pixels, say) is kept constant by changing the distance between the lens and the sensor, $Z_{CCD}$. In practice, this can be achieved by changing the focal length of the lens as the target is moved. By using similar triangles, it can be found that $$Z_{CCD} = S_{Sensor} \frac{Z_t}{S_{FOV}}, \tag{1.4}$$

where $S_{Sensor}$ is the size of the CCD sensor, and $S_{FOV}$ is the size of the field of view (in pixels, say). Inserting equation 1.4 into equation 1.3 results in the following expression:

$$\frac{\partial d}{\partial Z_t} = -D \times \frac{S_{Sensor}}{S_{FOV}} \times \frac{1}{Z_t} \tag{1.5}$$

Figure 5:
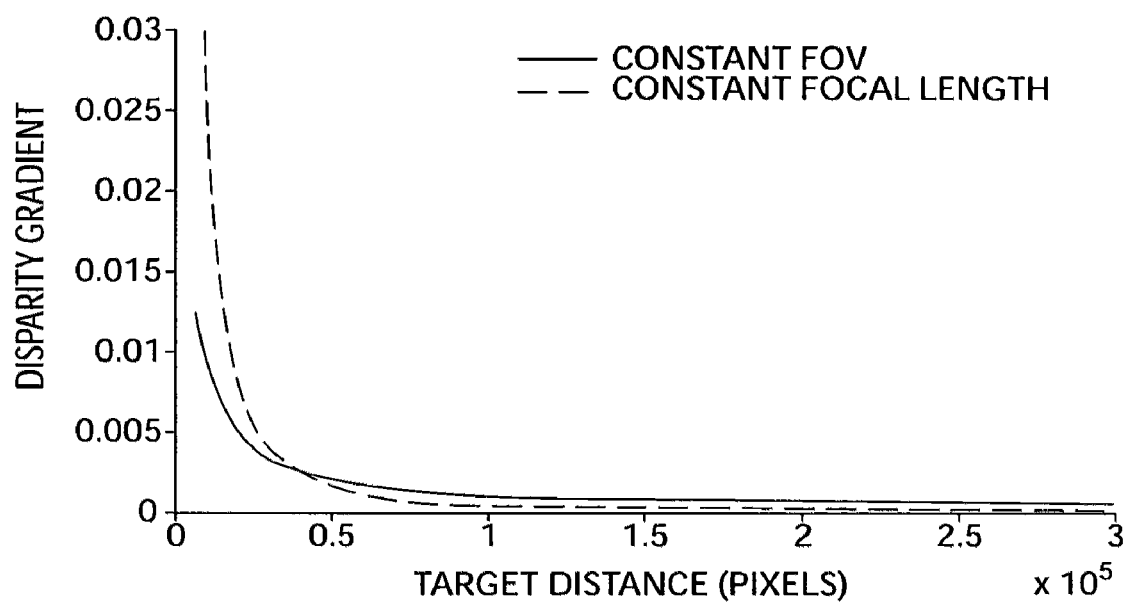
FIG. 5 is a plot showing disparity gradient, $\partial d/\partial Z_t$, as a function of target distance, $Z_t$.

With constant values for $S_{Sensor}$ and $S_{FOV}$, it can be seen that the sensitivity of the AWS system now varies inversely with $Z_t$, as opposed to inversely with $Z_t^2$ in the case where the lens focal length is held constant and the field of view size is allowed to vary. The expressions in equations 1.4 and 1.5 are plotted in FIG. 5, where it can be seen that the sensitivity of an AWS system drops off quickly with depth. Furthermore, it can also be seen from this figure that the depth sensitivity of a constant focal length AWS system drops off more quickly than the sensitivity of a constant field of view AWS system. These simulations assume a sampling diameter, D, of 800 pixels and a sensor size of 1024 pixels. For the constant field of view (FOV) size simulation, a constant FOV size of 8333 pixels is used. For the constant focal length simulation, a constant lens to sensor distance of 4166 pixels is used.

Figure 6:
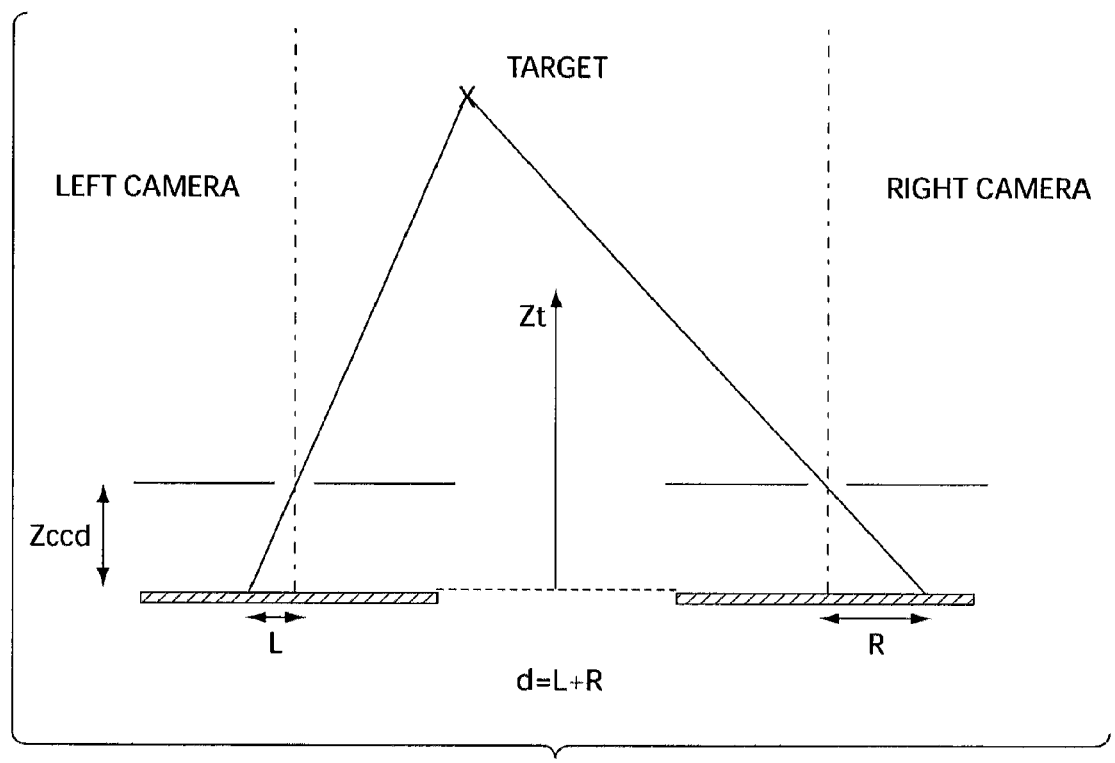
FIG. 6 illustrates a schematic of a canonical stereo imaging system composed by a left and right camera.

It is instructive to compare the performance of an AWS system to a standard depth-from-stereo imaging system A canonical stereoscopic system has two cameras whose sensors are perfectly aligned (ie: they have parallel optical axes and aligned x axes), as can be seen in FIG. 6. This schematic shows that a target feature produces an image at a different location on each image sensor. The distance from the optical axis of the target image on the left and right cameras is denoted by "L" and "R" respectively. The total disparity d is just the sum of these two distances.

The disparity between these images, d, is clearly related to the distance of the target to the cameras in the z direction. Indeed, a simple geometrical analysis reveals that the disparity between the two images is given by the following equation:

$$\frac{d}{b} = Z_{CCD} \times \frac{1}{Z_t} \qquad (1.6)$$

Figure 7:
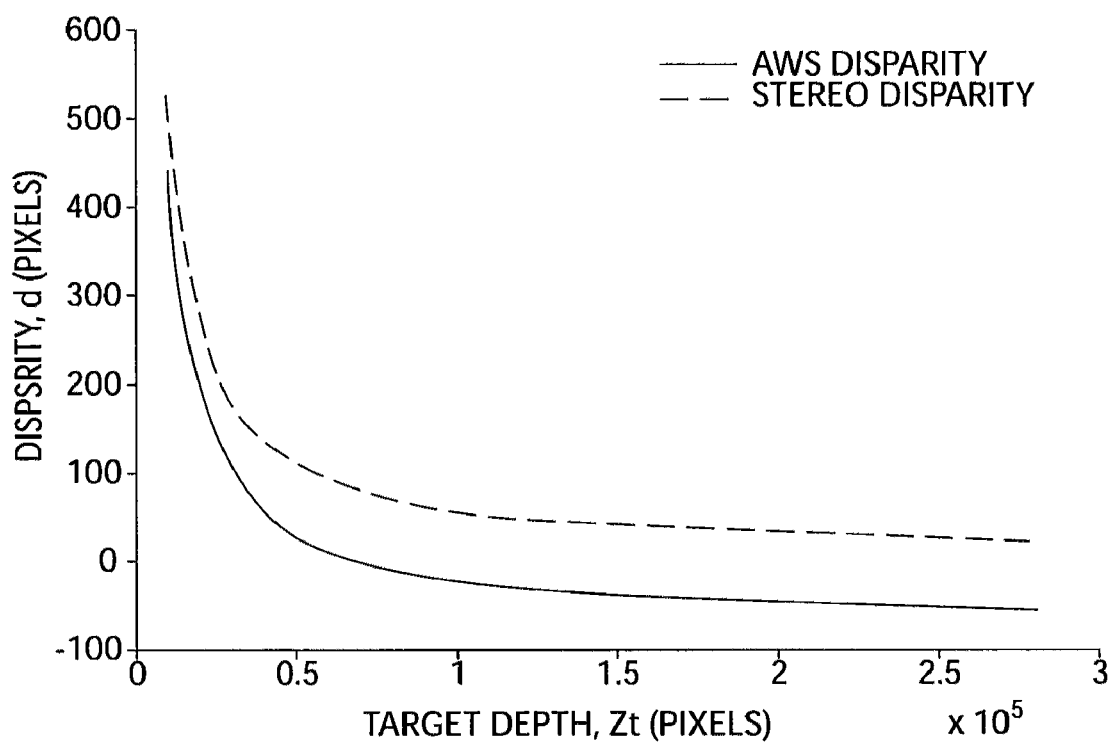
FIG. 7 illustrates a plot of disparity as a function of target depth (both in pixels) for an AWS system and for a canonical stereo system.

In this equation, $Z_{CCD}$ is the distance from the lens' principal plane to the imaging sensor, b is the baseline distance between the optical axes of each camera, and $Z_t$ is the distance of the target feature to the lens' principal plane. Comparing this expression to Equation 1.2, we can see that they only differ by a constant term involving the distance of the in-focus plane to the camera lens. This fact can be seen in FIG. 7, which shows the disparity between two images of a target feature for both the nominal stereo imaging system as well as the AWS imaging system. Using the same values baseline/sampling diameter and lens-to-sensor distance, it can be seen that the two curves are identical but displaced by a constant amount. This constant is introduced by the 1/Zfp term in equation 1.2.

Just like in the AWS case, the sensitivity to depth of the canonical stereo system can be estimated by taking the derivative of equation 1.6 with respect to target distance. The following equation is the result of this operation:

$$\frac{\partial d}{\partial Z_t} = -b \times Z_{CCD} \times \frac{1}{Z_t^2} \qquad (1.7)$$

Comparing the above expression to equation 1.3, we see that the sensitivity to depth of a canonical stereo system and of an AWS system is exactly the same. It can therefore be concluded that an AWS system with two diametrically opposed sampling positions responds exactly like a stereo system whose baseline is equal to the AWS sampling diameter. Therefore, the only physical system parameters that can be varied to increase depth sensitivity are the sampling diameter (equivalent to the baseline in a stereo system) and the distance of the principal plane of the lens to the imaging sensor ($Z_{CCD}$). Depth sensitivity increases with sampling diameter, but the latter is limited by the lens' exit pupil size; the bigger the lens, the larger the maximum sampling diameter. Depth sensitivity also increases with $Z_{CCD}$, but the field of view with a given lens also decreases as $Z_{CCD}$ is increased. Compromises must therefore be made in increasing lens size (and therefore increasing cost), and increasing $Z_{CCD}$ length (and decreasing the field of view).

A typical commercial stereo system might be composed of two lenses and cameras separated by a baseline on the order of 20 cm, while an AWS system made with an identical lens and camera might only have a sampling diameter of 1 cm. All other things being equal, therefore, an AWS system using only two sampling positions would only have $\frac{1}{20}^{th}$ the depth sensitivity of the stereo system. This difference in performance would at first seem to rule out the use of AWS in favor of a standard stereo system, but the comparison requires further examination.

First of all, it must be remembered that the larger baseline present in stereo systems comes at the cost of greater occlusion (which is when a target feature is visible in one camera but not in the other), higher hardware cost, greater difficulty with calibration, and higher computational cost (since the matching problem needs to be solved over a larger disparity range). Additionally, there exist operating conditions where a large baseline is undesirable or completely impossible, such as with endoscopes used during surgical procedures; the diameter of the optical instrument in this case needs to be as small as possible in order to minimize trauma to the patient. Finally, though it is certainly true that a stereo system may be on the order of 20 times more sensitive to depth than a similarly built AWS system that uses two sampling positions, this performance differential can be significantly reduced by increasing the number of sampling positions used by the AWS system.

Indeed, it will be shown below that the use of more than two sampling positions increases both the accuracy and the robustness of the algorithms that track target features from one image to another. The higher accuracy of these multi-sampling tracking algorithms results in a smaller uncertainty in the measurement of the target feature's rotation diameter. The better rotation diameter estimate therefore compensates for the shallower sensitivity curve caused by the smaller baseline present in AWS.

There are many possible ways to implement an AWS system, each with different hardware components and performance flexibility. The aperture sampling can be performed mechanically or electronically, and there are many different aperture sampling paths that can be used. Whether the sampling is implemented mechanically or electronically, the size of the aperture and the placement of the sampling plane itself should be optimized so as to maximize captured image quality. The target illumination method must also be considered as it can have a strong influence on image quality. These design parameters will now be discussed, and the simple mechanical setup used to obtain the results presented and described in further detail below.

The size of the sampling aperture can have a strong effect on image quality. A larger aperture will be able to image higher frequency features due to its higher numerical aperture (NA), but it will also have a smaller depth of field which will reduce the depth range over which 3D surface imaging is possible to a narrower band surrounding the in-focus plane (see FIG. 8A). A larger aperture will also allow for shorter image exposure times, thereby increasing the possible frame rate of the imaging system. Conversely, a smaller aperture size will increase the operable depth band (allowing increased depth sensitivities) but will low pass filter the image due to the smaller NA (see FIG. 8B). The smaller aperture size will also require an increased exposure time, reducing the maximum frame rate of the system.

The aperture size representing the best tradeoff between depth range, spatial frequency sensitivity and frame rate will depend very much on the particular application at hand. However, image processing algorithms used to track target features from one image to the next work best with low spatial frequency images, so that using a smaller aperture does not necessarily hinder the quality of the calculated 3D surface model.

Figure 8A:
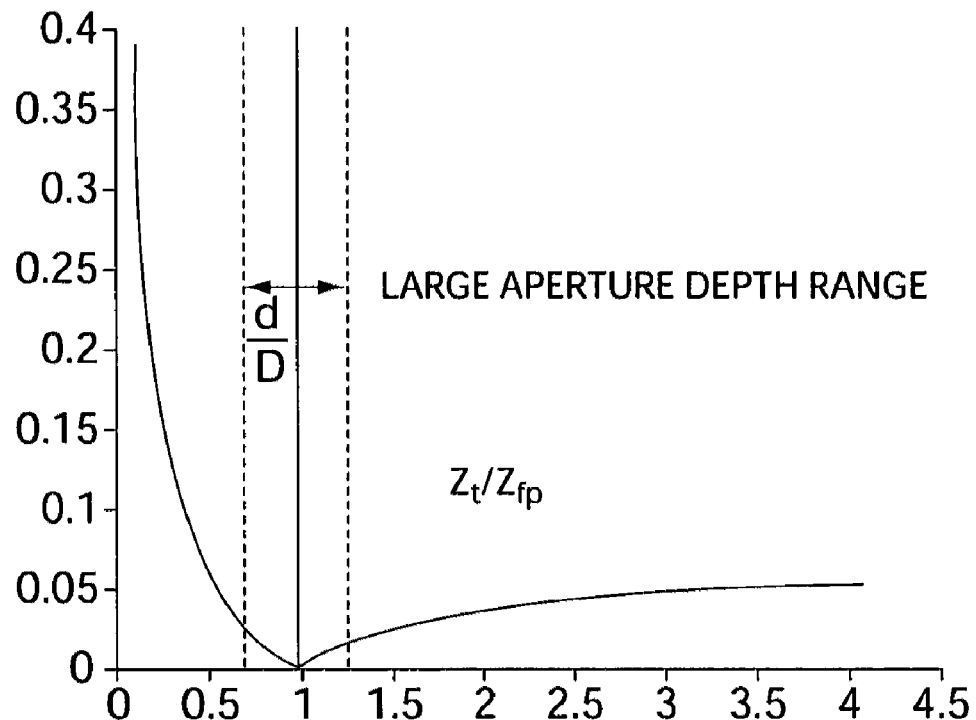
FIG. 8A illustrates a practical target depth range over which the AWS sampled image is in-focus enough to allow processing, for a large aperture size.
Figure 8B:
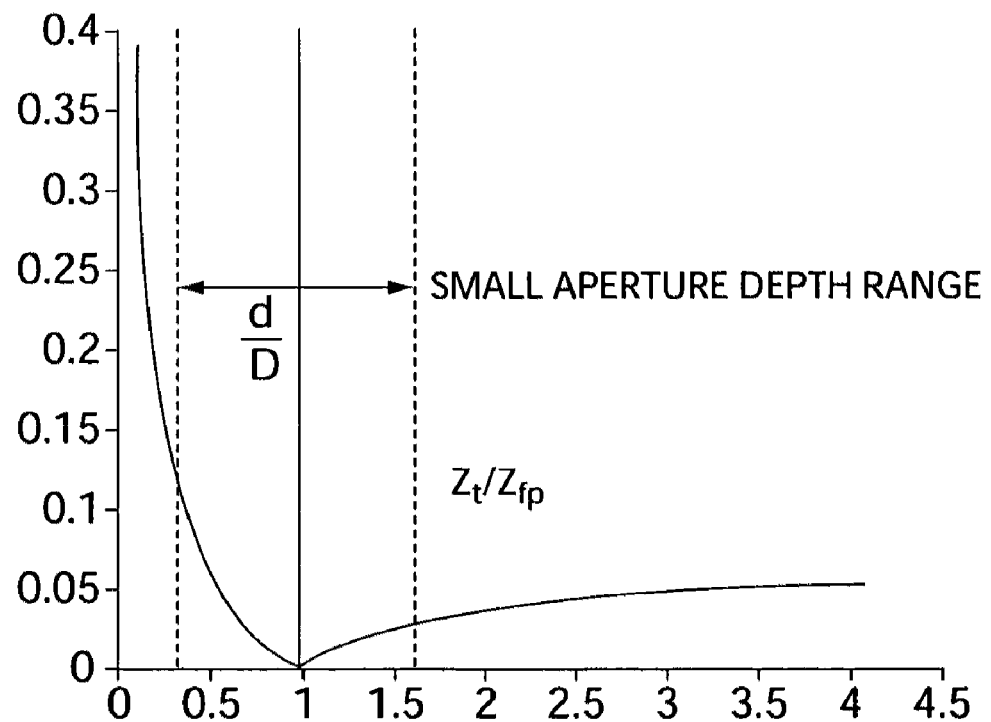
FIG. 8B illustrates a practical target depth range over which the AWS sampled image is in-focus enough to allow processing, for a small aperture size.

For a pre-existing optical system, the aperture sampling plane should be placed as close as possible to the optical train's exit pupil. This should be done so as to minimize vignetting and intensity variation as the aperture is moved from one sampling position to another. This effect can be seen in FIGS. 8A and 8B and FIG. 9, where schematic ray traces of the image side of an optical system are drawn for the case of a sampling plane located far from the exit pupil and for the case of a sampling plane located right at the exit pupil, respectively. In FIGS. 8A and 8B, the sampling plane is located at some distance from the optic's exit pupil. With the aperture in the top position, (FIG. 8A), rays from point 2 are sampled while all rays from point 1 are blocked from reaching the sensor plane. Conversely, with the aperture in the bottom position (FIG. 8B), rays from point 1 are sampled while all rays from point 2 are blocked. This vignetting condition is undesirable as target features cannot be tracked from one sampling position to the next resulting in a loss of 3D data.

Figure 9A:
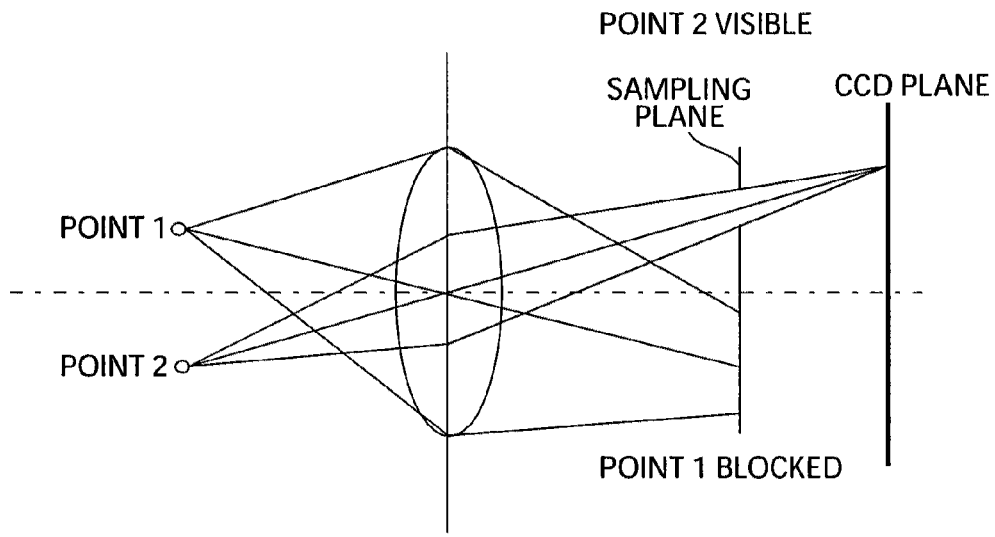
FIG. 9 illustrates the effect of placing the sampling plane far from the exit pupil of the optical train.
Figure 9B:
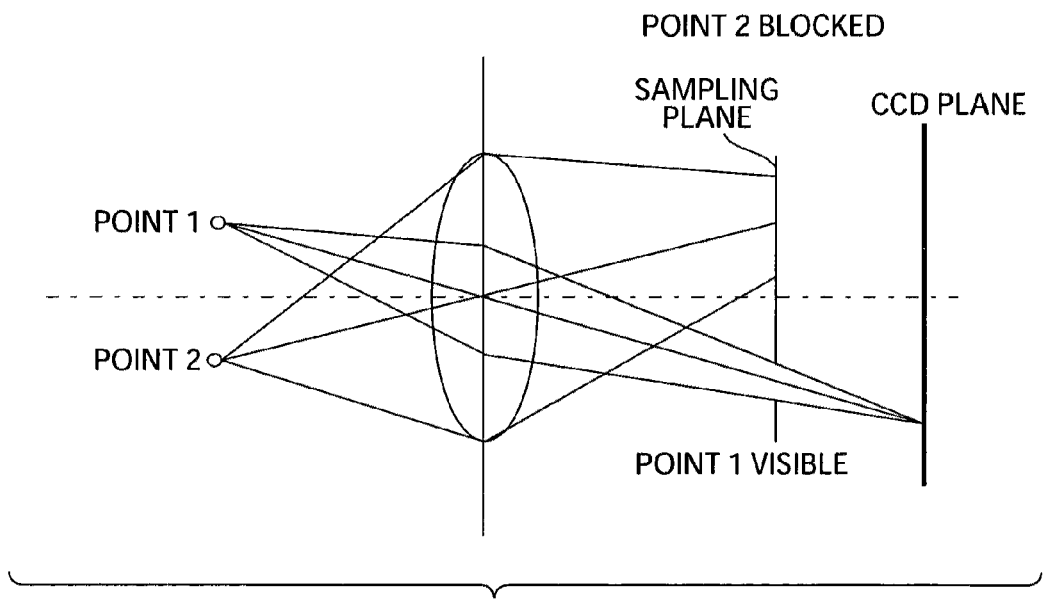
Figure 10A:
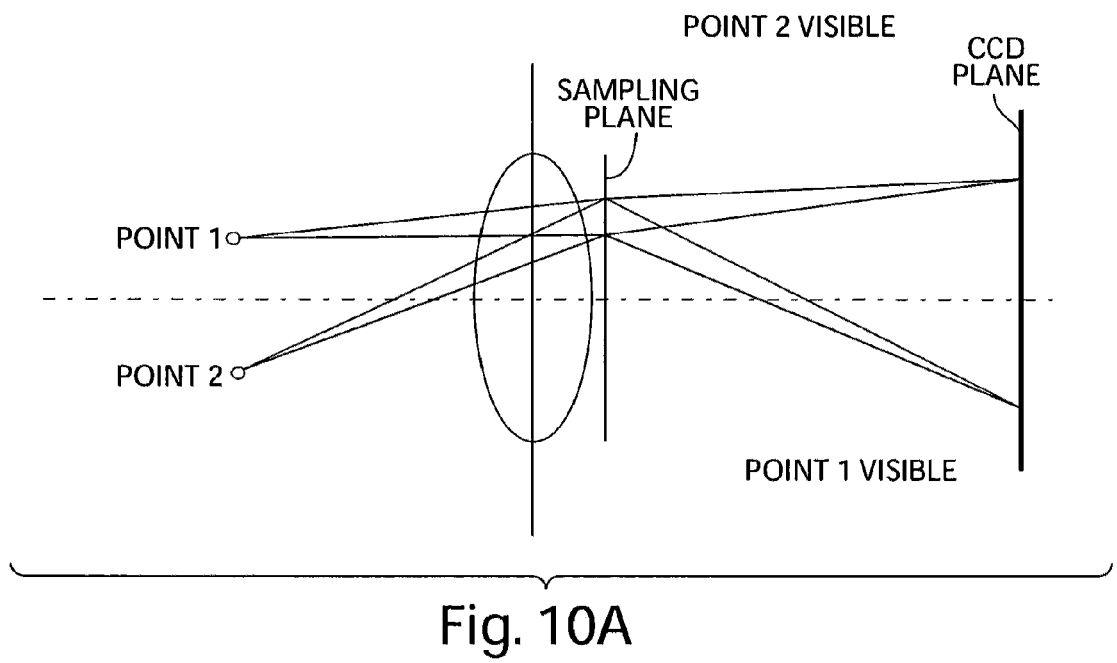
FIG. 10 illustrates the Effect of placing the sampling plane close to the exit pupil of the optical train.
Figure 10B:
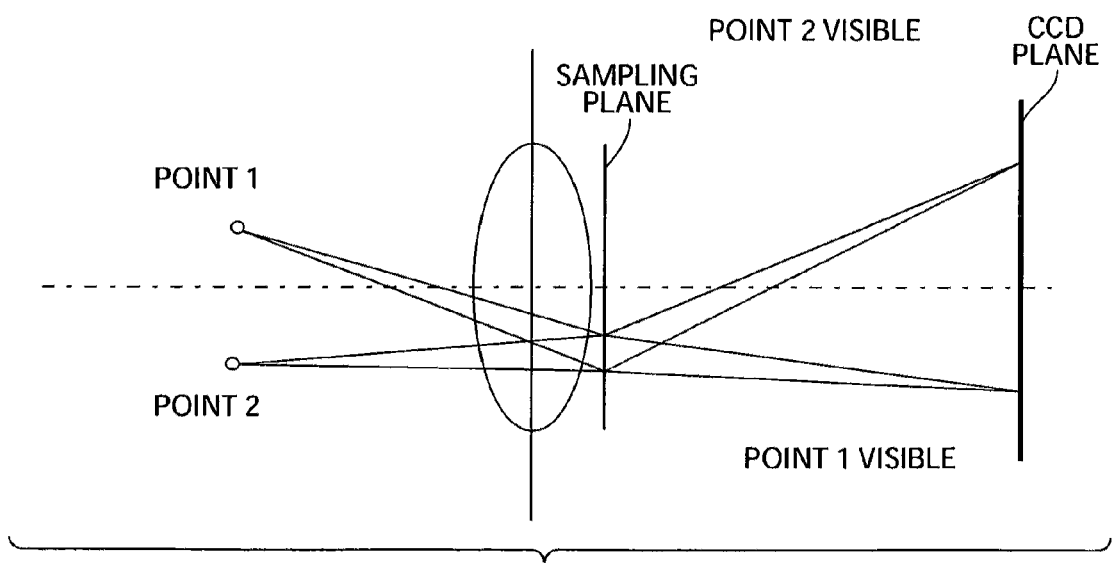

In contrast, FIG. 9 shows the ray tracings for the case where the sampling plane is located right at the exit pupil. In case (a), the aperture is located at the top and light rays from Point 2 are able to reach the CCD plane while all light rays from Point 1 that pass through the lens are blocked. In case (b), the aperture is located at the bottom and all possible light rays from Point 2 are blocked while light rays from Point 1 are able to reach the CCD plane. This extreme vignetting prevents 3D surface reconstruction. FIG. 10 illustrates the Effect of placing the sampling plane close to the exit pupil of the optical train. In case (a), the aperture is located at the top and light rays from both Point 1 and from Point 2 are able to reach the CCD plane. In case (b), the aperture is located at the bottom and once again light rays from both Point 1 and Point 2 are able to reach the CCD plane. Since both Point 1 and Point 2 are visible, 3D surface reconstruction is possible. Here, we see that for both the top and bottom sampling positions rays from both points 1 and 2 are sampled; the vignetting from the previous setup is removed and full 3D reconstruction is possible. For optical trains where complete access to all lens elements is available, another possible position for the sampling plane is at the lens aperture plane. This location would also minimize vignetting and intensity variation from one aperture position to the next.

There are several possible mechanical implementations of AWS, each with varying degrees of complexity. A full blown metal leaf system where both the aperture's position and size are fully adjustable gives complete flexibility to the user in terms of number of samples and lighting conditions. If light levels are relatively constant, simpler designs with fixed aperture size can be used. Some fixed aperture mechanical designs in the literature permit only translation in one direction, while others allow full movement within the aperture plane. Perhaps the simplest mechanical implementation of AWS is the already mentioned rotating aperture approach. This design uses a rotating disk with an off axis, fixed diameter aperture to sample the wavefront. The rotating disk can be supported by a single bearing, and can be powered by a small DC or stepper motor. Angular position accuracy can be maintained by using a DC motor with angular feedback or by using a fine stepped stepper motor and controller. Positional accuracy can also be maintained by using a fixed mask located ahead of the rotating disk with all desired sampling positions pre-drilled. When the rotating aperture passes next to an open hole on the fixed mask, the aperture position is effectively fixed by the accurately manufactured fixed mask.

Figure 11:
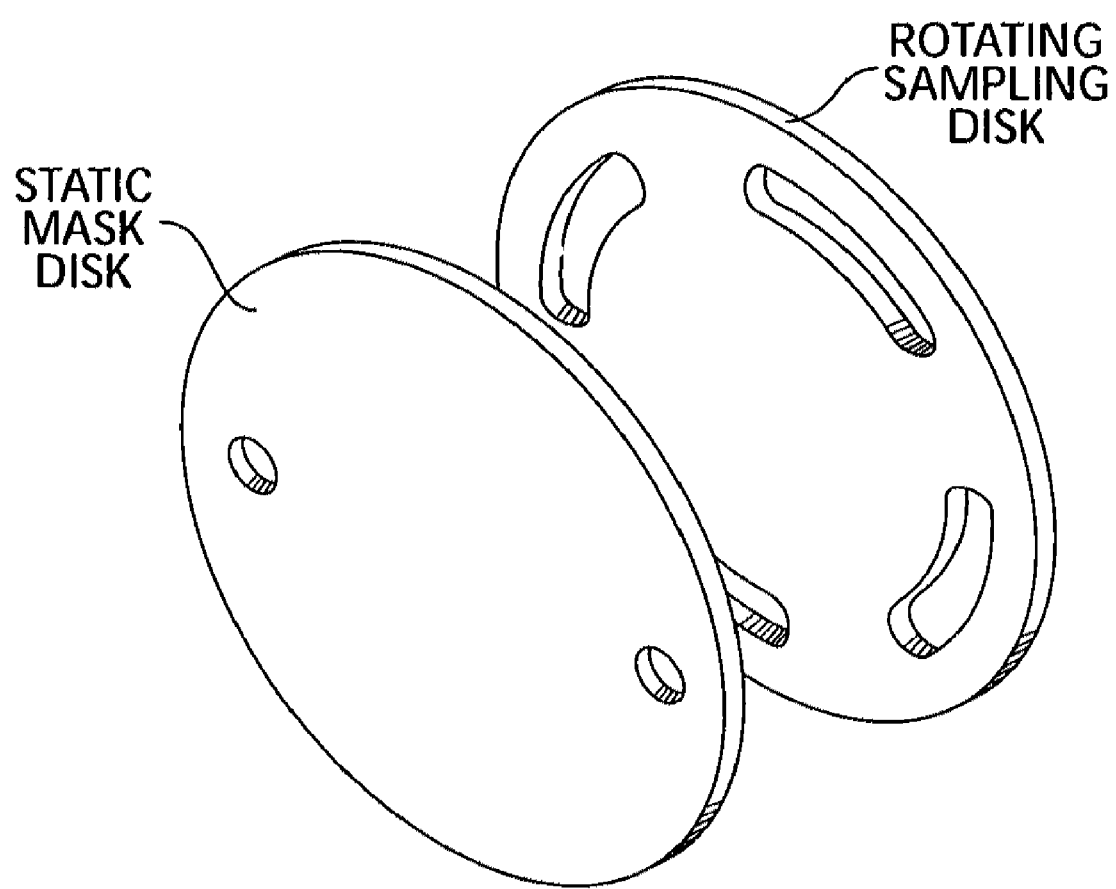
FIG. 11 illustrates a schematic of a static two aperture mask in conjunction with a rotating sampling disk.

If high frame rate operation using only two horizontally opposed sampling positions is desired, a rotating disk with several elongated apertures can be used in conjunction with a fixed mask with two aperture holes as shown in FIG. 11. FIG. 11 illustrates a schematic of a static two aperture mask in conjunction with a rotating sampling disk. The rotating disk has four elongated apertures which allow for a reduced rotation speed for a given image frame rate. The length of the elongation and the operating frame rate determine the exposure time of each image. The separation between the two disks is exaggerated for clarity. Increasing the number of elongated apertures on the rotating disk has the effect of reducing the required motor speed for a desired frame rate, while elongating the aperture arc has the effect of increasing the exposure time for a given frame rate.

Figure 12A:
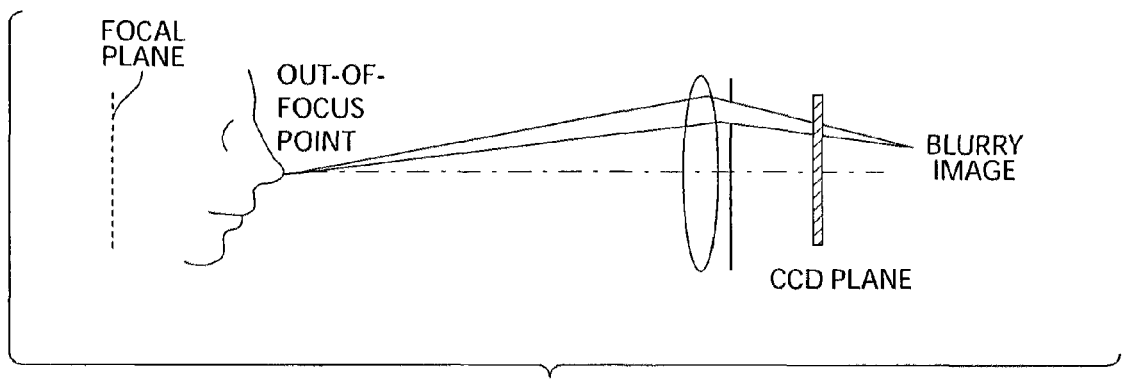
FIG. 12 illustrates a standard mechanical AWS implementation.
Figure 12B:
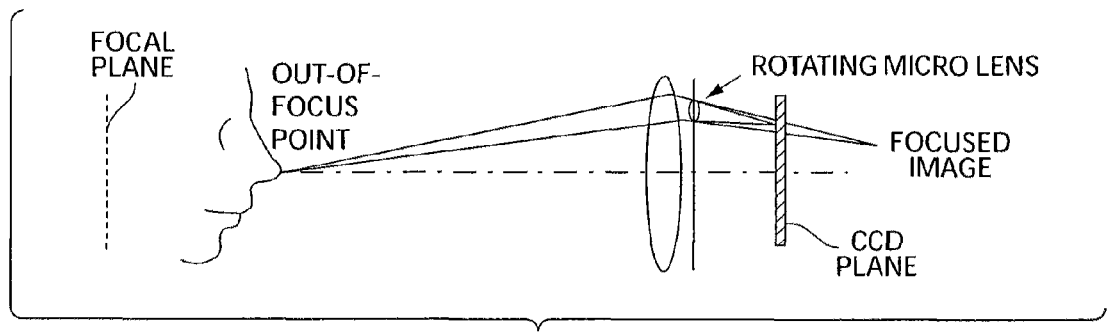
Figure 13:
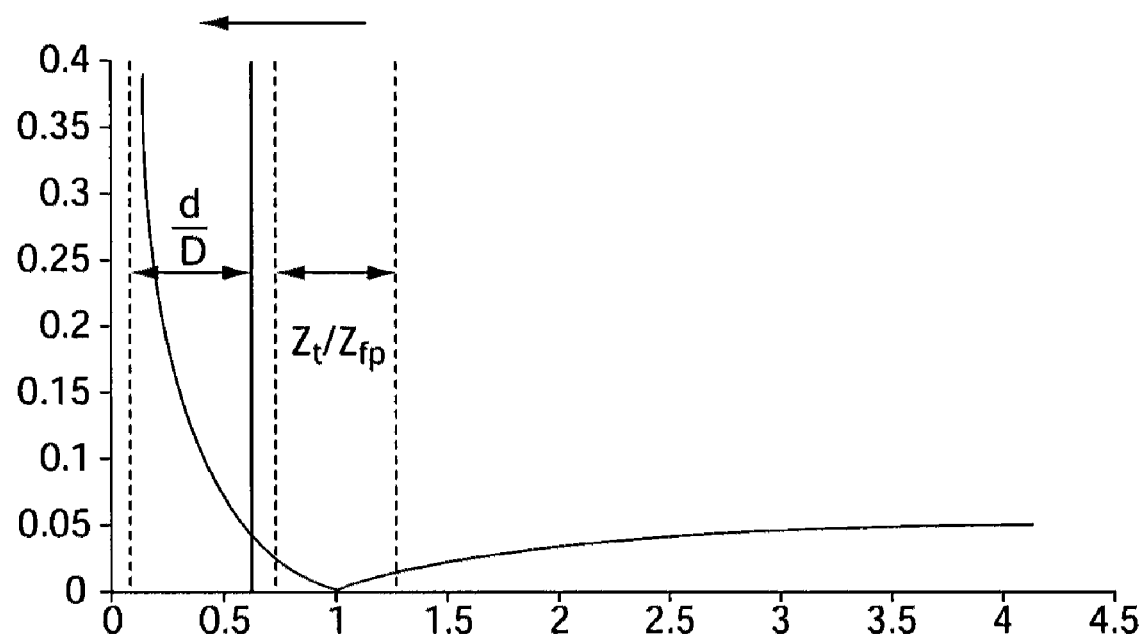
FIG. 13 is a plot illustrating the effect of using a microlens in the AWSM.

Another approach is to modify the rotating aperture by filling the aperture hole with a small lens (FIG. 12). In this case, the target feature is so far in front of the focal plane that the sampled image is blurry, leading to poor processing performance. (b) Rotating micro-lens implementation. Here, the same target feature is perfectly focused onto the CCD plane by the converging lens located inside the rotating aperture. Processing performance is optimized and the system depth sensitivity is increased. The effect of this lens is to converge the sampled rays so that target features very far from the in-focus plane appear in-focus on the imaging plane. In effect, the microlens shifts the in-focus region of FIG. 2 from a depth band surrounding the in-focus plane to a depth band further away from the in-focus plane, as is shown in FIG. 13.

This figure plots the non-dimensional disparity diameter vs. the non-dimensional target distance from the focal plane. The in-focus range of the original optical system (blue lines) is shifted by the rotating lens further away from the focal plane (red lines), to a region whose greater slope indicates an increased sensitivity to depth. This new depth band falls on a section of the curve with a higher slope and therefore a higher sensitivity to depth. It is important to note, however, that this same increase in sensitivity to depth can be achieved by simply moving the in-focus plane closer to the lens by focusing it. Though the latter adjustment does in theory reduce the field of view, the reduction is so small as to not have a great effect in practice.

The AWS approach can also be implemented electronically. One way to do this is to replace the mechanical aperture with an LCD plane, whose elements can be switched on and off in the shape of an aperture at various locations on the plane. This approach can potentially control both the size and the position of the aperture without any moving parts, and with short response times. One important disadvantage with this approach, however, is that at least 50% of the sampled light is rejected due to the polarization inherent to the LCD technology. Another disadvantage with LCD's is that they have a low fill-factor. This is the percentage of the panel area that actually transmits light, and is typically less than 70% for LCDs. This low fill-factor can have the effect of both reducing the amount of light reaching the sensor plane and of degrading the quality of the image itself.

Figure 14A:
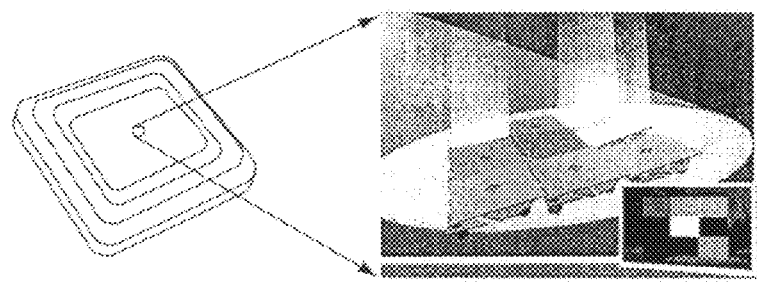
FIG. 14A illustrates a Digital Micromirror Device (DMD) is a chip that can hold more than 1 million tiny mirrors on it.
Figure 14B:
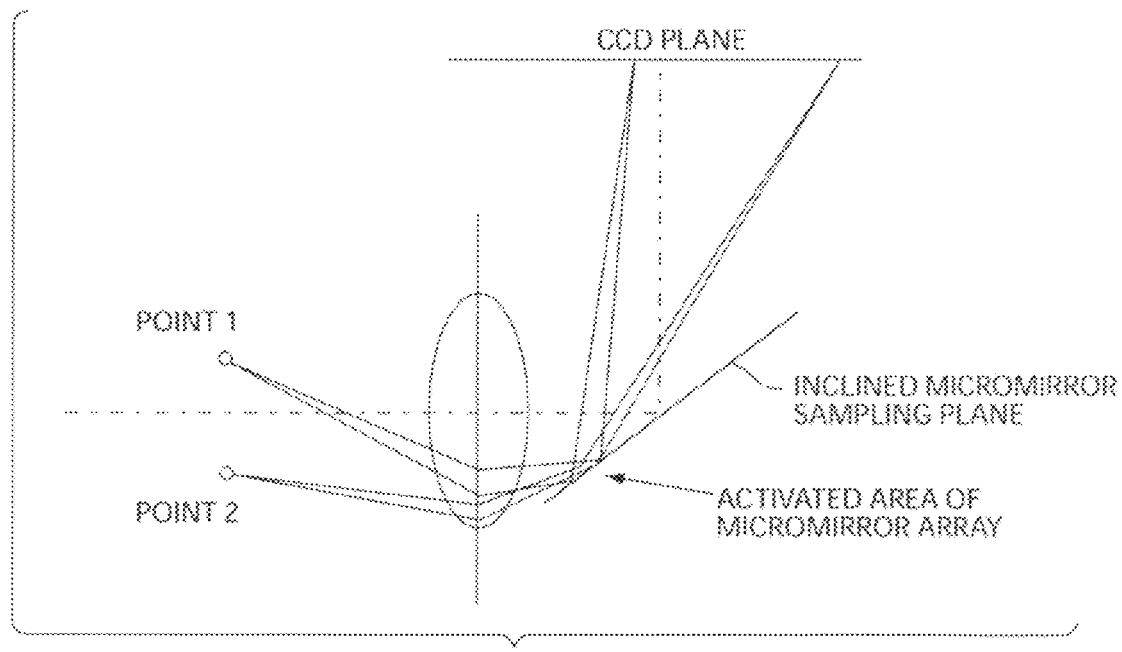
FIG. 14B is a schematic of a micromirror based AWS system.

A second electronic solution to the sampling problem is the use of a Digital Micromirror Device shown in FIG. 14A. This device, developed and marketed by Texas Instruments, is an array of small mirrors whose tilt can be individually controlled electronically. The whole chip appears to be a normal mirror to the naked eye, but may contain one million or more mirrors. Each 14-$\mu m^2$ binary mirror can tilt +12 or −12 degrees when a voltage is applied to its base, resulting in different reflecting directions of the same incident light. Based on whether these mirrors are switched on or off, the CCD sees dark or bright areas reflected off the DMD. FIG. 14B is a schematic of a micromirror based AWS system. The computer-controlled micromirror array selectively reflects the incident light onto the CCD camera. By placing such a device at an angle to the optical axis, as shown in FIG. 14B, and by turning on specific mirrors so that they reflect light onto the CCD, a wavefront sampling effect can be obtained.

Like the LCD version described earlier, the micromirror approach offers flexible control of both the aperture size and position, but has the added benefit of allowing more light to hit the CCD since the mirror reflectivity is approximately 88% and the chip fill factor is approximately 90%. One disadvantage of the micromirror approach, however, is that the necessity of placing the sampling plane at an angle may introduce some vignetting. This is due to the fact that the wavefront sampling is occurring at different axial positions depending on where the aperture is moved, and as we saw in FIG. 9 this can lead to some parts of the target disappearing from view depending on the position of the aperture.

The illumination of the target to be modeled can be critical to the output of high quality 3D results. Structured or random patterns can be projected onto the surface of the target so as to increase its signal to noise ratio, and a variety of different kinds of projectors can be used for this purpose (from simple slide projectors to computer projectors). One key design feature is to align the illumination source with the imaging optical train as much as possible. This step insures that shadows on the target are minimized and that the entire target is illuminated as uniformly as possible. Indeed, the best possible solution is to have coaxial illumination, as shown in FIG. 15.

Figure 15:
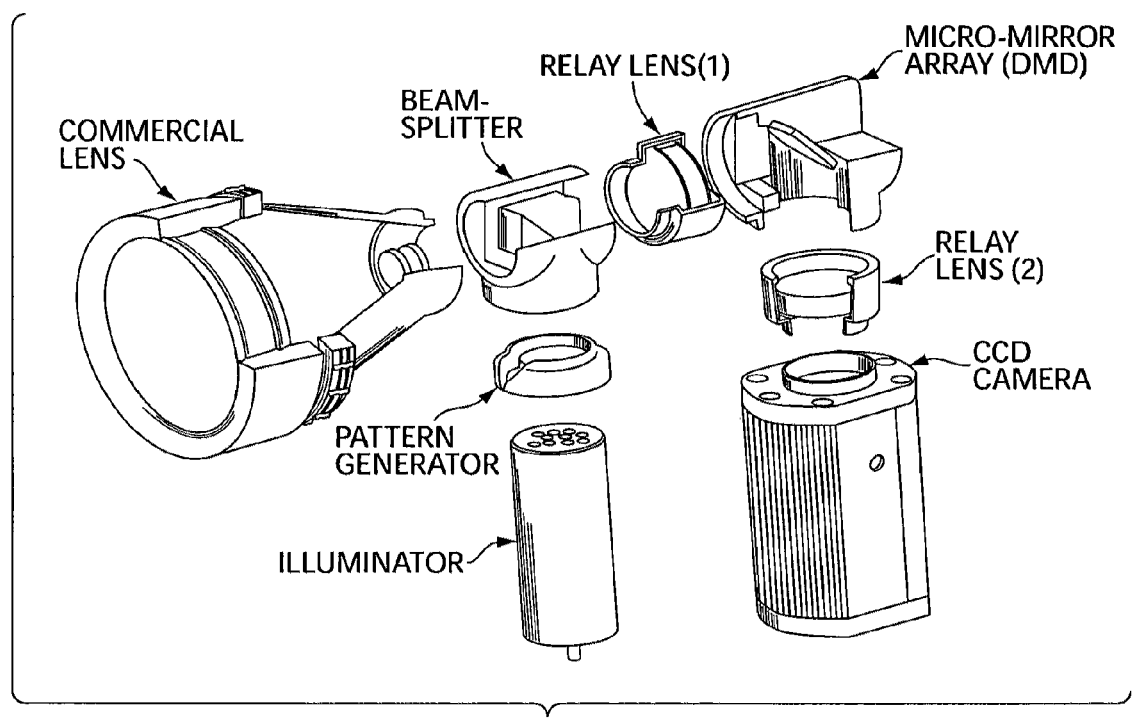
FIG. 15 illustrates an exploded view of the conceptual design of a 3D monocular system.

In FIG. 15, a readily changeable commercial lens views the object space. The computer-controlled micromirror array selectively reflects the incident light onto the CCD camera. A set of relay lenses determines the position of the micromirror array along the optical path to ensure optimum imaging quality. Coaxial illumination unit consisting of a 50% beamsplitter, a pattern generator that adds texture onto the object surface and a white light illuminator projects light onto the object being imaged. In this conceptual design, the light from the illumination source travels down the same path as the light from the target. Besides minimizing shadows, this approach also reduces the overall bulk of the system and eliminates the need to separately aim the imaging system and the pattern projector at the target. In terms of the best design for the projected pattern, its spatial frequency and contrast should be adjusted in order to maximize overall system performance.

One embodiment of a system to explore 3D surface imaging capabilities of Active Wavefront Sampling was implemented using a f/1.2 50 mm Nikorr lens, a mechanical rotating aperture module, and a Dalsa 1024A CCD camera. The Dalsa camera has a 1024×1024 pixel sensor, with 12 micron pixels, and has an 8 bit grayscale dynamic range. The CCD can be binned down to a 512×512 pixel resolution, and random noise is listed to be approximately 1 Digital Number (DN) by Dalsa (where the full range is given by 256 DN). The camera is connected to a Coreco Imaging Viper Digital capture card, allowing a 30 Hz frame rate. Several rotating aperture AWS modules were designed and built over the course of this project, but all work presented in herein using the 50 mm Nikorr lens was accomplished using a simple belt driven design built by the Industrial Technical Research Institute (ITRI), in Taiwan ROC. This module mounts the aperture sampling disk on a ball-bearing supported and belt driven gear. The axial position of the rotating aperture sampling disk can be adjusted, and a second fixed sampling mask can be mounted in front of the rotating sampling disk if needed.

As was mentioned before, this optional fixed mask serves the purpose of accurately positioning the sampling locations, as well as of removing any smearing caused by the rotating aperture disk moving during the exposure time of the image being acquired. This latter role becomes more important as the speed of rotation increases in an effort to increase the system frame rate. The rotating aperture disk has a single aperture hole with a diameter of approximately 1.5 mm, located at a radial position of 4 mm from the axis of rotation. It was found that increasing the radial position of the aperture any more than this would introduce large amounts of vignetting in the images.

The aperture assembly may be driven by a Haydon Switch and Instrument, Inc. 36540-12 stepper motor, which is controlled by an Advanced Micro Systems, Inc. MAX-410 controller. The stepper motor is rated at 24 steps per revolution, and the gearing of the motor pinion gear to the aperture spur gear is 10:75. This yields a final aperture angular resolution of 1 degree per motor step when in half-stepping mode. The maximum sustained speed of the stepper motor is approximately 2000 steps/second.

A small Hall-effect sensor is also incorporated into the module, and its role is to provide a zero position for the rotating aperture. Before images are acquired, the rotating aperture is moved until a signal from the Hall sensor is received. This angular position is defined as the zero position and the angular position of the aperture is determined by the number of steps taken by the motor relative to this zero position. Though, the overall motor control of the system is clearly open loop, a large number of system tests have shown that the positioning of the aperture to be both accurate and robust.

One end of the AWS module has a standard Nikon F-mount to secure the lens, while the other end is threaded so as to screw into the M42×1 thread on the Dalsa camera. The module thickness is such that the distance between the rear of the Nikkor lens and the CCD plane on the camera is approximately 46.5 mm, the standard F-mount distance. This distance insures that the Nikkor lens is operating under the same conditions it was designed for.

Illumination of the target was performed by using a standard computer projector. One projector that has been used is a 3 LCD type manufactured by Toshiba. A second projector that has also been used is a Digital Light Projection type manufactured by InFocus. This projector uses a single Texas Instruments micromirror array with a spinning color wheel to project an image. It has higher brightness and contrast ratio than the LCD model, and it is also smaller and less bulky. However, it was found that for short camera exposure times (less than 20-30 msec), the brightness variation from one captured image to the other became very large. This suggests that the response time of the single micromirror array combined with the spinning color wheel becomes too long for operating conditions below 20-30 msec. For longer exposure times, however, the captured images showed very uniform brightness using this projector.

As discussed above, the Active Wavefront Sampling (AWS) technique encodes depth by shifting the position of a given target's image as a function of the aperture's position on the aperture plane. For the simplest case of a rotating off axis aperture as used in this work, a target point's image will appear to rotate on the image plane as the aperture moves from one angular position to another. Under ideal non-aberrated conditions, the diameter of this circular rotation directly determines the depth of the target point as was shown in Equation 1.6. In order to quantify a target point's depth, therefore, the diameter of this rotation needs to be estimated very accurately by tracking the image motion from one aperture position to the next. Various types of tracking algorithms described in the literature will be discussed herein, and the algorithms developed specifically for AWS image processing will be described. In describing the algorithms developed for an AWS application, it will be assumed presently that the system's optical train is aberration free. This assumption will be removed in the discussion that follows, where the effects of optical aberrations will be incorporated.

A large body of work concerning algorithms that track feature motion between image frames exists, including block matching algorithms, frequency domain approaches, as well as gradient methods. Block matching algorithms are perhaps the simplest form of motion tracking that can be performed. In this approach, the image is divided into small regions (interrogation areas) which are then individually tracked from one image to the next. Matching of the interrogation areas between images is performed by minimizing an error function such as:

$$\text{Error} = \sum_{(x,y)\in R} \sum C[I(x, y, t_o), I(x+d_x, y+d_y, t_1)] \qquad (3.1)$$

In this expression, R is the region defined by the interrogation area, $(d_x, d_y)$ is the displacement vector, $I(x,y,t)$ is the intensity of the image at given spatial and temporal coordinates, and C[ ] is a function that indicates the amount of dissimilarity between the two arguments. Two commonly used choices for video processing applications are the squared difference or the absolute value of the difference between the two arguments $$\text{Error} = \sum_{(x,y)\in R} \sum [I(x, y, t_o) - I(x+d_x, y+d_y, t_1)]^2 \qquad (3.2)$$

$$\text{Error} = \sum_{(x,y)\in R} \sum |I(x, y, t_o) - I(x+d_x, y+d_y, t_1)| \qquad (3.3)$$

For each interrogation area in the first image, the error is calculated for a range of displacements in both the x and y directions in the second image. The displacement whose error value is the smallest is chosen as the true displacement of that particular interrogation area. Block matching in this way can only calculate integer displacement values; in order to calculate subpixel displacements, the original images need to be interpolated so as to provide a finer mesh to the block matching algorithm. Block matching approaches in general can be extremely computationally intensive, especially for long search lengths and for finely interpolated intensity images.

Another evaluation function used to match interrogation areas from one image to another is the discrete cross-correlation function $\phi(d_x, d_y)$, $$\phi(d_x, d_y) = \frac{\sum_{d_x=x_l}^{x_h} \sum_{d_y=y_l}^{y_h} I(x, y, t_0) \cdot I(x+d_x, y+d_y, t_1)}{\sum_{d_x=x_l}^{x_h} \sum_{d_y=y_l}^{y_h} I(x, y, t_0) \sum_{d_x=x_l}^{x_h} \sum_{d_y=y_l}^{y_h} I(x+d_x, y+d_y, t_1)} \qquad (3.4)$$

The cross-correlation function approaches 1 when the match between the interrogation area in the first and second images is perfect, and goes to zero where there is no match. Again, the cross-correlation function is calculated for a range of displacements in the x and y directions, so that a cross-correlation table is produced (see FIG. 16). The displacement vector corresponding to the highest peak in the correlation table is taken to be the actual displacement of the interrogation area. This algorithm is very popular in the experimental fluid mechanics community, where it is used to process images obtained from Digital Particle Image Velocimetry (DPIV) experiments.

Figure 16:
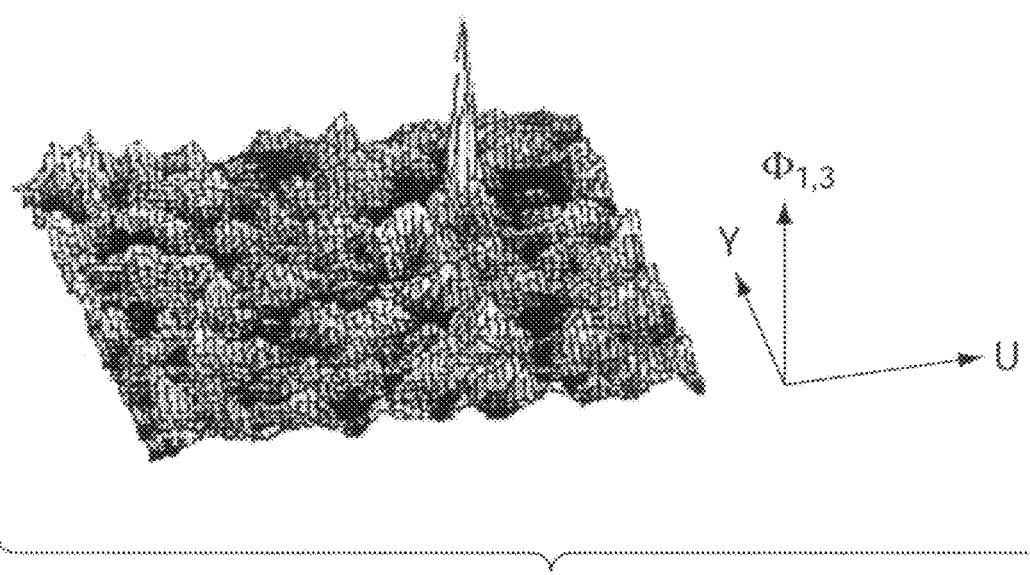
FIG. 16 illustrates a typical correlation surface, with the position of the high peak corresponding to the integer pixel displacement of the interrogation area.

Just as with the previous metrics, subpixel displacements can be evaluated by first interpolating the original intensity images to a finer grid. Another subpixel approach that avoids interpolation is to fit a Gaussian curve on the correlation plane peak and use the real-valued center of the Gaussian curve as the interrogation area displacement. In order to speed up the processing, the cross-correlation plane is typically calculated by transforming to the frequency domain and using the fast Fourier transform (FFT). Instead of performing a sum over all the elements of the sampled region for each element, the operation can be reduced to a complex conjugate multiplication of each corresponding pair of Fourier coefficients. This new set of coefficients is then inversely transformed to obtain the cross-correlation value. FIG. 16 illustrates a typical correlation surface, with the position of the high peak corresponding to the integer pixel displacement of the interrogation area.

A more recent approach to finding the integer pixel displacement is spare array image correlation, described in U.S. Pat. No. 5,850,485, entitled "Sparse Array Image Correlation" to Hart, which is herein incorporated by reference in its entirety. This algorithm is an error correlation based approach using compressed images. This algorithm compresses the images to be correlated based by ignoring all pixels whose spatial gradients are smaller than a certain threshold, and then performs the following error correlation on the remaining image data:

$$\phi(d_x, d_y) = \frac{\sum_{x_l}^{x_h} \sum_{y_l}^{y_h} \left[ \begin{array}{c} I(x, y, t_0) + I(x+d_x, y+d_y, t_1) - \\ |I(x, y, t_0) - I(x+d_x, y+d_y, t_1)| \end{array} \right]}{\sum_{x_l}^{x_h} \sum_{y_l}^{y_h} [I(x, y, t_0) + I(x+d_x, y+d_y, t_1)]} \qquad (3.5)$$

Just as with previous algorithms, a correlation table is generated whose peak corresponds to the displacement estimate. Using particle image velocimetry (PIV) type images, compression ratios on the order of 10:1 can be used. These high compression ratios, in conjunction with the fact that the error correlation expression uses only sum operations, can make the approach much faster than traditional correlation techniques.

Whether the correlation plane is determined using FFT methods or not, the size of the interrogation area has an important effect on the robustness and accuracy with which block matching methods can find the integer value of the displacement. Clearly, the smaller the interrogation area the easier it is to find spurious matches in the subsequent image. Larger interrogation areas therefore typically increase the probability of finding the correct displacement peak, and allow for longer displacement search lengths without increasing the probability of a spurious match. However, if the interrogation area is chosen to be so large as to incorporate large velocity differences within it, the correlation peak will flatten out and will be harder to detect. Furthermore, individual pixels' displacement may vary substantially from their interrogation area's average displacement as represented by the flattened correlation peak. It can be seen, therefore, that the interrogation area size must be chosen carefully depending on the characteristics of the images themselves.

One way to avoid the tradeoff in accuracy or robustness due to interrogation area size is to perform the correlation step in a hierarchical fashion. For instance, a large interrogation area can first be used to find an estimate of the integer displacement for that part of the image. Next, the original large interrogation area is broken down into smaller interrogation areas, which are in turn correlated with a much smaller search area, centered on the displacement found with the larger interrogation area. This "top-down" approach in interrogation area size can also be reversed into a "bottom-up" technique.

Finally, robustness can also be increased by multiplying (element by element) the correlation tables of adjacent interrogation areas. This correction method can enhance the size of the correct displacement peak relative to random noise peaks, which tend to cancel each other out during the multiplication process. These approaches require some additional computational time but provide higher spatial resolution with a higher accuracy than the standard algorithm.

In terms of estimation accuracy, it has been found that the overall accuracy of correlation based techniques with subsequent Gaussian fitting of the correlation plane to find the subpixel displacement is typically in the 0.05-0.1 pixel range.

A significant amount of work has gone into calculating optical flow using frequency methods. One approach relies on the following relationship between the phase difference at the same point of an image pair and the displacement between the images at that point:

$$\Delta\phi = dk \quad (3.6)$$

where $\Delta\phi$ is the phase difference, d is the displacement and k is the wave vector of the kernel's main frequency. The estimate of k is obviously very important, and it can be calculated by using the local frequency model:

$$k(x) = \left(\frac{\partial \phi(x)}{\partial x}\right) \quad (3.7)$$

where $$\phi(x) = \frac{1}{2}(\phi_{left}(x) + \phi_{Right}(x)) \quad (3.8)$$

In order to calculate the phase at any given point in the image, it is desirable to utilize filters that are localized in both space and time. Gabor filters are often used since they achieve the minimum product of the uncertainty principle's localization in both space and time. An example of a two different Gabor filters are shown in FIG. 17.

In summary, the image pair is filtered using a set of Gabor wavelets and the phase of a point is averaged over both images. The derivative of this average is calculated in order to obtain the wave vector at that point, and finally the estimated displacement is calculated by dividing the phase difference of that point over the two images by the wave vector, k.

It has been claimed that phase methods like the one described above are more robust than magnitude response methods. The phase methods are practically immune to image intensity variation, for example. However, phase methods do suffer from computational complexity and from the requirement that some parameters be determined experimentally based on the particular images and motions being analyzed. Because of these drawbacks, these methods are not pursued any further in this work.

Gradient methods, also known as gradient optical flow methods, are based on the assumption that the intensity of any given target point remains constant as the target point moves from one image to the next. This assumption can be codified mathematically using the material (or total) derivative of the brightness intensity I(x, y, t)

$$\frac{DI(x, y, t)}{Dt} = \frac{\partial I(x, y, t)}{\partial t} + \frac{\partial I(x, y, t)}{\partial x}\frac{\partial x}{\partial t} + \frac{\partial I(x, y, t)}{\partial y}\frac{\partial y}{\partial t} \quad (3.9)$$

Setting the material derivative equal to zero (the constant brightness assumption) and replacing the time derivatives of the spatial coordinates with velocities u and v, we obtain $$\frac{\partial I(x, y, t)}{\partial t} + \frac{\partial I(x, y, t)}{\partial x}u + \frac{\partial I(x, y, t)}{\partial y}v = 0 \quad (3.10)$$

The above equation clearly relates the temporal and spatial partial derivatives of the image intensity to the x-velocity and y-velocity of the image feature. The velocities are the two unknowns being sought, and only the spatial and temporal partial derivatives can be calculated. Clearly, this optical flow problem has two unknowns (u,v) and only one equation, so several methods have been developed to give a solution for the two unknown velocities. The simplest method is to assume a constant velocity for all the pixels within an interrogation area, and solve for the velocities u and v in the least squares sense. Mathematically, this amounts to minimizing $$\Sigma(I_x u + I_y v + I_t)^2 \quad (3.11)$$

over the interrogation area (where $I_x$, $I_y$, and $I_t$ are the partial derivatives with respect to x, y and t). Differentiating this expression and solving for the velocities results in the following expression $$\begin{pmatrix} u \\ v \end{pmatrix} = -\begin{pmatrix} \sum I_x I_x & \sum I_x I_y \\ \sum I_x I_y & \sum I_y I_y \end{pmatrix}^{-1} \begin{pmatrix} \sum I_x I_t \\ \sum I_y I_t \end{pmatrix} \quad (3.12)$$

where the sums are again taken over the entire interrogation area. Though this approach is attractive in its simplicity, it does have the disadvantage of assigning a single velocity value to an extended region. Clearly, the larger the interrogation area used, the coarser the resulting velocity mesh. Conversely, the larger the interrogation area the more robust the velocity estimate.

A more computationally intensive approach to solving the velocity combines the gradient constraint with a global smoothness term. This term helps to constrain the velocity field by assuming that the field has to vary smoothly. In this approach, the following error term is minimized over the interrogation area:

$$\Sigma(I_t+I_x u+I_y v)^2+\lambda^2(\|\nabla u\|^2+\|\nabla v\|^2) \quad (3.13)$$

The relative importance of the second, smoothing term is controlled by the constant $\lambda$. This approach leads to a finer and smoother mesh of velocity estimates, but unfortunately does require the user to choose a value of $\lambda$, which may be image dependent.

Several other solution formulations for gradient based optical flow can be found in the literature. For example, a weighted least squares approach may be used that gives higher importance to pixels near the center of the interrogation area than to pixels at its periphery. It has also been attempted to include physical models of brightness variation into the constant brightness equation, essentially replacing the right hand side of equation 3.9 with a function describing how the brightness of a target point varies from frame to frame.

No matter what formulation is used to solve for the two velocity terms, a key step in this overall approach is the calculation of the spatial and temporal derivatives. Derivatives may be calculated using simple backward differences operating on a single image pair. Simple two point interpolators were used to co-locate the derivative estimates at the center of a 2×2×2 pixel cube:

$$I_x\left[i+\frac{1}{2}, j+\frac{1}{2}, t+\frac{1}{2}\right]= \quad (3.14)$$
$$\frac{\begin{pmatrix} I[i+1, j, k] - I[i, j, k] + I[i+1, j+1, k] - \\ I[i, j+1, k] + I[i+1, j, k+1] - I[i, j, k+1] + \\ I[i+1, j+1, k+1] - I[i, j+1, k+1] \end{pmatrix}}{4}$$

$$I_y\left[i+\frac{1}{2}, j+\frac{1}{2}, k+\frac{1}{2}\right]=$$
$$\frac{\begin{pmatrix} I[i, j+1, k] - I[i, j, k] + I[i+1, j+1, k] - \\ I[i+1, j, k] + I[i, j+1, k+1] - I[i, j, k+1] + \\ I[i+1, j+1, k+1] - I[i+1, j, k+1] \end{pmatrix}}{4}$$

$$I_t\left[i+\frac{1}{2}, j+\frac{1}{2}, k+\frac{1}{2}\right]=$$
$$\frac{\begin{pmatrix} I[i, j, k] + I[i+1, j, k] + I[i+1, j+1, k] + \\ I[i, j+1, k] - I[i, j, k+1] - I[i+1, j, k+1] - \\ I[i+1, j+1, k+1] - I[i, j+1, k+1] \end{pmatrix}}{4}$$

Figure 18:
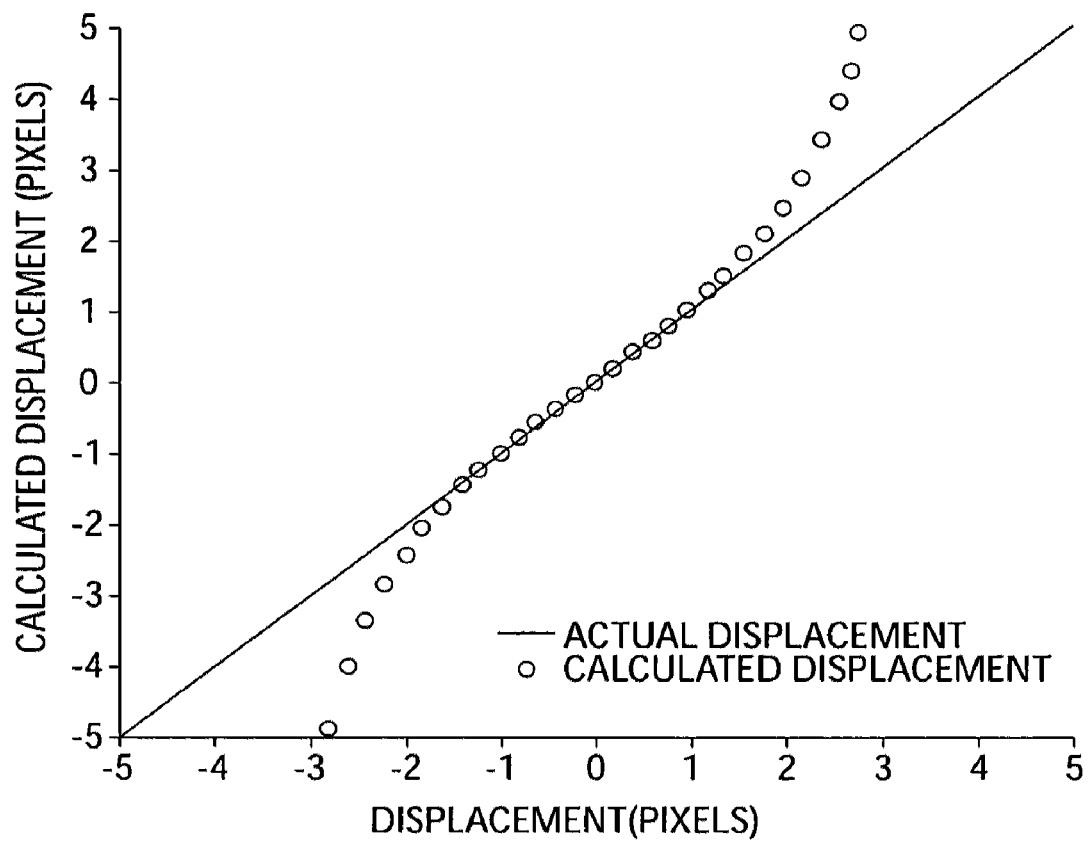
FIG. 18 illustrates a plot of actual and calculated displacement between a synthetic sinusoidal intensity image pair.

These two point derivative and interpolating filters are prone to error, however, and their accuracy drops off precipitously as the motion between frames increases beyond 1 pixel. This effect can be seen in FIG. 18, where the calculated displacement is plotted as a function of the actual displacement, d, for two one dimensional images with a sinusoidal intensity of the form:

$$I_1(x)=A \sin(\omega x)$$

$$I_2(x)=A \sin(\omega x+d) \quad (3.15)$$

It can be seen that the accuracy of the estimate decreases significantly as the displacement becomes greater than 1 pixel. One solution typically used to solve for displacements larger than one pixel is to downsample the image repeatedly, until the measured motion is reduced to a subpixel value. The images are then repeatedly upsampled and shifted by the calculated displacement, until the original image resolution is obtained. Besides the limitation to subpixel displacement estimation, this two point derivative approach may be prone to a systematic error or bias that increases as the images' spatial frequency increases. This result is recreated in FIG. 19, which shows the calculated displacement of a sinusoidally varying intensity image, for various values of spatial frequency. As the spatial frequency of the synthetically generated images is raised, the error in the calculated displacement relative to the actual displacement increases. Over the two pixel displacement range (from −1 to 1), it can be seen that the error between the calculated and actual displacement increases significantly as the image spatial frequency is raised.

Figure 19:
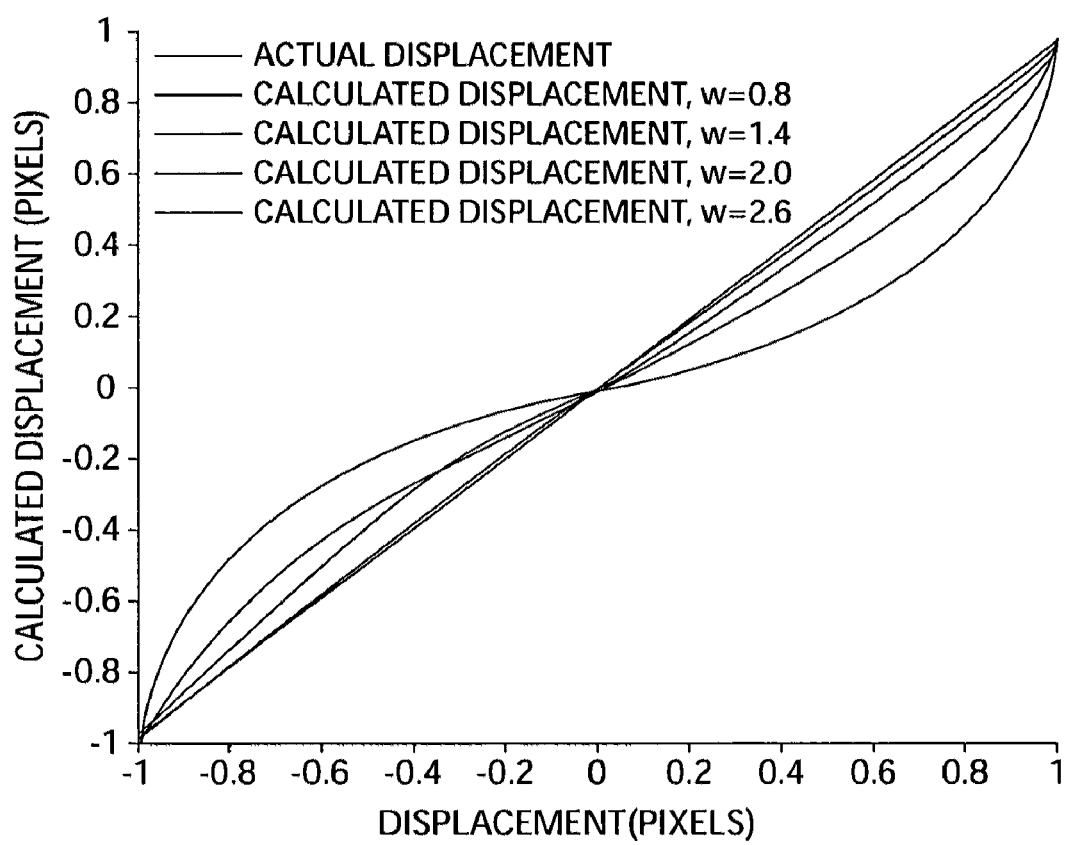
FIG. 19 illustrates a plot of spatial frequency effect on accuracy of 2 point filter based gradient method for various calculated displacements.
Figure 20A:
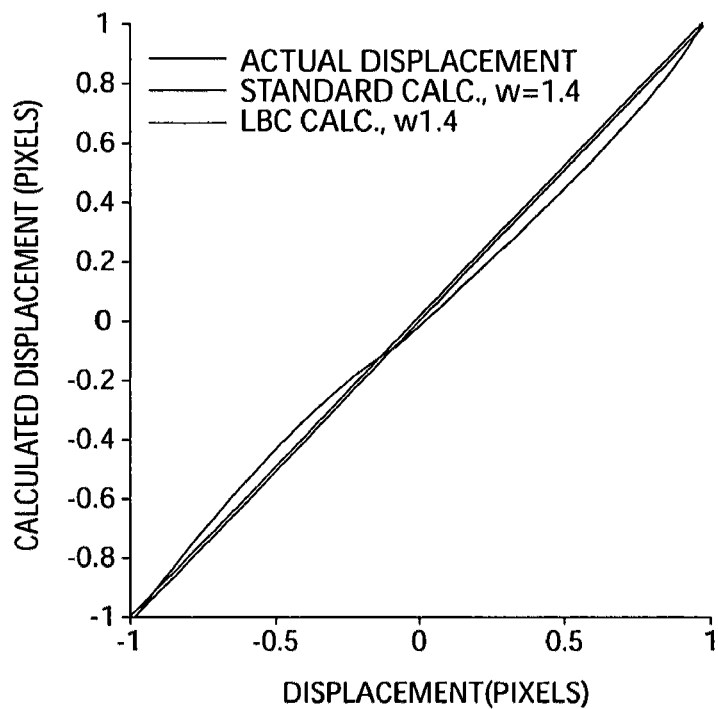
FIG. 20A illustrates LBC and standard displacement estimates calculated for images with a spatial frequency of 1.4.
Figure 20B:
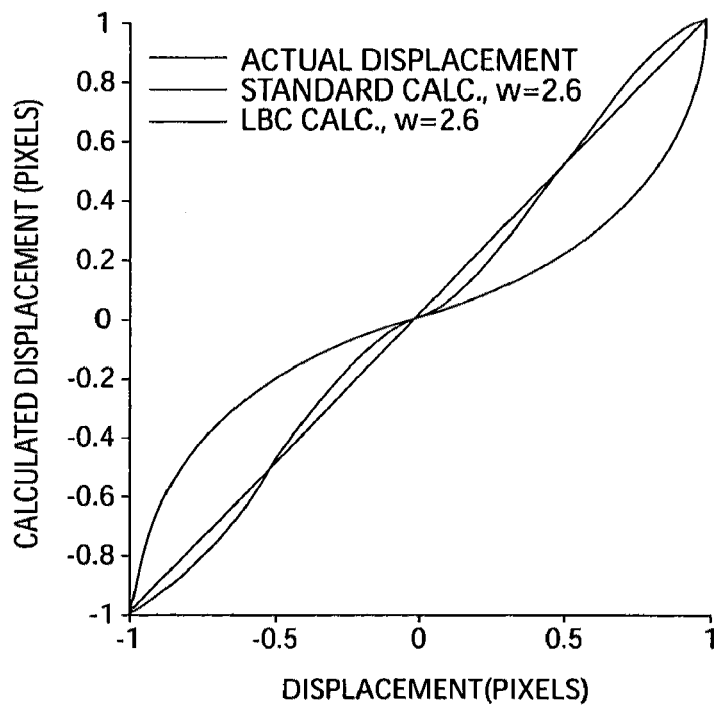
FIG. 20B illustrates LBC and standard displacement estimates calculated for images with a spatial frequency of 2.6.

In order to mitigate this undesired frequency effect, one method includes using the following simple linear model to describe the error between the calculated, (u,v), and the actual (u, v) displacement:

$$\hat{u}=\alpha_1 u+\beta_1 v \quad (3.16)$$

$$\hat{v}=\alpha_2 u+\beta_2 v \quad (3.17)$$

where $\alpha_1$, $\alpha_2$, $\beta_1$, $\beta_2$ are constants. In this Linear Bias Compensation (LBC) approach, the linear model parameters are determined by performing three additional gradient optical flow calculations where the first image is displaced by one pixel first in the x and then in the y direction, so that the disparity between the two images is always kept below one pixel. With the model parameters calculated, the bias corrected displacements can be found from equations 3.15 and 3.16. Though this LBC technique increases the computational cost by a factor of 4, the systematic error in the displacement calculation is also reduced by approximately a factor of 4. The same disparity calculations performed to generate FIG. 19 were performed using LBC, and the much improved results can be seen in FIGS. 20A and 20B. FIG. 20A illustrates LBC and standard displacement estimates calculated for images with a spatial frequency of 1.4. FIG. 20B illustrates LBC and standard displacement estimates calculated for images with a spatial frequency of 2.6. It can be seen that the LBC method outperforms the standard method significantly, especially at the higher spatial frequency.

This approach to the optical flow problem can be seen as a subset of the gradient techniques described above. Its main attribute is the use of multiple images collected in time in order to increase the accuracy of the calculated spatial and temporal derivatives. These higher accuracy derivative estimates are used in the constant brightness equation in order to determine better estimates of the optical flow velocity.

Figure 21:
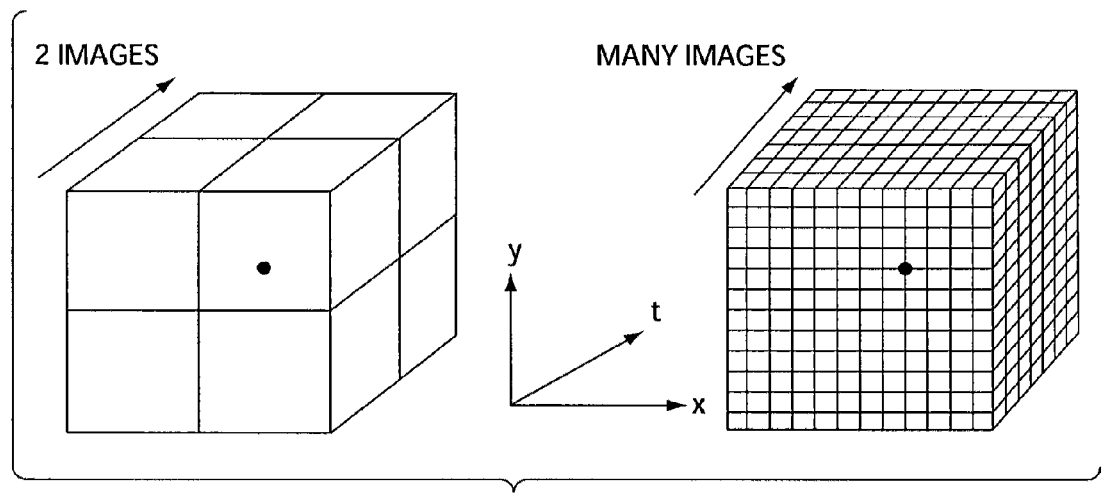
FIG. 21 illustrates a schematic showing where exactly in space-time velocities are calculated using gradient based optical flow techniques.

By considering the determination of optical flow as a signal processing problem, it can be seen that the accuracy of the method comes down to choosing good derivative and interpolating filters. In the two image case discussed above, two point derivative and interpolating filters are used. When applied to the optical flow problem, these 2 point derivative and interpolating filters calculate the velocity of a point at the center of a 2 pixel×2 pixel×2 image spatio-temporal cube. By using multiple images, filters with larger regions of support can be used, exponentially increasing their accuracy. If these longer derivative and interpolating filters have a length N, their application to the optical flow problem results in the calculation of the velocity at the center of a N pixel×N pixel×N image cube (see FIG. 21). FIG. 21 illustrates a schematic showing where exactly in space-time velocities are calculated using gradient based optical flow techniques. On the left, 2 point derivative and interpolating filters estimate the velocity at the center of a 2 pixel×2 pixel×2 image cube (red dot). On the right, N point derivative and interpolating filters estimate the velocity at the center of a N pixel×N pixel×N image cube.

Figure 22A:
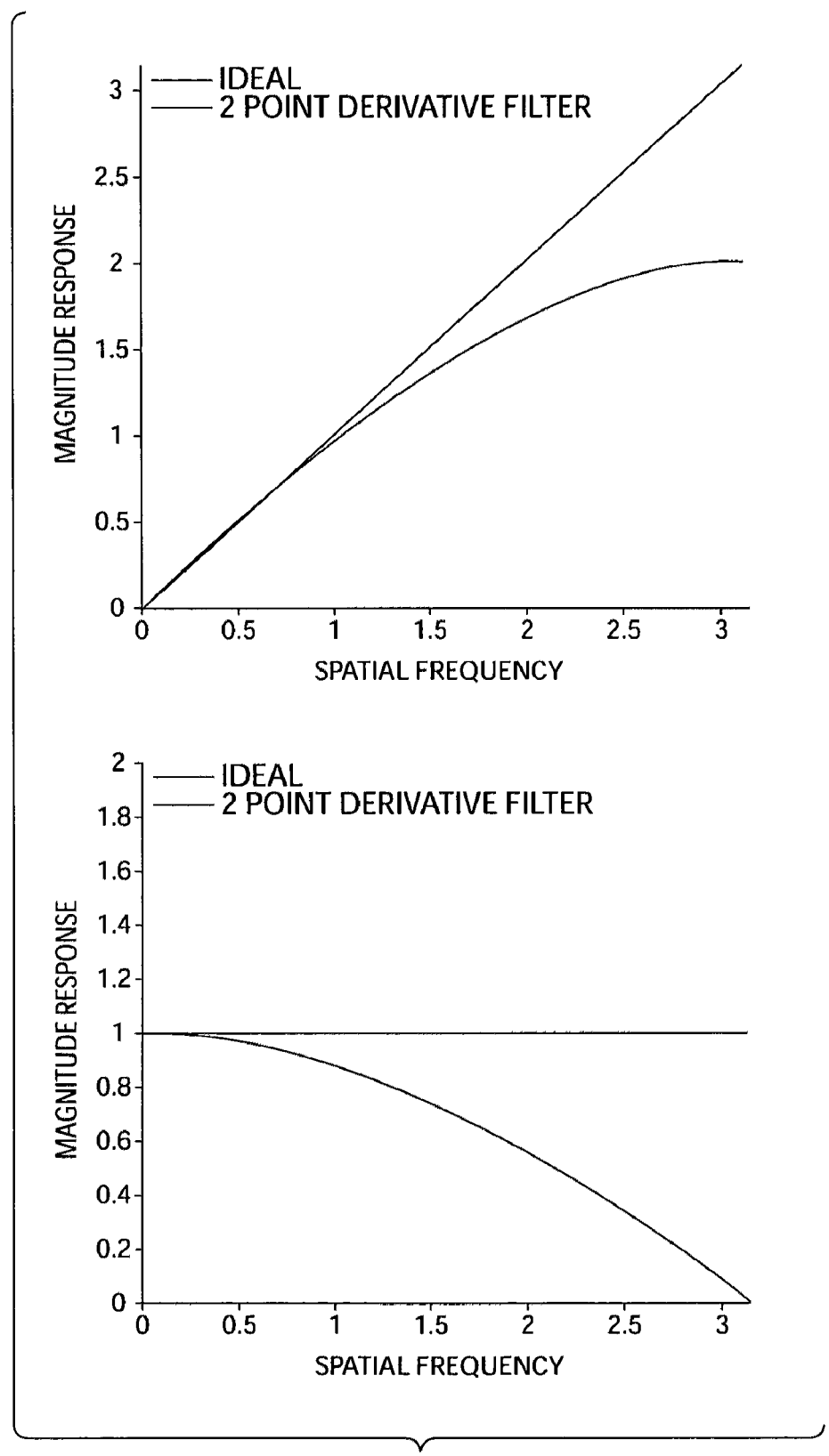
FIG. 22A illustrates plots of the magnitude response of the 2 point gradient filter (on the left) and interpolation filter (on the right), along with the ideal response for each.
Figure 22B:
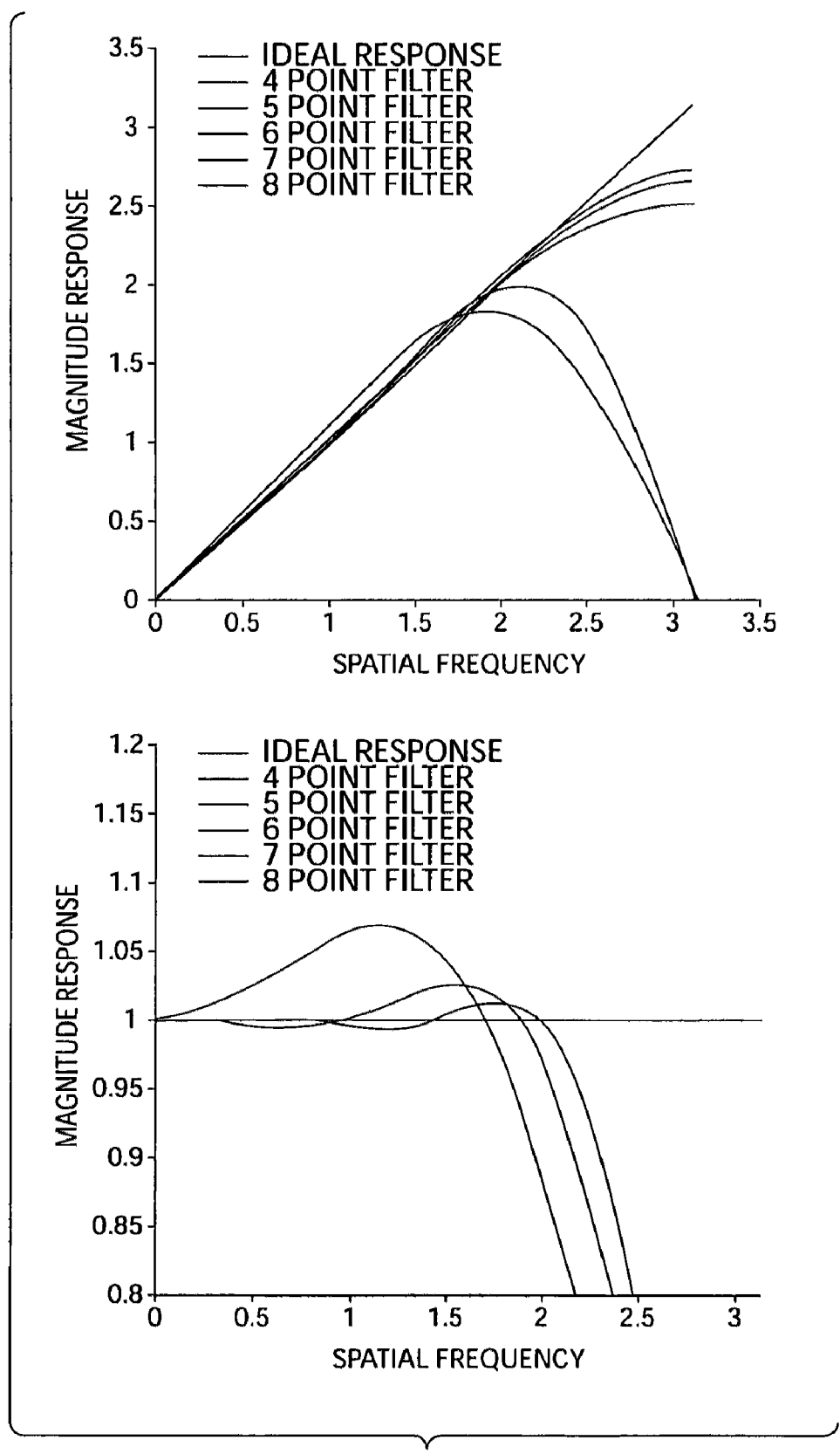
FIG. 22B illustrates plots of the magnitude response of several multipoint gradient filters (on the left) and interpolation filters (on the right), along with the ideal response for each.

An ideal derivative filter has a frequency response whose magnitude for all spatial frequencies is equal to the frequency itself, ω. An ideal interpolating filter, meanwhile, has a frequency response whose magnitude is equal to 1 for all frequencies. In FIGS. 22A and 22B, the magnitude response of the two point derivative filter, [−1, 1] and the two point interpolating filter, [½, ½], is plotted. It can easily be seen that these simple filters deviate increasingly from ideal behavior as the spatial frequency of the image is increased. The poor high frequency performance of these filters as shown in FIG. 22A therefore explains the previously described bias experienced by gradient based methods using only two images. In contrast, the use of more than two images allows the use of longer derivative and interpolating filters. In FIG. 22B, the magnitude response for filters of varying lengths is plotted as a function of spatial frequency. It can be seen that as the filter length is increased, the deviation from ideal performance decreases. The increased accuracy compared to the two point filters is especially noticeable.

The calculation of multi-point, one dimensional derivative and interpolation filters can be performed using the Parks-McClellan algorithm. This well-known algorithm takes in as input a desired filter response, $H_d(w)$, the desired length of the finite impulse response filter (FIR), and a weighting function, $W(w)$, which represents the relative importance of the filter error as a function of frequency. The algorithm determines the filter, $H_{calc}(w)$, that minimizes the maximum of the absolute value of the weighted error, $E(w)$, given by $$|E(w)|=|W(w)[H_d(w)-H_{calc}(w)]| \quad (3.18)$$

To minimize this error, the algorithm creates a filter whose error oscillates from positive to negative with equal weighted amplitude.

Improved tracking performance can be achieved by optimizing the spatial derivative and interpolation filters together. Instead of minimizing the Parks-McClellan error for each filter individually, the error of the ratio of the derivative and interpolation filters is minimized. In this way, a small error in the spatial derivative filter can be compensated by an opposite error in the spatial interpolation filter. This minimization can be performed using the simplex method, and can be initialized using the filters obtained using the Parks-McClellan algorithm. Though this modified approach can improve the performance of the spatial filters, the same technique cannot be used on the temporal filters. This is due to the fact that changing the spatial filters modifies the images without affecting the apparent motion, whereas changing the temporal filters does change the target's apparent motion.

For periodic motions of the target, an improvement in the temporal filters can be obtained by noting that changes in brightness are periodic and consist of a linear combination of a fundamental frequency and its harmonics. Therefore, temporal filters must only be accurate in a small region surrounding those frequencies. For example, if there are eight images per cycle, the important frequencies are pi/4, pi/2, 3*pi/4, and pi, where pi is the Nyquist frequency.

As has been mentioned previously, the goal of this operating mode is to generate 3D surface models of targets in "real time", which we define as refreshing the 3D model in less than 30 msec. Due to this speed constraint, only two images are used to generate the 3D data, and the AWS sampling positions are chosen to be diametrically opposed on the sampling circle so as to maximize depth sensitivity. As discussed above, this operating regime is equivalent to operating a compact stereo system with a small baseline. As was also mentioned above, the experimental setup using the Dalsa CA-D-1024A camera and the Nikkor 50 mm lens can image a ~20×20×20 cm volume of space onto the CCD plane with a disparity range of approximately 0-10 pixels.

Figure 23:
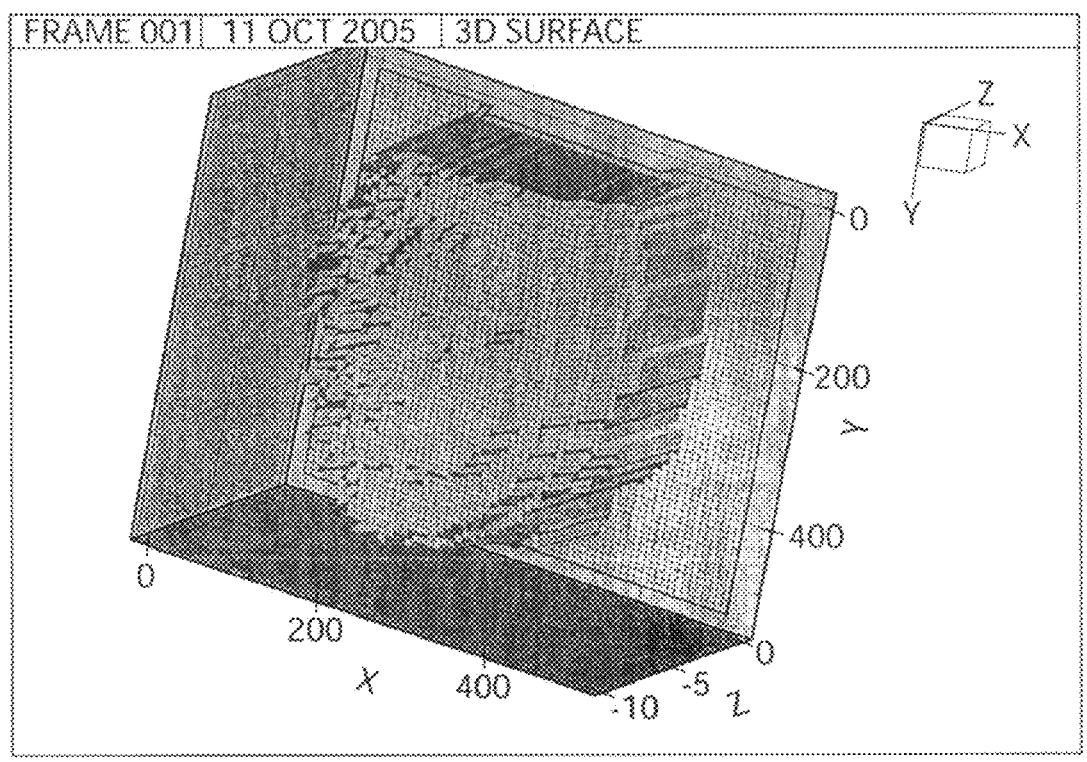
FIG. 23 illustrates integer pixel resolution 3D surface model of a human sized mannequin head.

This disparity range is clearly too large to rely solely on algorithms whose accuracy breaks down for displacements greater than one pixel, but is also too small to rely solely on algorithms that can only calculate the displacement to within 1 pixel precision (this precision would appear too coarse, as shown in FIG. 23). FIG. 23 illustrates integer pixel resolution 3D surface model of a human sized mannequin head. All dimensions are in pixels, and it can be seen that the depth range is ~0-10 pixels.

The approach taken here is to break the calculation down into two steps: first the integer pixel displacement is calculated, and then the images are warped by the integer pixel amount so that any remaining disparity is necessarily subpixel. This remaining subpixel displacement is then calculated, and finally the sum of the integer and subpixel displacements is taken to be the total disparity. Both the integer and subpixel displacement calculations and taking into account any image brightness variations are discussed in detail below. The optimization of the projected pattern and how the pattern and disparity algorithm can be fine tuned to each other will also be discussed below.

The test system's approximately 10 pixel disparity range suggests the use of a block matching type algorithm to find the integer displacement, since this kind of algorithm has been found to be robust in finding large integer pixel displacements. A gradient based optical flow approach could also be used, but this would require repeatedly downsampling the image until the displacement is reduced to being subpixel, and then repeatedly distorting the image, upsampling, and reprocessing until the original image resolution is returned. This laborious process can quickly become computationally expensive. Instead, the approach used here is to perform a compressed image correlation step. This approach works well with the relatively short disparity ranges found in the experimental setup, and image compression ratios up to about 5:1 have been used successfully. Increased performance is also possible due to the fact that motion between the left and right images is known to be essentially horizontal. This fact reduces the size of the correlation table to that of a correlation "strip", since the vertical motion can be assumed to be near zero. Under these conditions, the compressed image correlation approach has been shown to be faster than FFT based correlation methods. Indeed, processing times for the compressed correlation step performed on 512×512 images using 8×8 pixel interrogation areas have been measured to be approximately 15-20 milliseconds on an Intel Pentium IV 1 GHz desktop computer.

As was mentioned above, the major weakness of block matching algorithms is the fact that they can only calculate integer displacements and are therefore limited by the resolution of the grid. Without performing any interpolation on the image, this means that these algorithms can only calculate the displacement to within one pixel precision. With block matching algorithms, one way to calculate the subpixel component of the disparity is to first interpolate the image onto a finer grid. The higher the desired precision of the estimate, the finer the required grid and the higher the computational cost. A less computationally expensive approach previously described is to fit a Gaussian curve or a bi-linear approximation to the correlation table peak, and use its real valued peak location as an estimate for the subpixel displacement. However, it has been found that this subpixel calculation approach is only accurate to approximately 0.05-0.1 pixels, and that this level of accuracy is not high enough to create smooth 3D surface models.

Figure 24A:
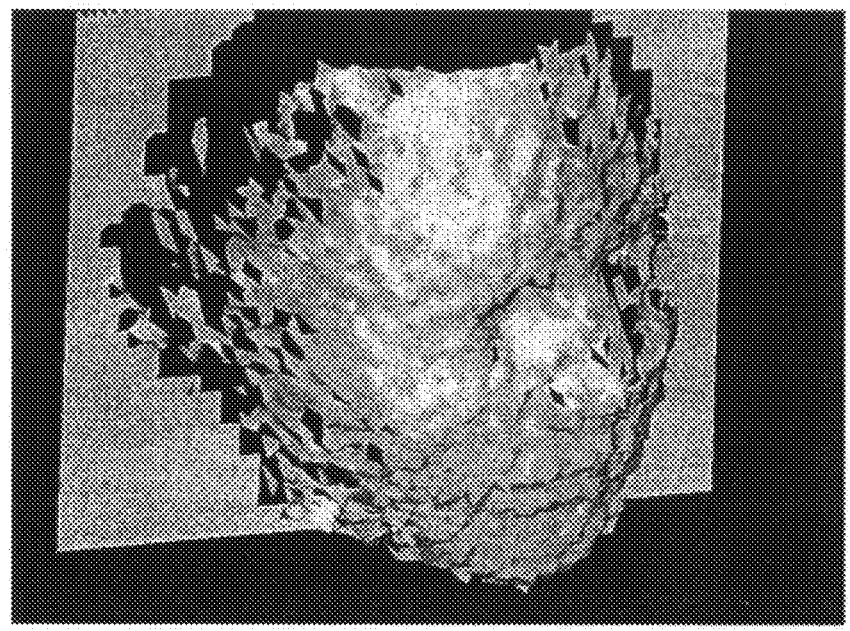
FIG. 24A illustrates a 3D surface model generated by fitting a Gaussian curve to the correlation plane in order to find the subpixel displacement.
Figure 24B:
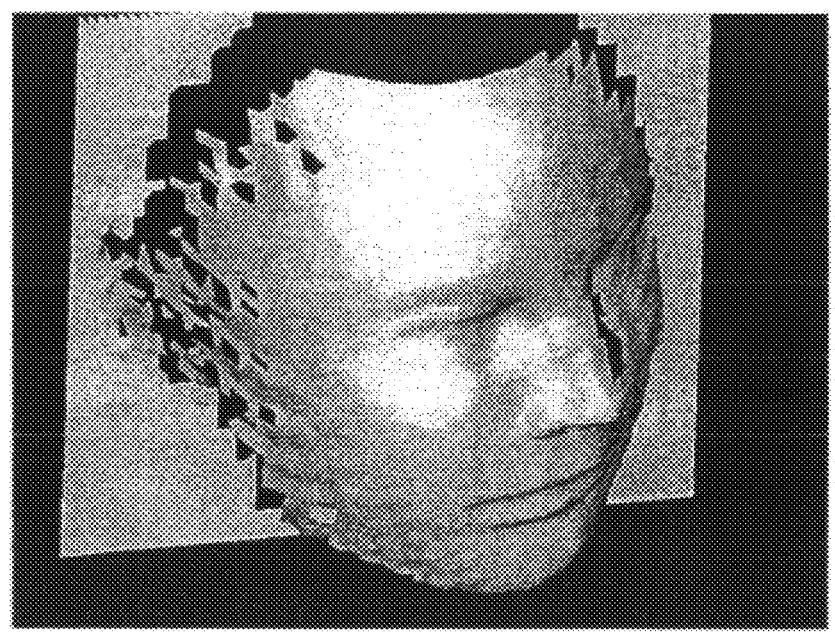
FIG. 24B illustrates a 3D surface model generated by warping the image by the integer pixel displacement, then calculating the remaining subpixel displacement with the LBC gradient optical flow technique.

In order to improve this accuracy, a gradient based optical flow approach has been implemented for the subpixel displacement calculation. First, the interrogation area from the right image is shifted in space by the integer displacement calculated using compressed image correlation, so that the right image interrogation area "overlaps" its position in the left image. Now that the interrogation areas overlap, any remaining displacement is necessarily smaller than one pixel. Gradient based optical flow techniques such as the Linear Bias Compensation (LBC) approach may be used to estimate this remaining subpixel displacement, and much smoother 3D surface models can be achieved. A comparison of the 3D surface models obtained by using a Gaussian fit of the correlation table and optical flow techniques to find the subpixel displacement can be seen in FIGS. 24A and 24B. Clearly, better performance is obtained using the latter technique. FIG. 24A is a 3D surface model generated by fitting a Gaussian curve to the correlation plane in order to find the subpixel displacement. FIG. 24B is a 3D surface model generated by warping the image by the integer pixel displacement, then calculating the remaining subpixel displacement with the LBC gradient optical flow technique. Both models were generated from the exact same image data.

Figure 25A:
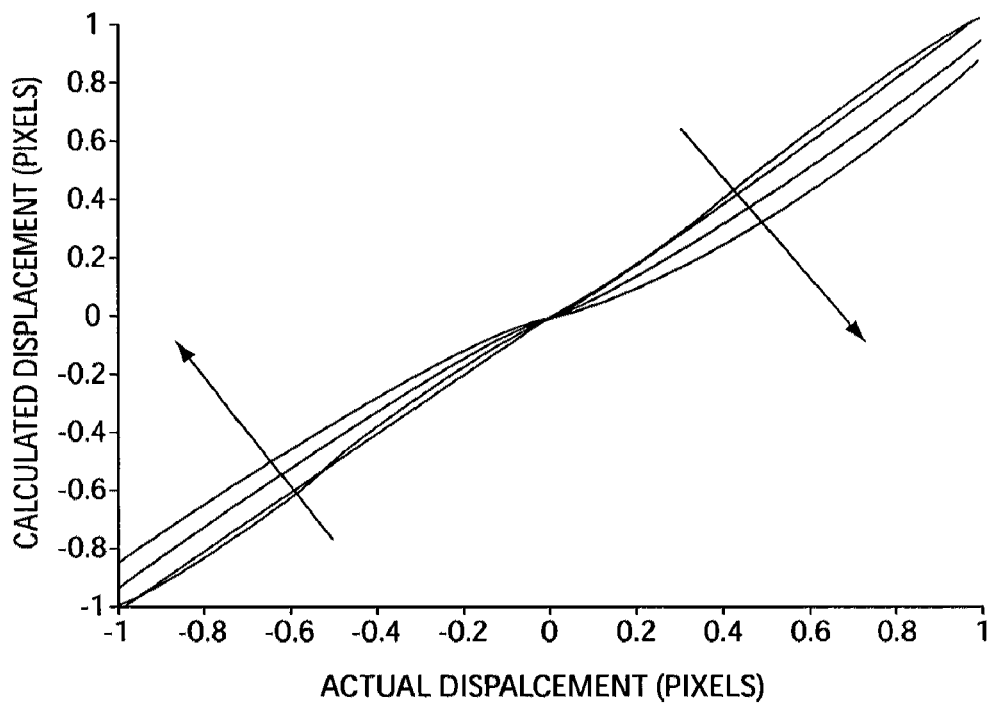
FIG. 25A illustrates the effect of increasing illumination offset on accuracy of gradient optical flow calculation.
Figure 25B:
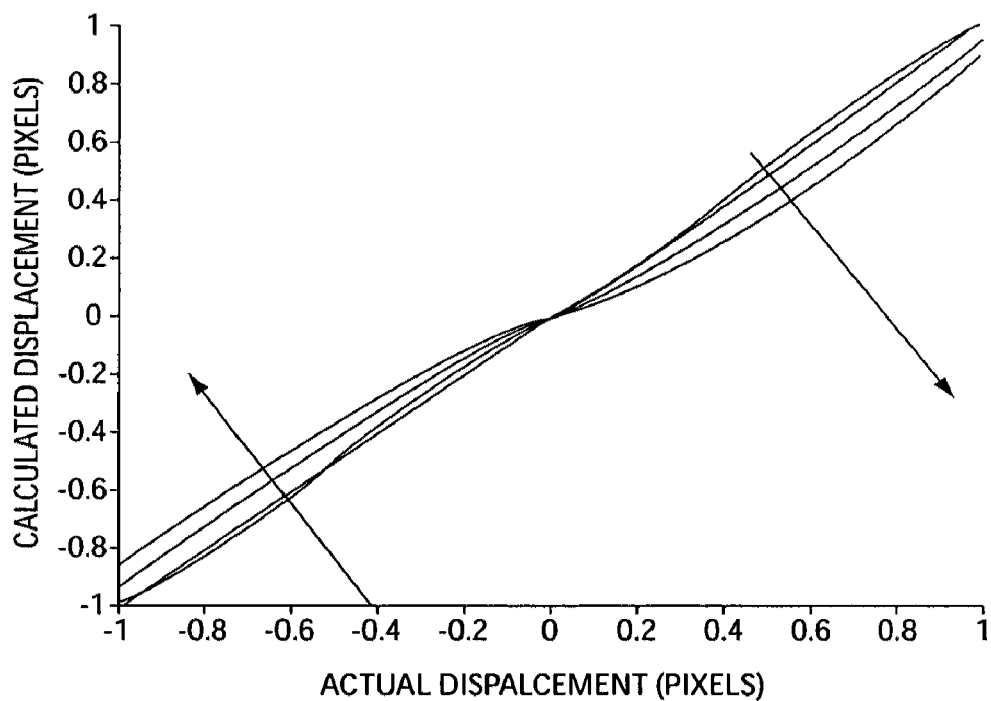
FIG. 25B illustrates the effect of increasing illumination gain on accuracy of gradient optical flow calculation.

It was shown in the foregoing that gradient optical flow techniques are more accurate at determining subpixel displacement than fitting a Gaussian curve on a correlation plane. However, using the constant brightness equation to solve for the subpixel velocity components can only result in accurate estimates if there is little to no illumination variation between the images. If the brightness of the target changes between the left and the right images, the resulting 3D model will be less accurate. The magnitude of this effect can be modeled synthetically by adding a gain and an offset to the intensity of the second image, and the result is shown in FIG. 25. FIG. 25A illustrates the effect of increasing illumination offset on accuracy of gradient optical flow calculation. Offsets used were 0, 40 and 80 pixels of brightness. FIG. 25B illustrates effect of increasing illumination gain on accuracy of gradient optical flow calculation. Gains used were 1, 1.2, 1.4, and 1.6. The spatial frequency for all experiments was 2, and the arrows indicate directions of increasing illumination offset or gain. The data here was generated identically to that generated in FIG. 18, except that the second image's intensity was modified by a gain C1 and an offset C2 as follows:

$$I_1(x) = A \sin(\omega x)$$

$$I_2(x) = C_1 * A \sin(\omega x + d) + C_2 \quad (3.19)$$

Clearly, the above figures show that the accuracy of gradient optical flow methods can fall off dramatically if intensity variations as small as 10% occur between the images. One way to attenuate this problem is to incorporate variables representing an intensity gain and offset into the optical flow approach. For example, if one assumes that the velocities are constant over a given interrogation area, then the following linear system can be derived:

$$\begin{pmatrix} u \\ v \\ C_1 \\ C_2 \end{pmatrix} = - \begin{pmatrix} \sum I_x I_x & \sum I_x I_y & -\sum I_x I & -\sum I_x \\ \sum I_x I_y & \sum I_y I_y & -\sum I_y I & -\sum I_y \\ -\sum I_x I & -\sum I_y I & \sum I^2 & \sum I \\ -\sum I_x & -\sum I_y & \sum I & I \end{pmatrix}^{-1} \begin{pmatrix} -\sum I_t I_x \\ -\sum I_t I_y \\ -\sum I_t I \\ -\sum I_t \end{pmatrix} \quad (3.20)$$

Figure 26:
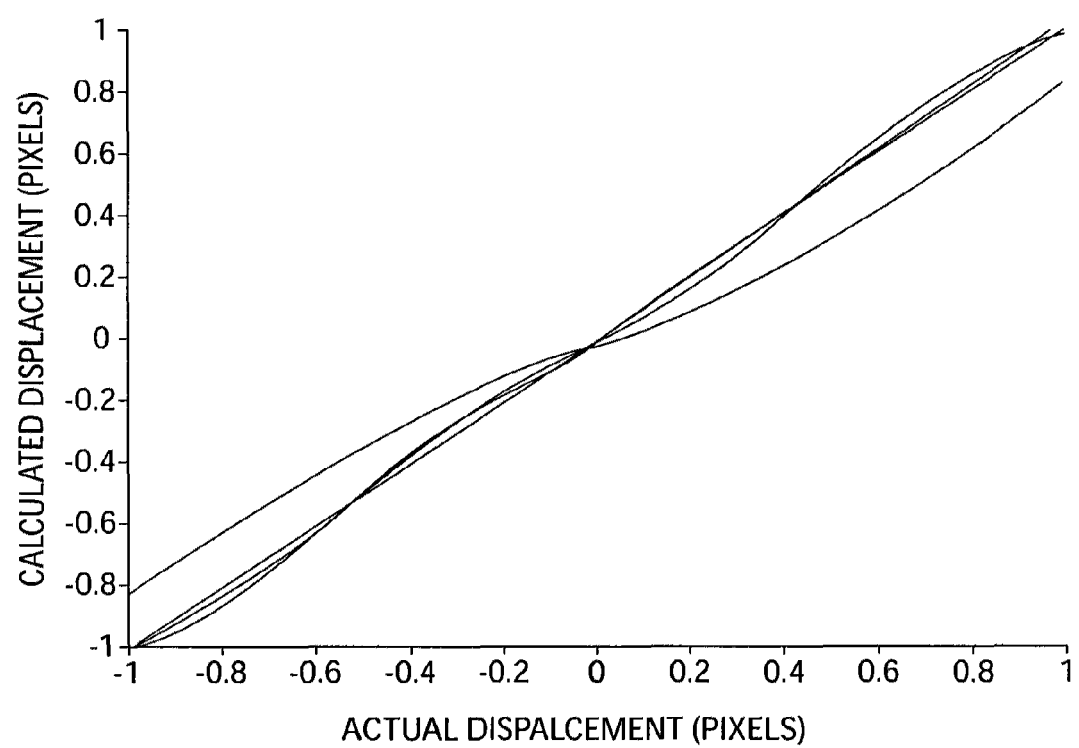
FIG. 26 is a plot showing the performance gain achievable by using the gain and offset illumination compensation model.

Since there are now four unknowns in this system, the minimum size of the interrogation area over which the sums are calculated is larger than in the calculation where intensity is assumed to be constant. In practice, the interrogation area size can be reduced to about 4×4 pixels. The use of this illumination compensation model can be combined with the Linear Bias Compensation discussed above by using it to estimate the different displacements required by LBC. The effect of using this illumination compensation model in the LBC implementation can be seen in FIG. 26, which shows the calculated displacement for the cases where there is no illumination variation, where there is uncompensated illumination variation, and finally where the illumination variation is compensated for. The standard optical flow algorithm (red line) is unable to compensate for the illumination variation in the images. The illumination compensated algorithm performs much better (light blue line), and almost achieves the same performance as the standard algorithm operating on ideal images with equal brightness (green line).

Figure 27A:
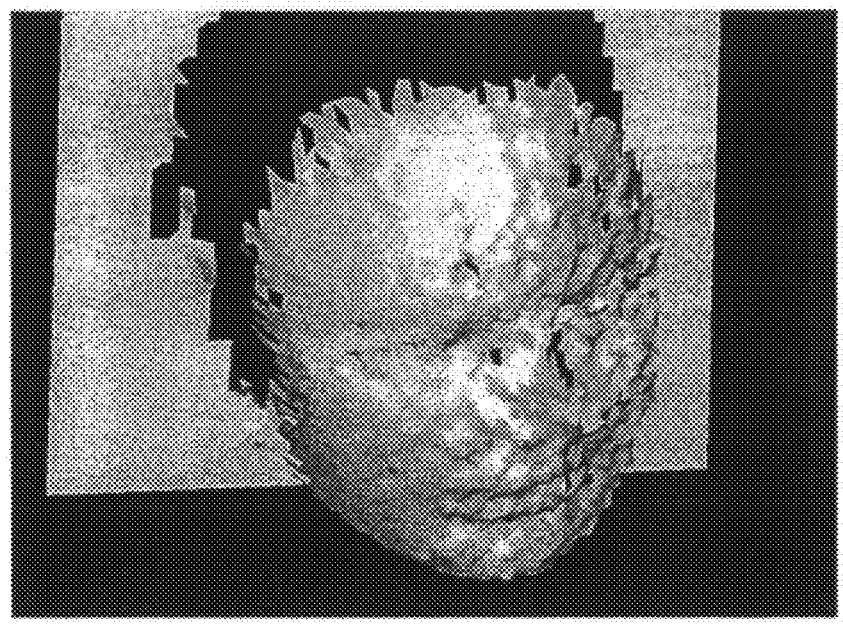
FIG. 27A illustrates a 3D surface model generated with standard LBC gradient optical flow algorithm calculating the subpixel displacement.
Figure 27B:
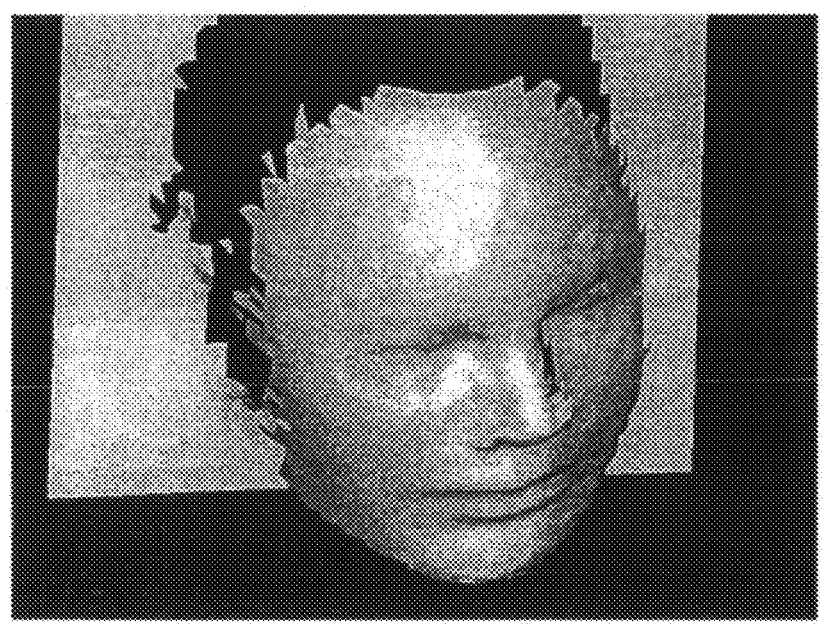
FIG. 27B illustrates a 3D surface model generated with illumination variation compensated LBC gradient optical flow algorithm.

Though this figure shows that the illumination compensated result is not quite as good as the result where there is no illumination variation between the images, the compensated result still removes most of the error shown by the uncompensated model. The effectiveness of using an illumination compensated LBC algorithm for the subpixel part of the displacement calculation can be seen in FIGS. 27A and 27B, which shows the calculated 3D surface model of a mannequin head for the cases with and without illumination compensation. FIG. 27A illustrates a 3D surface model generated with standard LBC gradient optical flow algorithm calculating the subpixel displacement. FIG. 27B illustrates a 3D surface model generated with illumination variation compensated LBC gradient optical flow algorithm. Both 3D surfaces were generated using the same image data. The target is a human sized mannequin head. Clearly, the use of the illumination compensated model results in a much smoother and less noisy result.

Projecting a pattern onto the target has the effect of increasing the signal to noise ratio and improving the robustness and the accuracy of the calculated 3D surface model. With an understanding of the algorithms used to calculate feature displacement from one image to the next, it is possible to give guidelines on what kind of projected patter should be used to maximize performance.

From the discussions above, the most important image characteristic affecting the subpixel algorithm performance is the spatial frequency. As is shown in FIG. 19, increasing the spatial frequency of the image increases the bias in the optical flow estimate. Conversely, decreasing the spatial frequency reduces the bias and increases the estimate accuracy. This latter trend is limited by noise in the image, however, so that in effect there is a minimum spatial frequency below which performance is degraded. Indeed, as the spatial wavelength is increased, the actual spatial gradients become smaller and any noise due to quantization error, shot noise, readout noise and dark current becomes more and more important.

Figure 28:
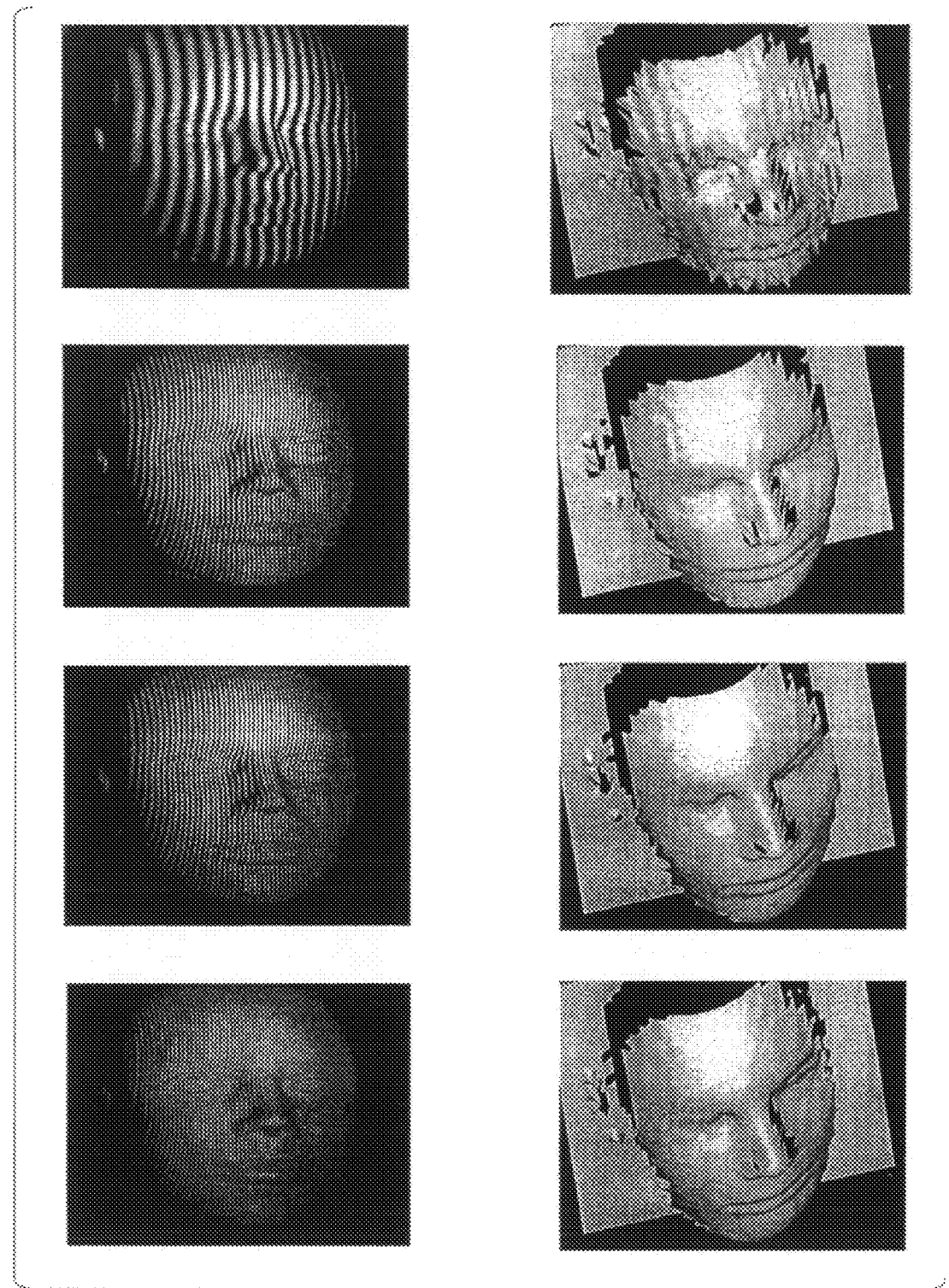
FIG. 28 illustrates the effect of projected pattern spatial frequency.

The existence of a lower limit on the projected pattern's spatial frequency can be seen in FIG. 28, which shows the resulting 3D surface model as the sinusoidal pattern's wavelength is increased. From top to bottom, the spatial frequency of the image is approximately 0.2, 0.4, 0.6, and 0.8. The images' size is 512×512 pixels, and the interrogation areas used measured 8×8 pixels. FIG. 28 also suggests that the spatial frequency should be maintained at approximately 0.8.

In order to minimize the effect of the frequency bias on the calculated surface models, a projected image consisting of a sinusoidal intensity pattern in the horizontal direction was selected. The pattern intensity is designed to vary only in the x direction since for the present case where only two horizontally opposed aperture positions are used all target feature movement on the image plane is horizontal. Furthermore, this pattern design maximizes the signal power in the x direction, reducing the effect of noise on the calculations.

Further improvements in the 3D surface model can also be obtained by capturing several image pairs with phase-shifted sinusoidal projection patterns. The advantage from acquiring an image pair, then shifting the sinusoidal projection pattern, then acquiring another image pair, etc. . . . , and finally averaging the results from all the image pairs comes from the fact that all target features get illuminated with maximum brightness in at least one of the image pairs. Since the signal to noise ratio rises as the square root of brightness intensity, insuring that all parts of the target are illuminated by the bright part of the sinusoidal pattern in at least one image pair increases the quality of the 3D model.

With the use of a sinusoidal intensity projection pattern, it is possible to speed up the overall tracking algorithm by modifying the integer displacement calculation step. As was mentioned above, the general approach developed in this work is to use correlation based block matching to find the integer displacement of each interrogation area, followed by gradient optical flow methods to find the subpixel displacement. The striped projection pattern, however, makes it easy to calculate the integer displacement by "counting stripes".

This process first involves finding the correspondence of one or more interrogation areas in the left and right images. These interrogation areas can be larger than normal (16×16 pixels, say) as the displacement estimation is only required to have pixel precision. Using these interrogation areas as anchors, it is a simple matter to count stripes out to the right and the left of the anchor position, for both the left and the right images. The counting of the stripes is achieved by moving horizontally across the image and setting the position of a stripe to the location where there is an intensity slope change from positive to negative and the intensity value is above a given threshold. As long as the projected pattern on the target image is well defined and of high contrast, this criterion is very effective. Since the anchor positions are known in both the left and right images, any stripe (say the $13^{th}$ stripe to the right of the anchor IA) is also be known in both images.

Figure 29:
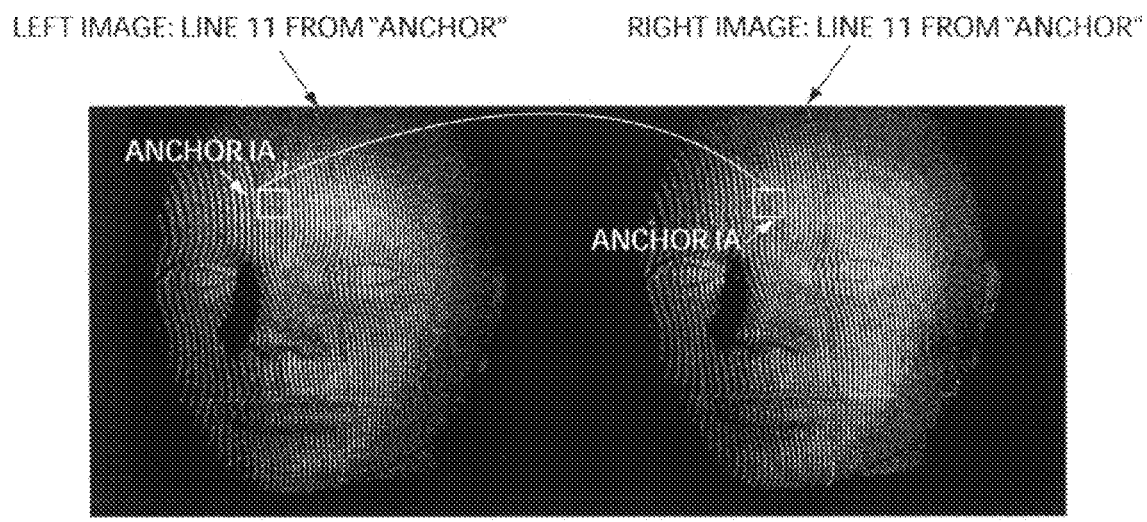
FIG. 29 illustrates a schematic of stripe-counting algorithm.

Once the stripes have been counted out to the right and to the left, each stripe can be followed in the up and down directions by following the pixels with the highest intensity values. Once all the stripes' pixels have been accounted for in this way, calculating the integer displacement of any interrogation area in the image is just a question of taking the average of the difference between the position of corresponding left and right image stripes that pass within the IA's region. This approach can be seen in FIG. 29. In this approach, the disparity of an "anchor" interrogation area is calculated using correlation, and stripes are then counted using the anchor IA as a base in both the left and right images. Stripes having the same number in the left and right image therefore correspond to each other, and the integer displacement of all interrogation areas traversed by the stripes can then be found. Subpixel displacements are then calculated using derivative optical flow techniques.

Even though it is seemingly more complex than the block matching approach, the above algorithm is approximately 50% faster at finding the integer displacement estimate. This speed is due to the limited number of IA correlation searches performed (typically one or two), and to the fact that most of the processing involves only pixel value comparison (whether it be during the horizontal scan looking for stripe positions, or the vertical traveling along the stripe intensity ridge).

Inevitable problems with the stripe tracking approach include the occlusion of a stripe that is visible in the left image, but not in the right (or vice-versa). Another issue to be aware of is the possibility of aliasing in both the anchor determining step, as well as in the later stripe counting and stripe tracking steps. For the anchor determination step, aliasing can be minimized by choosing a larger interrogation area (16×16 say), which increases the probability of finding the correct integer precision displacement. Furthermore, choosing a projection pattern whose wavelength is less than the maximum displacement range of the target will insure that a stripe in the left image is not matched to its neighboring stripe in the right image.

Figure 30:
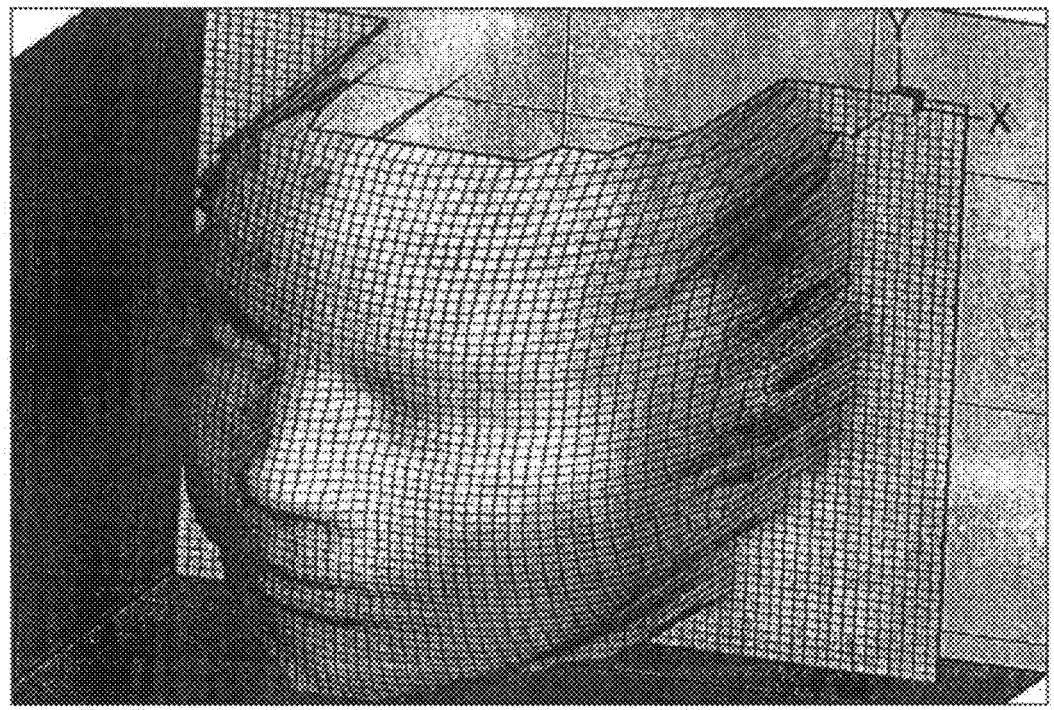
FIG. 30 illustrates a 3D surface model was generated from a single pair of 512×512 pixel images, using 8×8 pixel interrogation areas.

A typical result using the two sampling position algorithm developed herein can be seen in FIG. 30. This 3D surface model was generated from a single pair of 512×512 pixel images, using 8×8 pixel interrogation areas. A sinusoidal projection pattern was used, and the processing time was less than 20 milliseconds on a Pentium IV 1 GHz computer. A first way to use more than two horizontally opposed AWS sampling positions in order to achieve more accurate results will be discussed in further detail below. This first approach involves a straightforward extension of the illumination compensated, LBC gradient based, two image approach discussed above to an operating regime where a circular array of aperture sampling positions is used. The performance advantages of using a circular sampling array will be discussed, both from a 3D model quality and computational complexity standpoint.

Figure 31A:
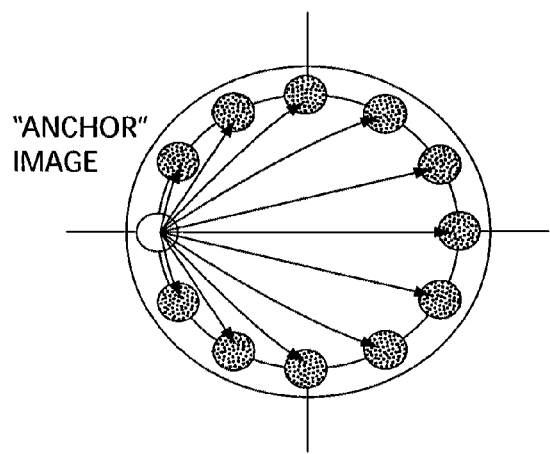
FIG. 31A illustrates a schematics schematic of extension of pair-wise processing algorithm to multiple images.
Figure 31B:
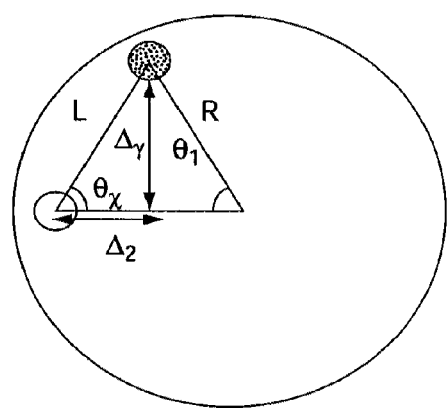
FIG. 31B illustrates schematic showing the geometry underlying the calculation of the rotation radius based on each individual result.

In this approach, the first image (typically located at the 9 o'clock position on the sampling circle) is defined as the "anchor image" and is divided up into a grid of interrogation areas. As the aperture is rotated and each subsequent image is acquired, the two image algorithm described in above is performed on the anchor image and the newly acquired image. For each image acquired after the original anchor image, an x and y direction disparity is therefore calculated for each IA. This set of disparities must then be processed in order to estimate the rotation diameter of each interrogation area. By using simple geometric considerations, and knowing the angular separation between sampling positions, the best fit (in the least squares sense) sampling circle radius for each interrogation area in the anchor image can be found (see FIGS. 31A and 31B). FIG. 31A illustrates a schematics schematic of extension of pair-wise processing algorithm to multiple images. An "anchor" image is chosen as the reference, and pair-wise processing is performed between it and the images captured at other sampling positions. FIG. 31B illustrates schematic showing the geometry underlying the calculation of the rotation radius based on each individual result.

First, we begin by defining for each image pair analyzed the angle $\theta_2$, which is just the motion direction of that image pair, and is defined by the x and y component of motion ($\Delta x$, $\Delta y$)

$$\theta_2 = \tan^{-1}\left(\frac{\Delta y}{\Delta x}\right)$$

Next, the cosine law is used to calculate what the motion radius R is in terms of the motion distance L and the angle separating the two images, $\theta_1$ $$L^2 = 2R^2 - 2R^2\cos\theta_1$$

$$R = \frac{L}{\sqrt{2(1-\cos\theta_1)}}$$

The distance L can also be expressed in terms of the x and y components of motion, and the angle $\theta_2$ as follows:

$$L = \frac{\Delta x}{\cos\theta_2}$$

$$L = \frac{\Delta y}{\sin\theta_2}$$

Finally, the following overdetermined set of equations can be set up and solved for R:

$$\begin{bmatrix} \sqrt{2(1-\cos\theta_1)}\cos\theta_2 \\ \sqrt{2(1-\cos\theta_1)}\sin\theta_2 \end{bmatrix} \cdot R = \begin{bmatrix} \Delta x \\ \Delta y \end{bmatrix}$$

Note that if N sampling positions are used and N images are acquired, then N−1 image pairs can be processed and an over-determined system composed of 2(N−1) equations can be solved for R.

Figure 32:
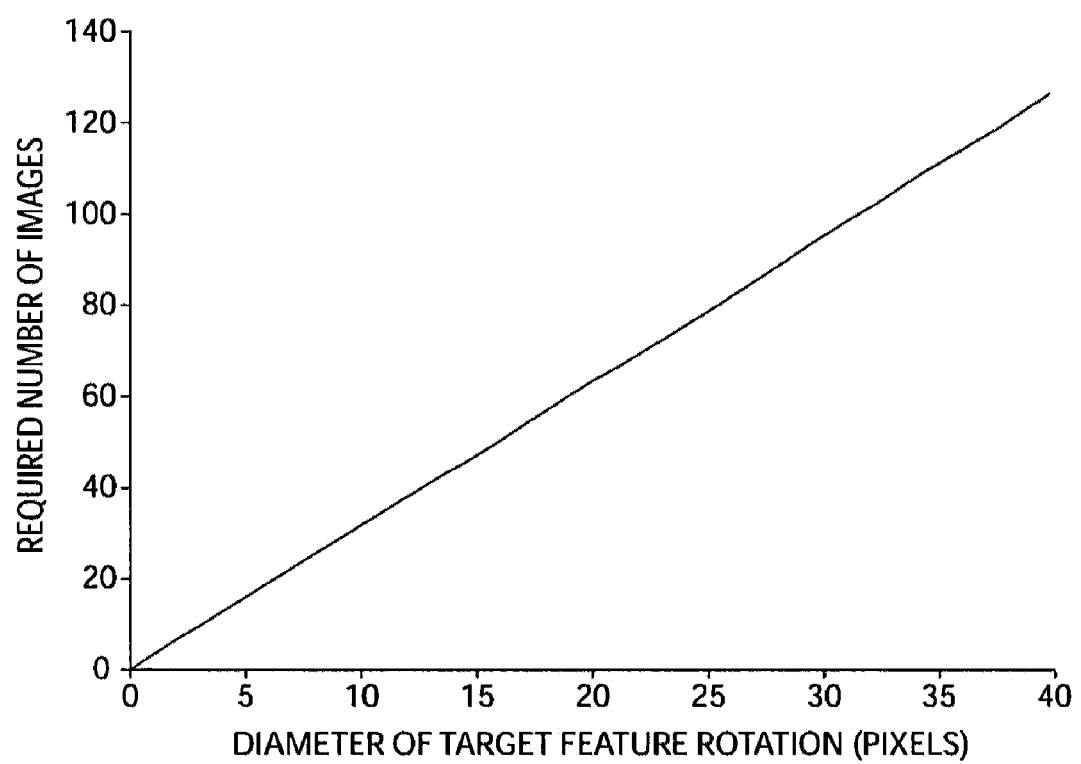
FIG. 32 illustrates a plot showing the number of equally spaced images that according to some experiments are required to insure subpixel motion between the first and second image sampled, as a function of the target feature's image rotation diameter.

The use of multiple images allows the simplification of the two image algorithm described above. Indeed, if enough AWS sampling positions are used, the disparity between the first anchor image and the second image can be reduced to being subpixel. When this is the case, the first half of the two image algorithm (consisting of the block matching processing used to find the integer displacement) can be eliminated, saving processing time. FIG. 32 illustrates a plot showing the number of equally spaced images that according to some experiments are required to insure subpixel motion between the first and second image sampled, as a function of the target feature's image rotation diameter.

Figure 35:
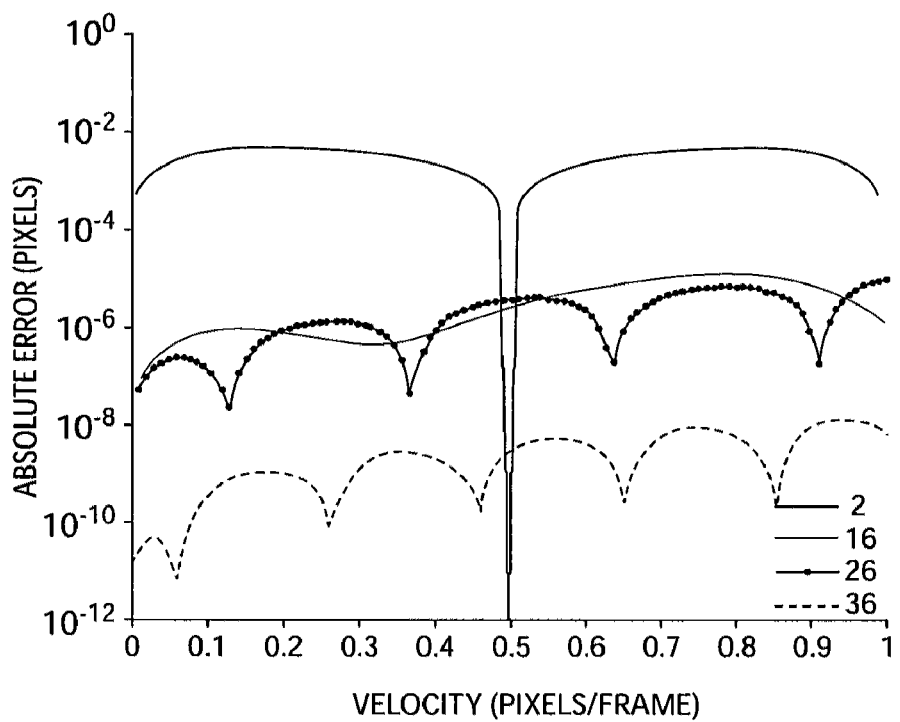
FIG. 35 illustrates the absolute value of the calculated velocity as a function of the actual velocity, using synthetic sinusoidal images having a spatial frequency of 0.8, for varying filter lengths.

It should be noted that the required number of images shown in FIG. 35 can be substantially reduced if the sampling interval is not uniform. For example, if the second image is sampled very close to the original image, an accurate enough rotation diameter estimate can be calculated to allow the third image to be sampled at a greater angular distance from the first.

Figure 33:
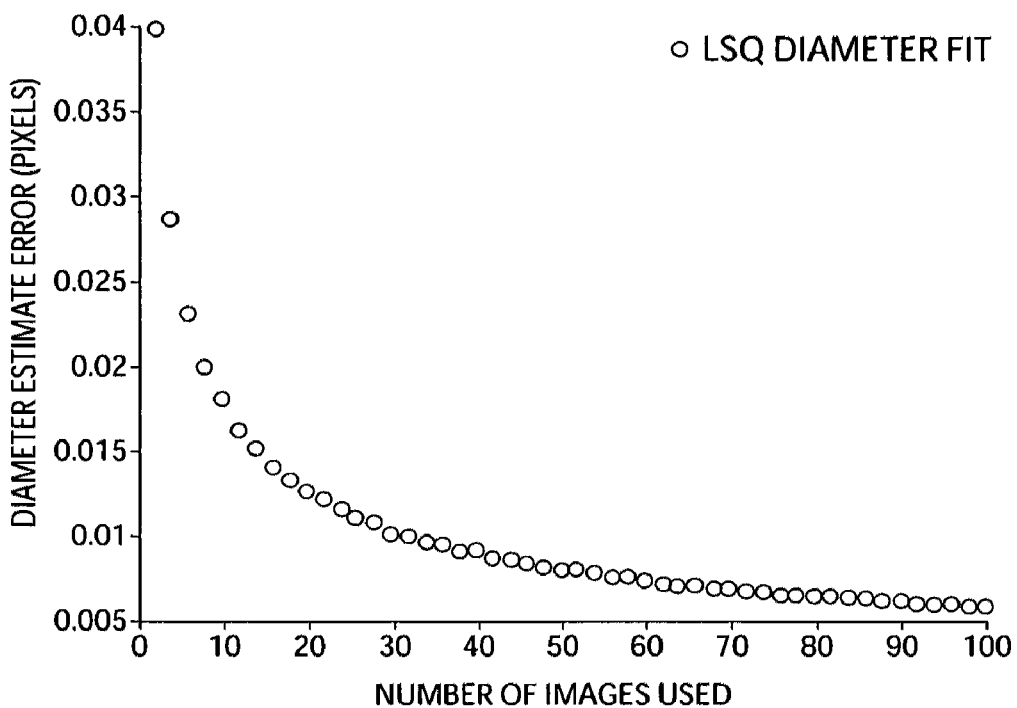
FIG. 33 illustrates diameter estimation error as a function of number of evenly spaced positions in the circular sampling array.
Figure 36:
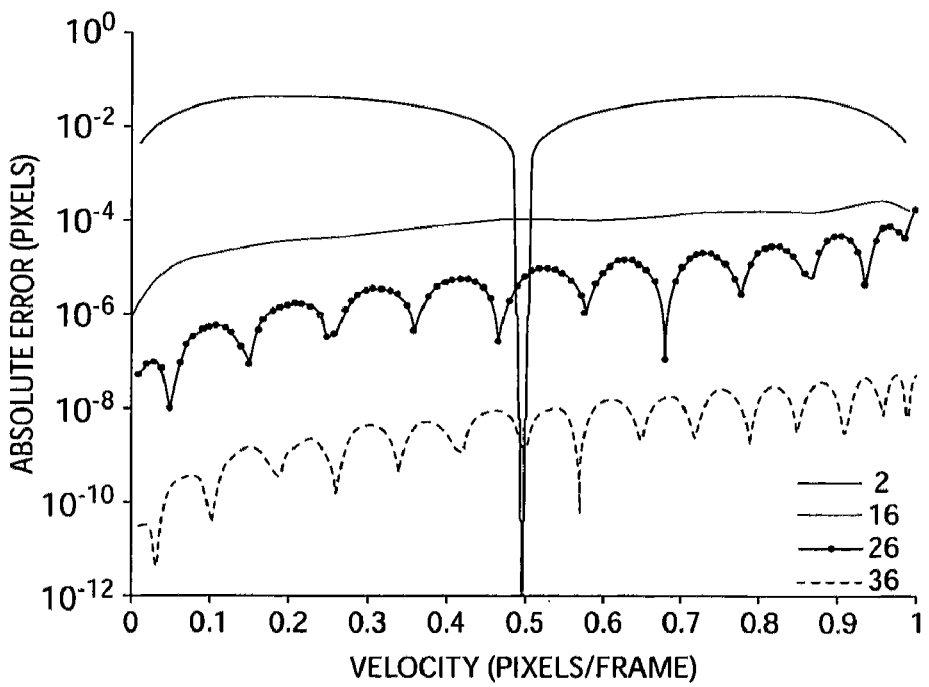
FIG. 36 illustrates the absolute value of the calculated velocity as a function of the actual velocity, using synthetic sinusoidal images having a spatial frequency of 2.0, for varying filter lengths.

The increased accuracy achievable by using multiple images sampled in a circular pattern can be seen in FIG. 36, where a plot of the diameter estimation error as a function of the number of AWS sampling positions is shown. This figure was generated synthetically by first calculating the expected position of an interrogation area on the image plane due to the given number of sampling positions. In this case the diameter of rotation on the image plane was chosen to be 8 pixels, which is typical for the AWS system. To each expected position was then added random noise sampled from a Gaussian distribution with zero mean and a standard deviation of 0.05 pixels (the approximate accuracy of the two image processing algorithm). This synthetically generated noisy data was then used to calculate a least squares fit circle diameter as discussed above. The results of 10,000 randomly generated data sets were averaged to produce the graph in FIG. 33, which illustrates diameter estimation error as a function of number of evenly spaced positions in the circular sampling array.

As can be seen from the plot, the addition of sampling points initially increases the accuracy of the diameter estimate dramatically, but this increase in accuracy eventually flattens out to the point where the addition of more sampling positions becomes less useful. Overall, it can be seen that the calculation error can be reduced by about a factor of four by using 30 sampling positions instead of just two.

Figure 34:
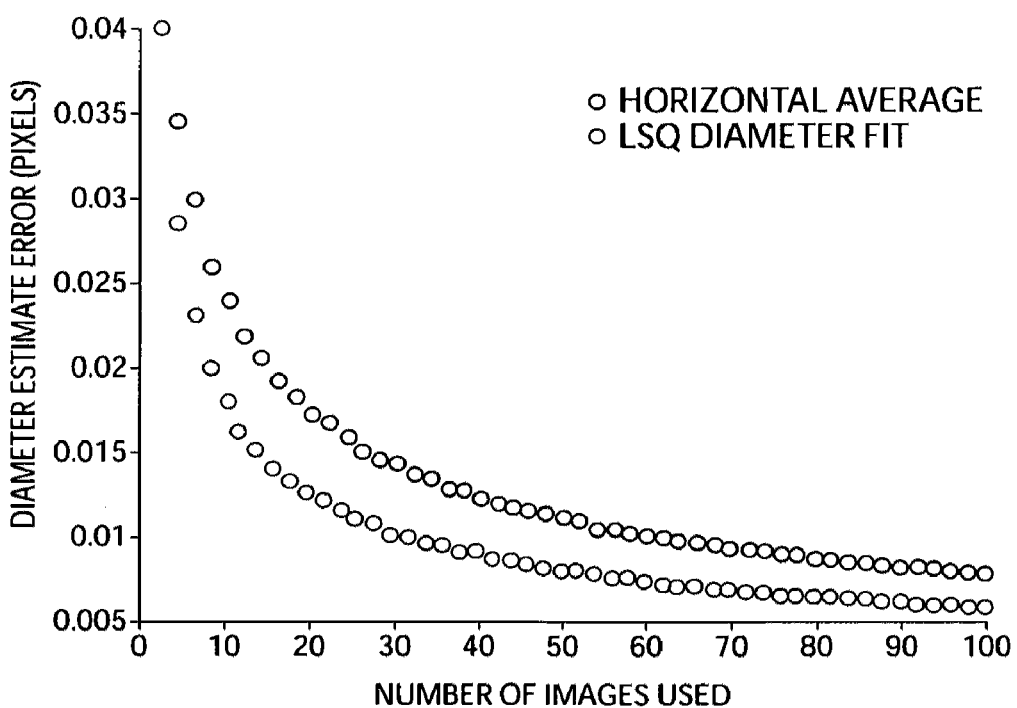
FIG. 34 illustrates diameter estimation error as a function of number of images processed.

It is also interesting to compare the accuracy of using multiple sampling positions arrayed in a circle to using only two horizontally opposed aperture positions, but taking more than just two images. The result of this comparison is shown in FIG. 34, where the estimate error is plotted as a function of the number of images taken. For the circular array, the number of images captured represents the number of sampling positions on the circle. For the horizontally opposed two aperture case, the number of images represents the number of image pairs (left/right) taken divided by two. It can be seen from the figure that using multiple image pairs captured from only two horizontally opposed sampling positions increases the estimate error by approximately a third relative to processing the same number of images captured in a circular sampling pattern.

There are two other advantages to capturing a given number of images in a circular sampling pattern instead of through only two apertures. The first is that by using a circular array, the subpixel displacement of the anchor interrogation area varies from one image to the next, so that any error due to frequency bias varies around the circle of images and may even cancel out. In the case of only two sampling positions, however, very similar subpixel displacement estimates are calculated for each image pair, so that any frequency bias present is reinforced.

The second advantage of the circular sampling array lies in the fact that the motion direction of each interrogation area in the anchor image varies from one image in the circular array to the next. Indeed, if a large number of sampling positions are used (>~10) the motion between the anchor image and the next image in the circle is almost vertical. In subsequent images, the motion between the anchor image and the just acquired image progressively becomes more horizontal. When the sampling position passes the horizontally opposed position, the motion direction again begins to increase its vertical component. This variability in the motion direction increases the robustness of the algorithm by mitigating any effects of the target intensity pattern on the measurement of spatial and temporal gradients. To explain this, one need only imagine the use of a horizontally oriented sinusoidal projection pattern captured by only two horizontally opposed sampling positions. Since the pattern has no intensity gradients in the x-direction, no feature movement would become apparent by capturing images at two horizontally opposed sampling positions. However, using more than two horizontally opposed sampling positions would clearly create an apparent movement of the target, as most of the anchor image/acquired image pairs would have a sizeable intensity gradient in the y direction.

In the foregoing, it was shown that the use of multiple images from different AWS sampling positions can increase the accuracy of the target feature depth estimate. However, the algorithm used in the foregoing still relies on processing the images in pairs, and only achieves a higher accuracy by fitting a best circle diameter in the least squares sense to the multiple data points. In contrast, the use of large spatiotemporal filters to actually improve the estimates of the gradients involved in the constant brightness equation (repeated here below), will be discussed:

$$\frac{\partial I(x, y, t)}{\partial t} + \frac{\partial I(x, y, t)}{\partial x}u + \frac{\partial I(x, y, t)}{\partial y}v = 0 \quad (3.9)$$

The effect of using longer filters to calculate the spatial and temporal gradients can again be quantified using a one dimensional sinusoidal intensity image moving uniformly in time, and applying various length filters to calculate the motion velocity (including the standard 2 point filters already discussed). The synthetic one-dimensional images are defined by:

$$I(x,t)=A \sin [\omega(x-dt)] \quad (3.20)$$

where A is the intensity brightness amplitude, d is the constant velocity value, $\omega$ is the spatial frequency, x is the spatial coordinate, and t is the temporal coordinate. The pixel intensities are here assumed to be ideal in the sense that no effects from noise are considered (ie: truncation noise, shot noise, etc. . . . ). Using even length derivative and interpolating filters, velocity estimates can be calculated at space-time points located half-way between pixels and half-way between image frames. FIGS. 35 and 3.23 show the result of such a velocity calculation, using filters with lengths ranging from 2 to 36, and with a spatial frequency of 0.8 and 2.0 respectively. In these figures, the absolute value of the estimated velocity error is plotted as a function of the actual velocity using synthetic sinusoidal images having a spatial frequency of 0.8 (FIG. 35) and 2.0 (FIG. 36), for varying filter lengths. The error can be seen to decrease significantly as the size of the filter is increased.

Clearly, the improvement achievable by using longer filters is substantial, as shown by the fact that the use of a 36 point filter reduces the estimate error by a factor of approximately $1\times10^7$-$1\times10^8$ relative to the 2 point filter. Furthermore, FIGS. 3.22 and 3.23 show that while increasing the spatial frequency of the image has a deleterious effect on the 2 point filter case (whose error rises from approximately $5\times10^{-3}$ to $3\times10^{-2}$ pixels), the longer filters are much more immune to high frequency bias.

In order to obtain a more realistic measure of the performance gain possible from using long filters, it is necessary to consider the effect of image noise.

Figure 37A:
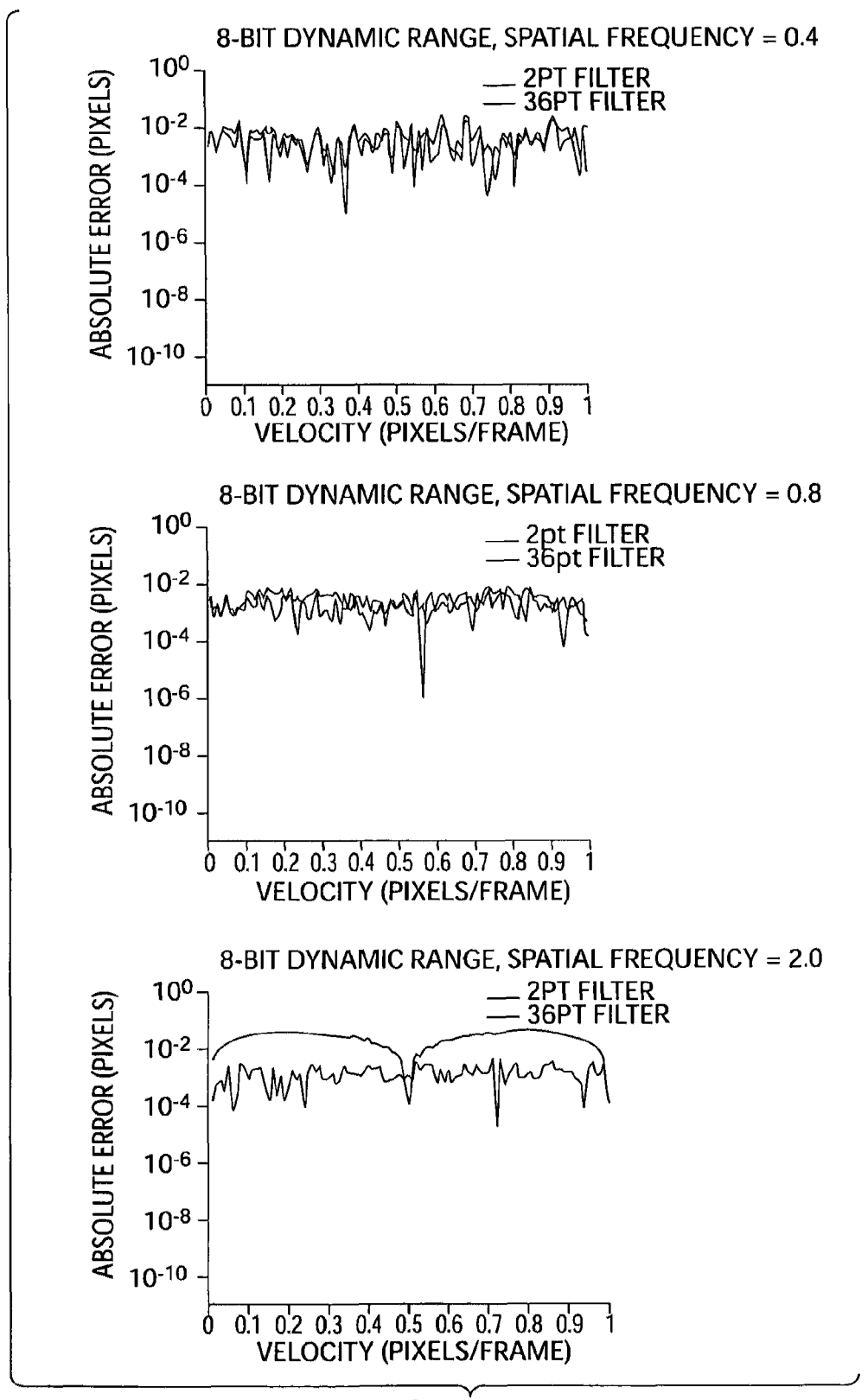
FIG. 37A illustrates the synthetic sinusoidal images generated using 8-bit quantization.
Figure 37B:
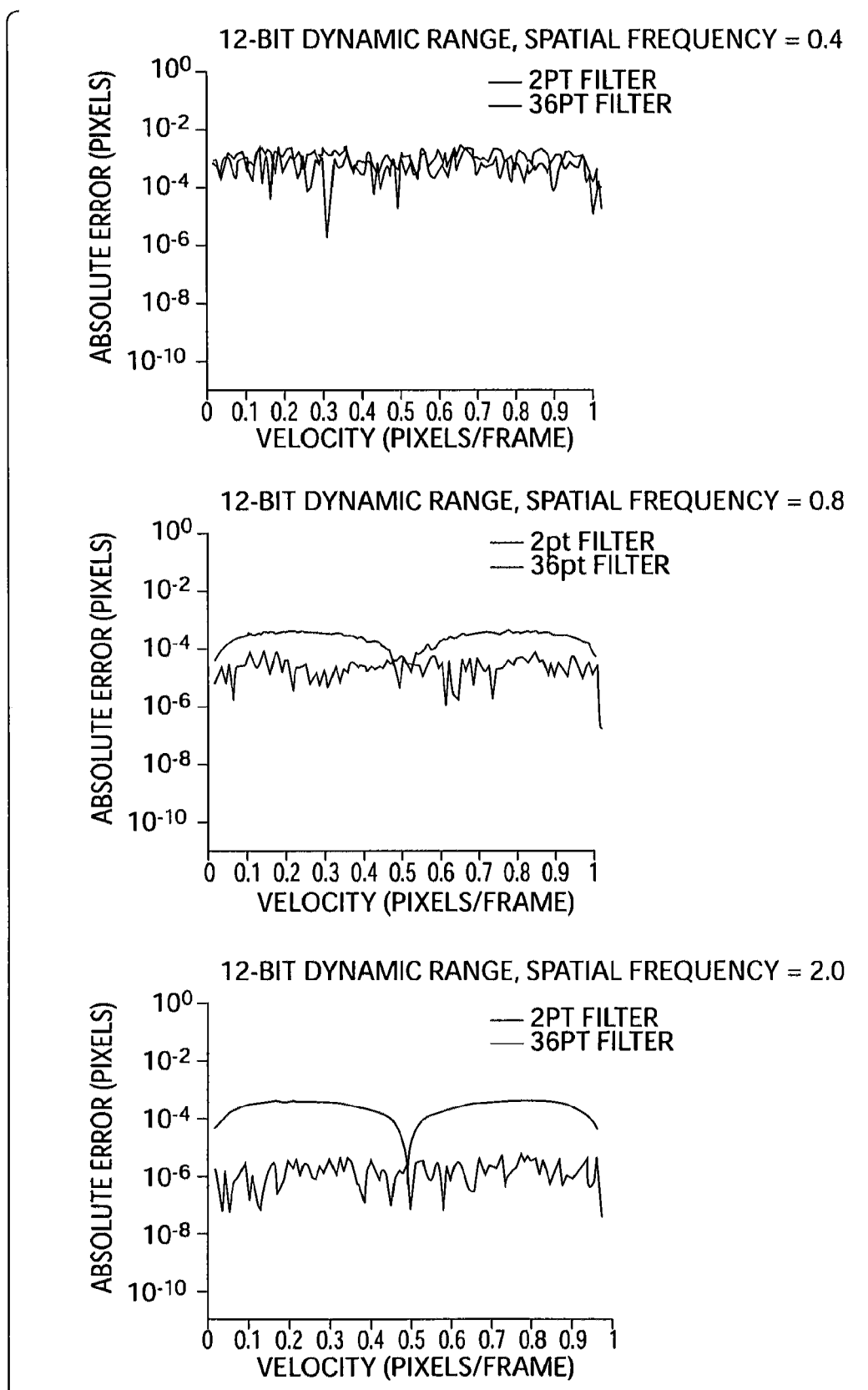
FIG. 37B illustrates the synthetic sinusoidal images generated using 12-bit quantization.

As discussed above, images may be synthetically generated with a one dimensional sinusoidal brightness pattern defined by Equation 3.20. However, here each pixel's calculated intensity was truncated to the next lowest integer value. For the 8-bit simulations, the sinusoidal intensity ranged between 0-255, while for the 12-bit simulations the sinusoidal intensity ranged from 0-4096. For a velocity range between 0 and 1 pixel/image frame, the absolute value of the error between the calculated and actual velocity was recorded, and the plotted results can be seen in FIGS. 37A and 37B. In FIG. 37A the synthetic sinusoidal images are generated using 8-bit quantization, whereas the plots in FIG. 37B were generated using 12-bit quantization. Clearly, the advantage gained by using longer filters is decreased when using an 8-bit camera.

As can be seen from the plots, the performance at low spatial frequency (w=0.4) of the 2 point and 36 point filter algorithms is comparable for both the 8 bit and 12 bit case. When changing from 8 to 12 bits of dynamic range, both algorithms' performance improves by a factor of approximately 10, but there is still no obvious advantage to using the longer filters at this low spatial frequency. At a higher spatial frequency of w=0.8, the results show that there is little to no advantage in using the 36 point filters over the 2 point filters for images with bit depths of 8. With only 8 bits of dynamic range, the error level of the 2 point and the 36 point filters is nearly indistinguishable. If the dynamic range is increased to 12 bits, however, then a significant improvement in performance can be obtained by using the 36 point filters instead of the 2 point filters. This performance improvement for a spatial frequency of 0.8 can be seen to be approximately a factor of 10. Finally, at the very high spatial frequency of w=2.0, it can be seen that using the longer filters results in a significant performance improvement using both 8 and 12 bit images. The reduction in error from the 2 point filter case can be seen to be approximately a factor of 10 and a factor of 100, respectively for the 8 bit and 12 bit images.

These results suggest that for the images captured by the AWS implementation currently under study, a noticeable performance gain will not be experienced by switching from 2 point filters to longer gradient and interpolation filters. Indeed, the use of an 8 bit CCD camera will remove any advantage of the longer filters for the middle-low spatial frequency range present in the images acquired in this work. In order to obtain a significant performance gain from the longer filters, the use of a 12 bit camera is required.

Even though the discussion above indicated that a large performance gain should not be expected from the use of longer filters due to the 8 bit limitation of the camera system being used in this work, it is still worthwhile developing the details of how these filters could be used by a system having a camera with a higher dynamic range. In many optimal multi-image gradient and interpolation filters for use with optical flow problems, images undergoing spatially uniform velocity motion are often the sole images on which the filters are used. For example, some of the images investigated were undergoing sinusoidal motion in time, but at any given instant the entire scene was moving with the exact same velocity. Clearly, this uniform motion does not occur in the images captured by an Active Wavefront Sampling system. As discussed above, the diameter of motion of any given target feature is dependent on its distance to the camera so that for all but the most uninteresting targets, feature motion is expected to vary from one point in the image to the next. Indeed, large velocity gradients can be expected to appear in target regions where steep changes in depth are present.

Despite the incorrect assumption relative to the AWS application, it is still instructive to first examine how a uniform motion flow could be processed using a 36 point filter algorithm. With 36 equally spaced sampling positions on the sampling circle, the AWS module would capture an image sequence showing each target feature rotating on a circle (assuming for now no aberrations). Assuming that the motion is uniform over the image, the radius of this circular image motion is also uniform for all target features. With the sampling being performed at equally spaced intervals, and the motion being periodic, it is possible to "wrap around" the image data since the last image sampled appears to smoothly flow into the first image. Because of this periodicity, the spatiotemporal filters of size N can be applied to calculate N velocity values where each velocity is calculated at a time half way between successive images. Since the motion is uniform across each image, each of the N velocities can be calculated for the exact same x-y position. Indeed, a spatiotemporal interrogation cuboid can be defined (8 pixels×8 pixels×36 images, say) over which the constant brightness equation is solved for the rotation radius in the least squares sense.

$$\min\sum_{i,j,k} |G_x(i, j, k)u(k) + G_y(i, j, k)v(k) + G_t(i, j, k)|^2$$

$$u(k) = \frac{2\pi}{N} R \sin\left(\frac{2\pi}{N}k\right)$$

$$v(k) = -\frac{2\pi}{N} R \cos\left(\frac{2\pi}{N}k\right)$$

Replacing the velocity terms into the expression to be minimized, and setting the derivative with respect to R equal to zero, we obtain the final equation for the radius, R:

$$R = \left[\sum_{i,j,k} G_x(i,j,k)^2 \sin^2\left(\frac{2\pi}{N}k\right) - 2G_x(i,j,k)G_y(i,j,k)\sin\left(\frac{2\pi}{N}k\right)\cos\left(\frac{2\pi}{N}k\right) + \sum_{i,j,k} G_y(i,j,k)^2 \cos^2\left(\frac{2\pi}{N}k\right)\right]^{-1}$$

$$\left[\sum_{i,j,k} G_y(i,j,k)G_t(i,j,k) - G_x(i,j,k)G_t(i,j,k)\sin\left(\frac{2\pi}{N}k\right)\right]$$

Figure 38:
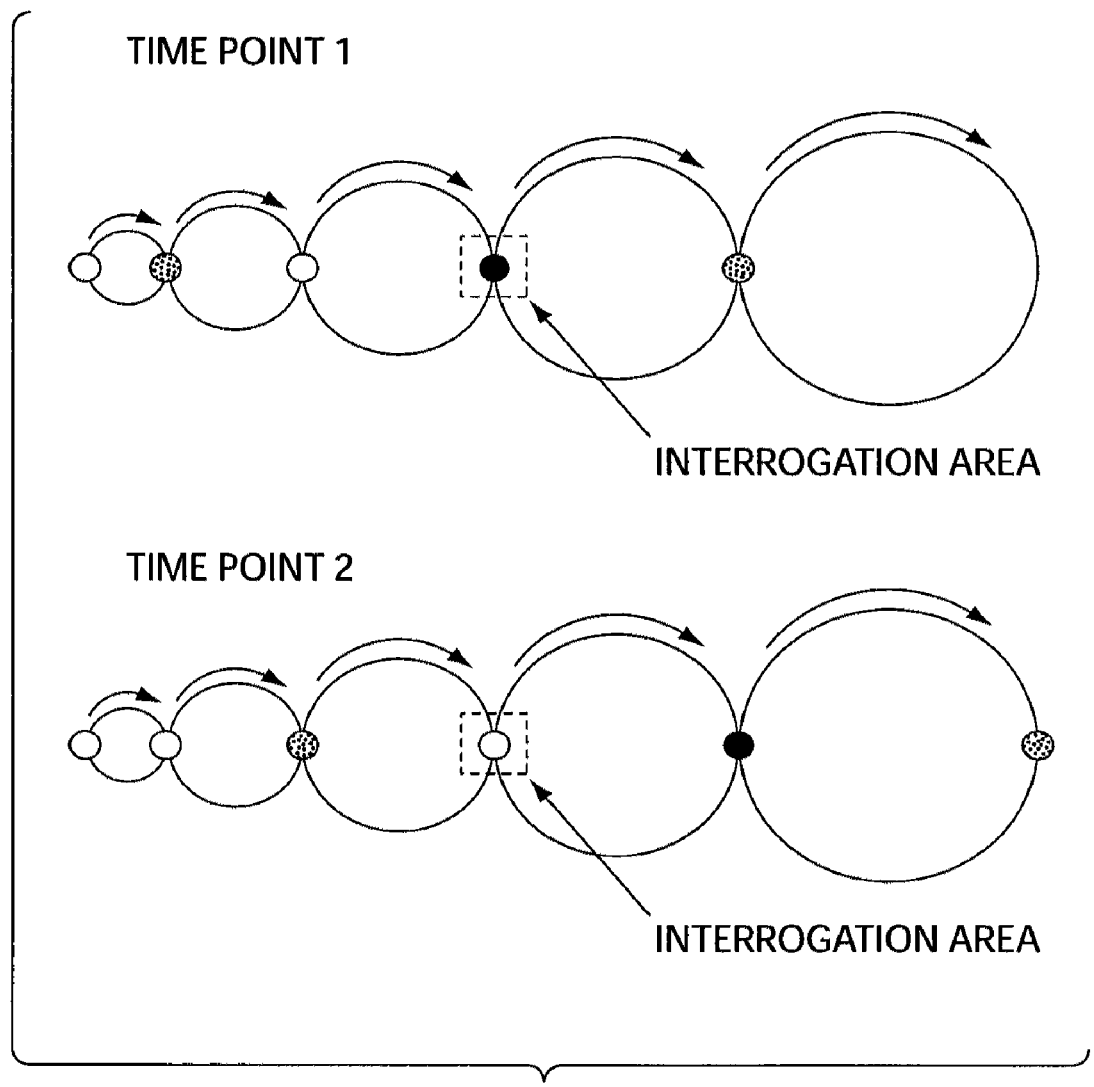
FIG. 38 illustrates the effect of non-uniform motion on the measured velocity at a given point in the x-y plane.

In the case where the motion is not uniform across the entire image, the approach described above cannot be used. This is because with non uniform motion the actual radius of motion, R, at any given spatial position can change in time. This effect can be seen schematically in FIG. 38. At Time Point 1, in FIG. 38, the interrogation area of interest will measure the velocity of the target feature represented by the black circle. At Time Point 2, however, the same interrogation area will measure the velocity of the target feature represented by the green circle. These two target features may well have differing velocities, as shown here by their different rotation diameters.

Figure 39:
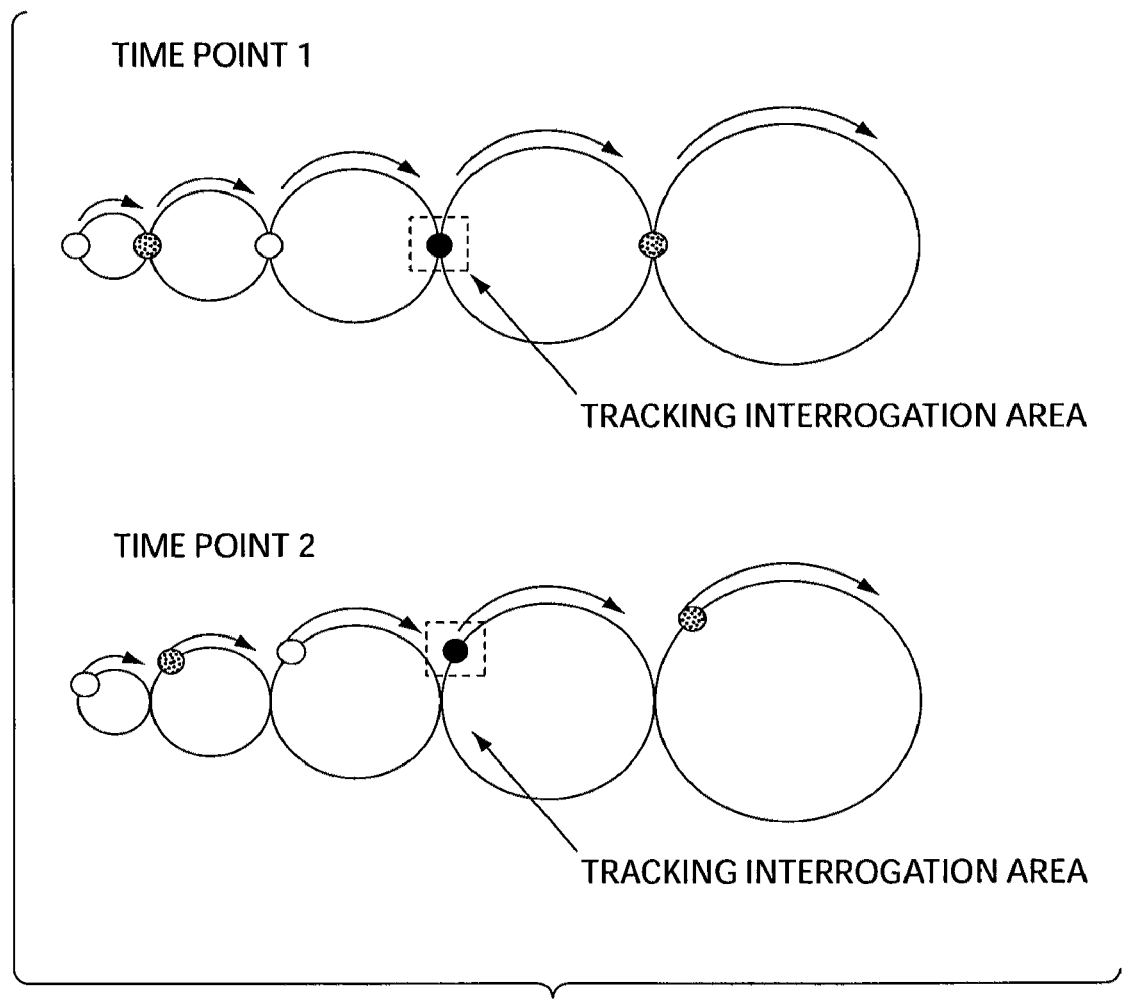
FIG. 39 illustrates a remedy to the non-uniform velocity problem by moving the interrogation area in the x-y plane so that it tracks the same target feature at all points in time.

Equation 3.29 above, in contrast, by definition assumes that R remains constant throughout the spatiotemporal interrogation cuboid. In order to take the non-uniformity of the motion into account, the spatiotemporal interrogation cuboid must be made to track the target feature of interest as it moves from one image to the next. This can be done by moving the spatial position of the interrogation cuboid based on the displacement calculated at the previous time. This approach is shown schematically in FIG. 39, where only the interrogation cuboid's 2D projection onto the x-y plane is shown. Some error is inevitably introduced by this approach since the spatial position of the interrogation cuboid can only by moved by an integer number of pixels, but this small difference becomes less important as the spatial extent of the cuboid increases.

Figure 40A:
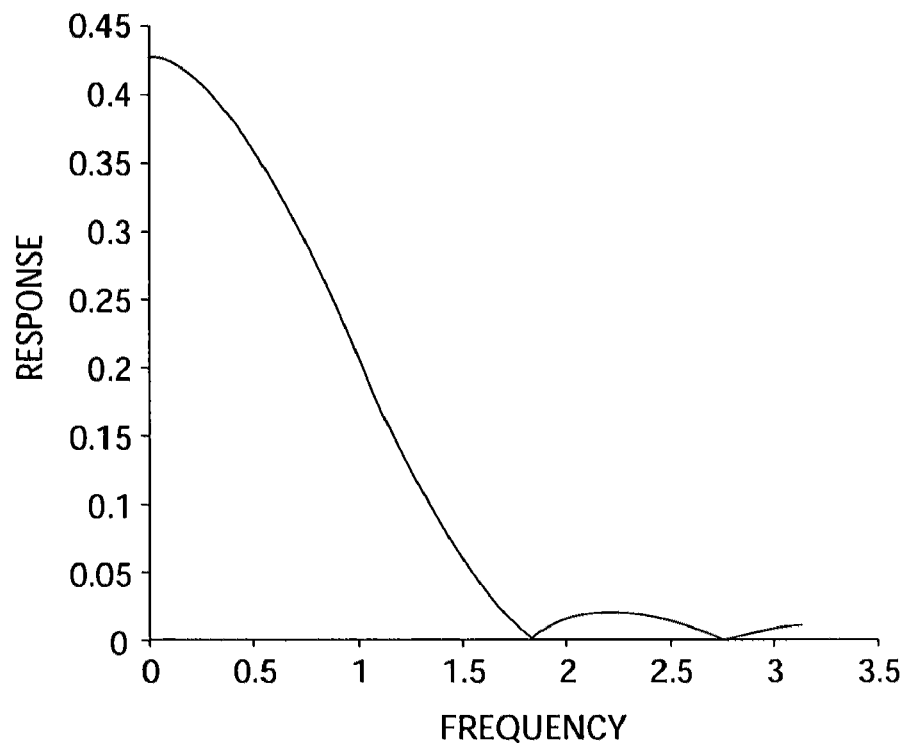
FIG. 40A illustrates the magnitude response of a typical Gaussian low pass filter. The filter response drops off almost immediately, so that even the desired low frequency signal becomes attenuated.
Figure 40B:
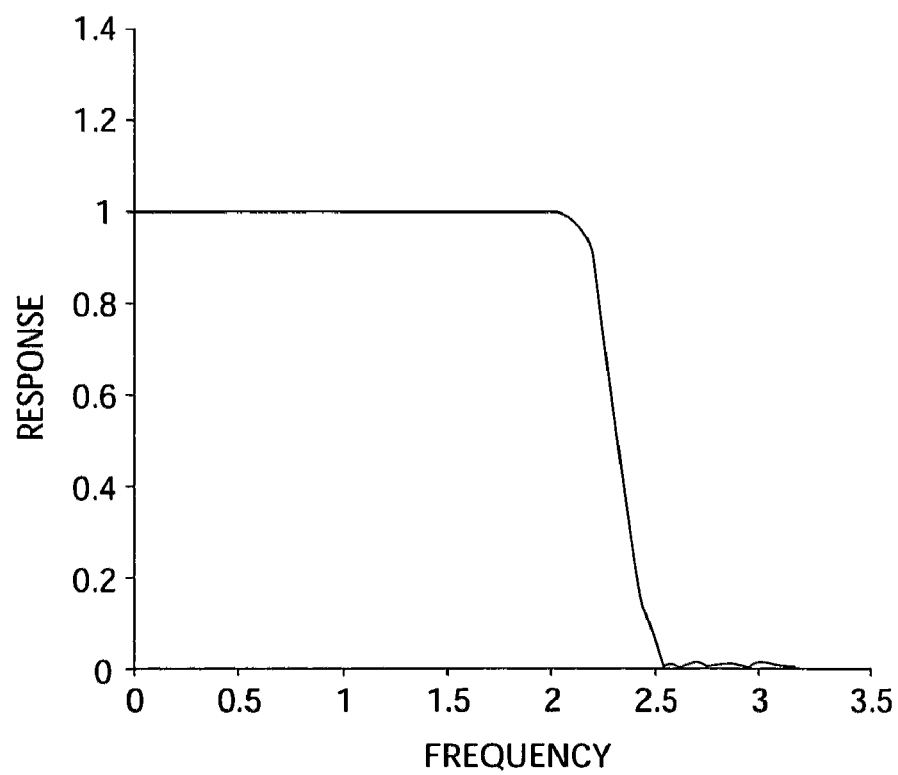
FIG. 40B illustrates the magnitude response of an optimized low pass filter of length 40.

In order to increase the performance of optical flow techniques, a prefilter to low pass filter the images before actually calculating the motion may be used. The purpose of this low-pass filtering of the images has always been to attenuate high frequency noise, which can adversely affect the motion estimates. Typically, a Gaussian type low pass filter is used since this kind of filter's magnitude response rapidly attenuates to zero at high frequencies. However, as can be seen in FIG. 40A, the magnitude response of a typical Gaussian filter follows a decreasing trend even at low frequencies, where the actual signal is located.

This low frequency attenuation has no effect on the processing of uniform motion image sequences, but it does have a negative effect on non-uniform motion sequences. This is due to the fact that when adjacent target features move by different amounts from one image to the next, the picture of the target appears effectively "stretched" in some areas and "compressed" in others. This stretching and compressing actually represents a change in the spatial frequencies of the image. If the spatial frequency of a target feature's neighborhood changes from one image to the next and a Gaussian prefilter is applied, the target feature's intensity will vary from one filtered image to the next. This variation is due to the fact that the Gaussian prefilter will attenuate the image with the slightly higher spatial frequency ("compressed") more than the image with the lower spatial frequency ("stretched").

This intensity variation (caused by the Gaussian prefilter) contradicts the constant brightness assumption in the constant brightness equation (Equation 1.6) thereby reducing the accuracy of the calculated displacement. The only remedy to this undesired effect is to design a low pass filter whose magnitude response is as flat as possible in the low frequency range where the majority of the signal is and whose magnitude response drops off quickly above the cutoff frequency. A longer and more computationally expensive prefilter is unfortunately necessary to meet these more exacting requirements. The magnitude response of such a filter is plotted in FIG. 3.28, where it can be seen that the low frequency range where the signal of interest is located has a magnitude very nearly one and the frequency range above the cutoff has a rapidly decreasing magnitude response.

Having described an algorithm using large spatiotemporal filters, it is now possible to compare its performance to the multi image extension of the 2 point filter algorithm discussed in the foregoing. Images of a human size mannequin head were taken from 36 evenly spaced sampling locations on the aperture plane, while the target was illuminated with a speckle pattern. These 36 images were processed with both multi-image algorithms, and the resulting 3D surface models can be seen in FIGS. 41A, 41B and 41C. The image measures 512×512 pixels and is the central part of a 1024×1024 pixel image. FIG. 41B illustrates a 3D surface model obtained using multi-image LBC approach described above. FIG. 41C illustrates 3D surface model obtained using the large spatiotemporal filter approach described above. All filters were 36 points long. For both 3D models, the interrogation area size was 8×8 pixels for a total of 4096 3D points.

Figure 41A:
FIG. 41A illustrates a first of 36 images sampled by AWS system.
Figure 41B:
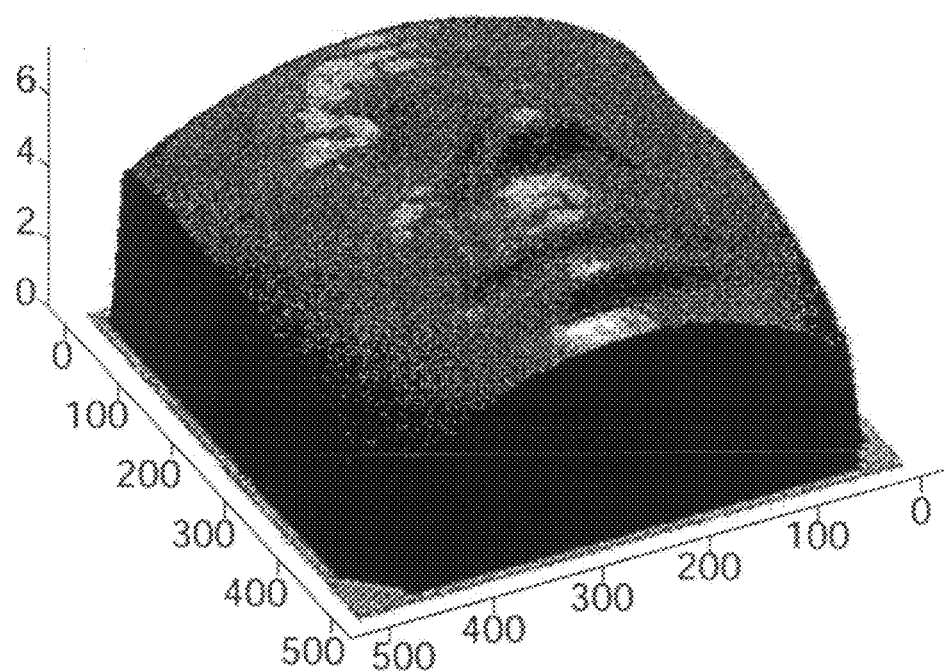
FIG. 41B illustrates a 3D surface model obtained using a multi-image LBC.
Figure 41C:
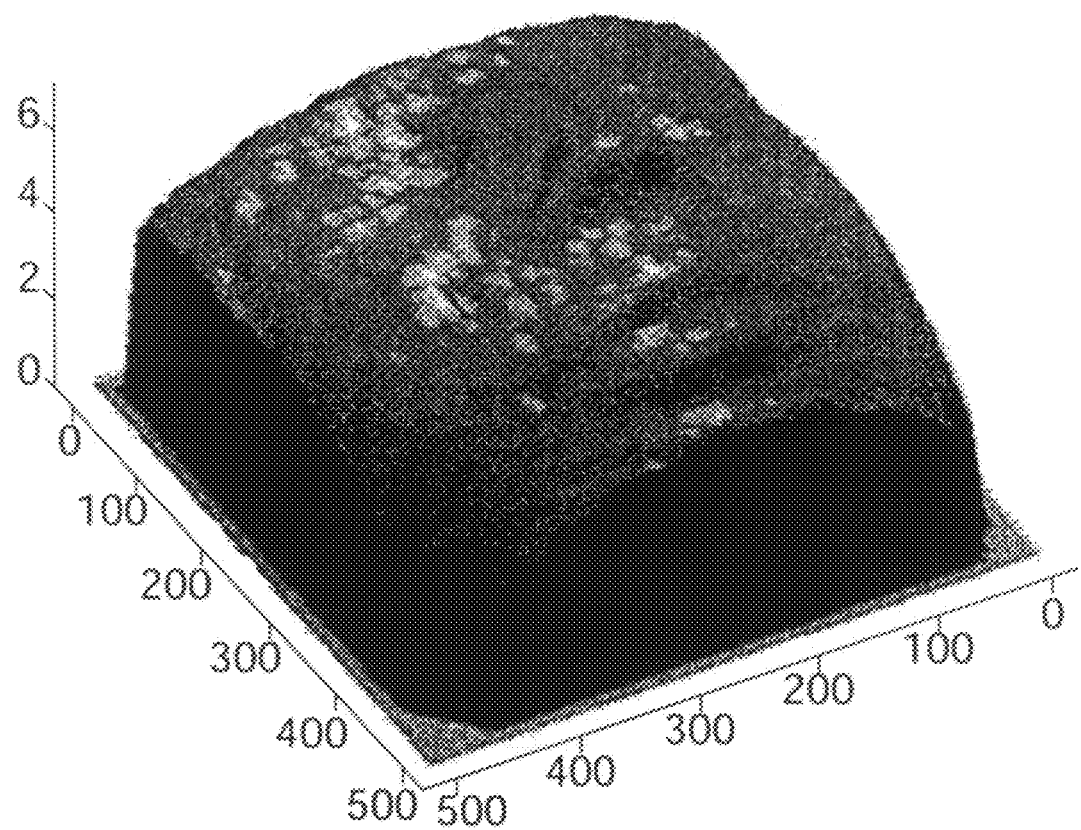
FIG. 41C illustrates 3D surface model obtained using a large spatio-temporal filter approach.

FIGS. 41A, 41B and 41C clearly shows that the large spatiotemporal filter algorithm developed herein creates a much noisier 3D surface model than the multi-image LBC algorithm developed in the foregoing. There are several probable reasons for this difference in performance, the first being that using the large spatiotemporal filters with an 8-bit camera does not create any performance gain in the spatial frequency regime where most of the signal is located. This effect was described in the foregoing. The second reason for the difference in performance is due to the fact that large spatiotemporal filter algorithm relies on moving the spatial location of the interrogation cuboid according to the calculated displacement. Since this movement can only be performed with integer pixel resolution, some error is inevitably introduced.

In the foregoing, the sensitivity to depth of the Active Wavefront Sampling system was described as obeying the following equation $$\frac{d}{D} = Z_{CCD} \times \left(\frac{1}{Z_t} - \frac{1}{Z_{fp}}\right) \quad (1.2)$$

In this equation, D is the diameter of the circular path traveled by the sampling aperture on the aperture plane, d is the diameter of the circular path traveled by the target feature image on the image plane, $Z_{CCD}$ is the distance between the rear principal plane of the optical train and the image plane, $Z_{fp}$ is the distance from the in-focus plane to the front principal plane, and finally $Z_t$ is the distance from the target to the front principal plane. This fundamental equation dictates that rotating the sampling aperture and acquiring images of a target at regular intervals on the sampling circle will result in a series of images in which the target image also rotates in a perfect circle. As discussed above, several algorithms were developed that could track target features from one image to the next on this image circle so as to estimate the circle's diameter, d.

Unfortunately, real optical systems do not necessarily exhibit the ideal behavior described by equation 1.2 above. Aberrations due to errors in lens design, manufacturing limitations, and misalignment of components can cause deviations from the ideal circular behavior. These deviations must be taken into account in order to obtain an accurate quantitative measurement. Indeed, the effect of ignoring aberrations on the quality of the final 3D surface model can be seen in FIG. 42, where the calculated 3D surface of a flat plate is shown. This model was generated from 30 1024×1024 pixel images evenly sampled around the sampling circle, with 16×16 pixel interrogation areas, using the Dalsa CA-1024A camera based AWS system described above. The algorithm used to generate the surface model was the multi-image extension of the 2 point filter algorithm. As described above, the motion of each interrogation area was tracked from one image to the next and the diameter of the best fit circle was used to calculate the target depth according to equation 1.2.

Figure 42:
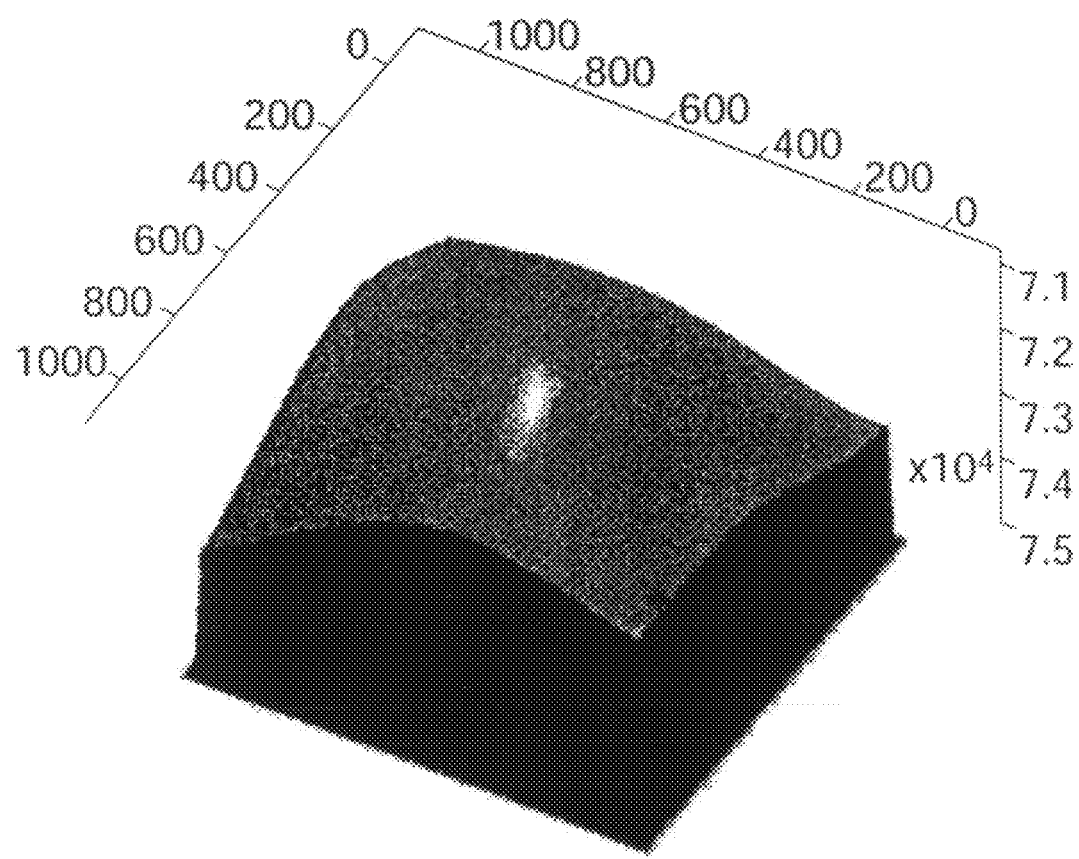
FIG. 42 illustrates a 3D surface model of a flat plate without aberration correction.
Figure 43A:
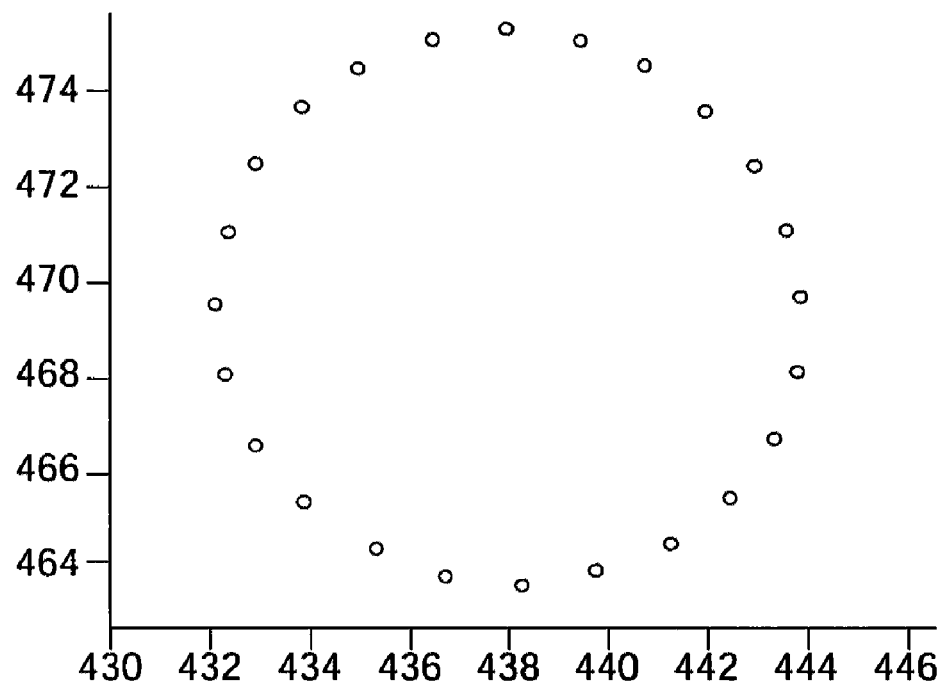
FIG. 43A illustrates an interrogation area image paths, for an experiment where the aperture sampled 24 evenly spaced positions on the sampling circle, the path of an interrogation area located near the center of the image.
Figure 43B:
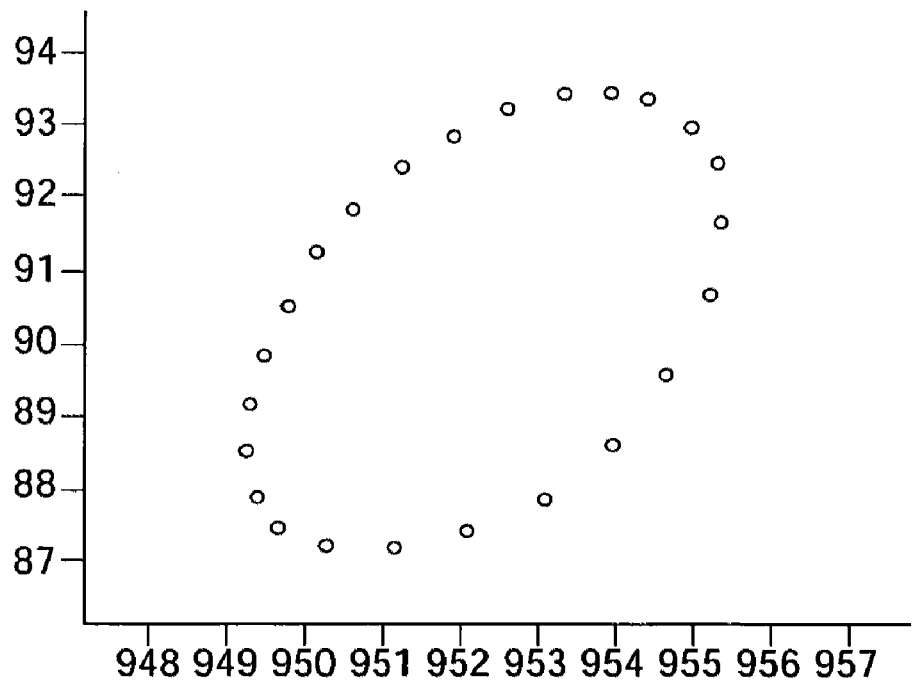
FIG. 43B illustrates an interrogation area image paths, for an experiment where the aperture sampled 24 evenly spaced positions on the sampling circle, the path of an interrogation area located far from the axis.

It is obvious that the 3D surface model shown in FIG. 42 deviates significantly from flatness. Indeed, if a best fit plane is fitted to the model data, the standard deviation of the distance of the target points to that best fit plane is approximately 1000 pixels (12 mm). Further insight into the magnitude of aberration effects can be seen by plotting out the path of an interrogation area as the sampling aperture moves along its circular path. As can be seen in FIGS. 43A and 43B, the motion of an interrogation area located near the center of the image is circular, but the motion of an interrogation area at the edge of the image is far from circular. In FIG. 43A, the path of an interrogation area located near the center of the image. In FIG. 43B, the path of an interrogation area located far from the axis. All dimensions are in pixels. Clearly, the deviation from flatness in the 3D surface model shown in FIG. 42 can be explained by the fact that a circle was fitted to a path that is anything but circular near the image edges.

In order to incorporate the effects of aberrations into the image processing algorithms, aberration theory in terms of geometrical optics is discussed below. This discussion will lead into an aberration model for the AWS approach, as well as an experimental methodology to quantitatively estimate the aberrations present in the system. A performance comparison between using the aberration model or an interpolating approach will also be made. Finally, calibrated 3D surface models of a few targets will be compared to surface models of those same targets generated using a laser scanner.

Figure 44A:
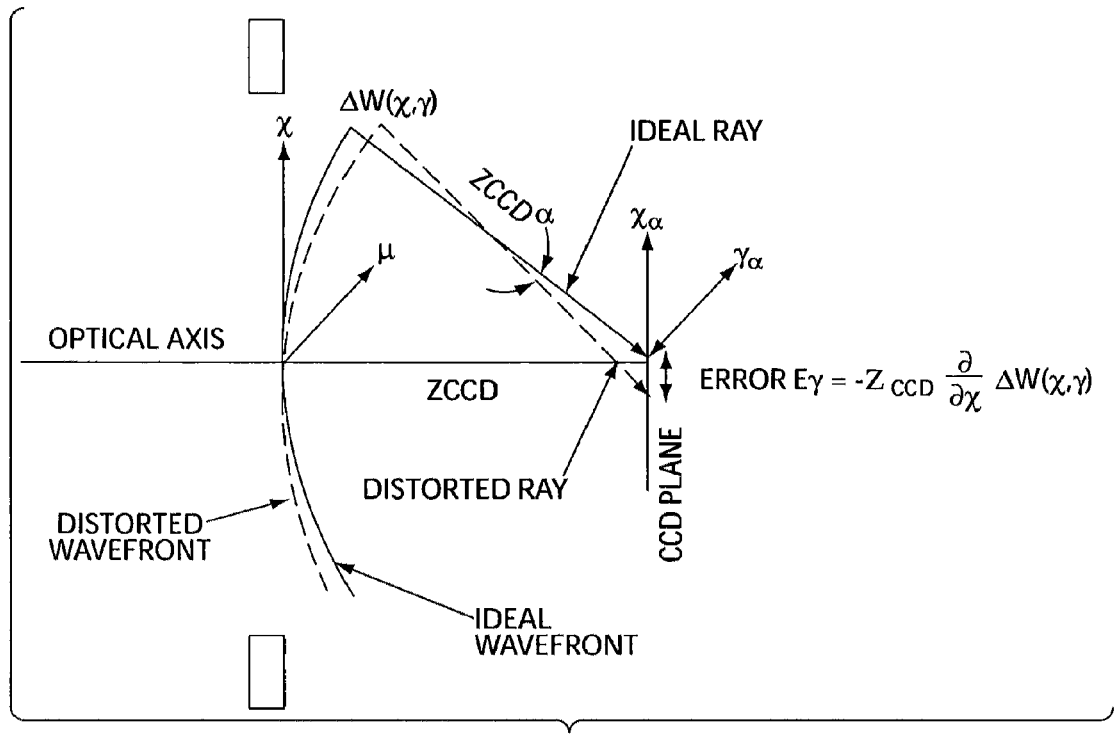
FIG. 44A illustrates a schematic of ideal and aberrated wavefronts for an on-axis target feature.
Figure 44B:
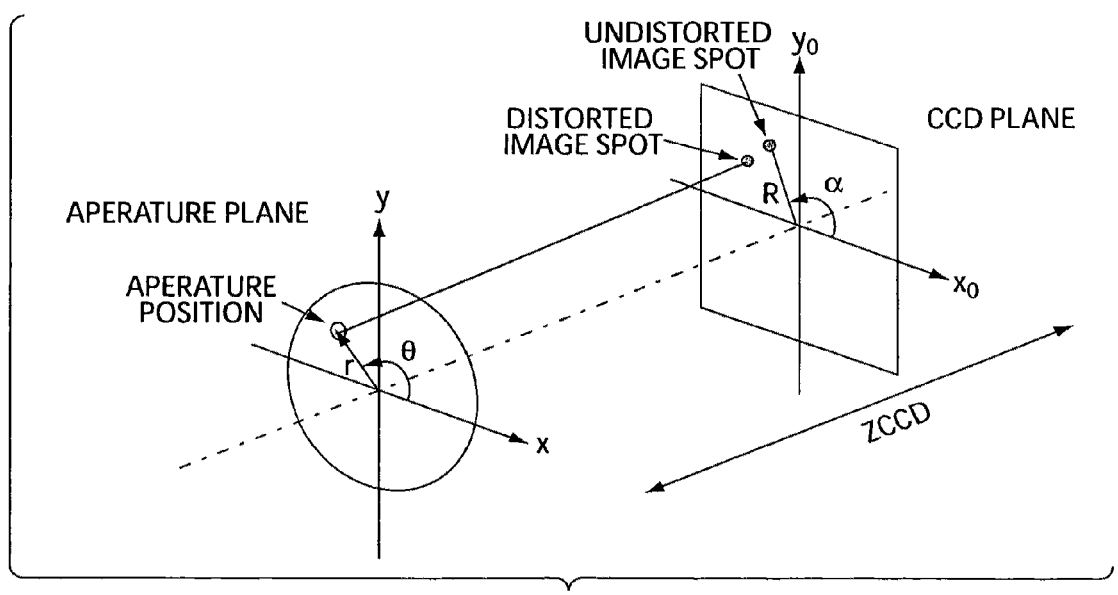
FIG. 44B illustrates a schematic of the aperture plane (same as lens exit pupil plane) and CCD plane coordinate systems.

For an on axis target feature, an ideal lens emits from its exit pupil a spherical wave whose center of curvature coincides with the origin of the imaging plane (e.g., the camera's CCD plane). The equation of this ideal wavefront is:

$$x^2+y^2+[W(x,y)-Z_{CCD}]^2 = Z_{CCD}^2 \quad (4.1)$$

where (x,y) are the coordinates of the exit pupil of the lens and $Z_{CCD}$ is the distance between the exit pupil of the lens and the CCD plane. Assuming that W(x,y) is small so that $\Delta W(x,y)^2$ can be neglected, equation 4.1 can be reduced to the following $$W(x, y) = \frac{x^2 + y^2}{2Z_{CCD}} \quad (4.2)$$

which is the equation of a parabola. In contrast, a real lens will have an aberrated wavefront with an optical path difference relative to the ideal wavefront defined by a function $\Delta W(x,y)$, as shown in FIG. 44, which illustrates a schematic of ideal and aberrated wavefronts for an on-axis target feature.

The goal here is to quantify the separation between the aberrated ray's intersection with the CCD plane and the origin at the CCD plane (which is where the ideal ray intersects it). For simplicity in the following calculations, only aberrations in the x direction will be considered since the exact same relations can be applied to the y direction as well. Assuming that the optical path difference $\Delta W(x,y)$ is small, the ray angles with the optical axis is small, and that the angle $\alpha$ between the ideal and aberrated ray is also small, it can be shown that $$\alpha = -\frac{\partial}{\partial x}\Delta W(x, y) \quad (4.3)$$

The x coordinate distance of the aberrated ray's intersection with the CCD plane to the ideal ray's intersection with the CCD plane is then $$\varepsilon_x = Z_{CCD}\alpha = -Z_{CCD}\frac{\partial}{\partial x}\Delta W(x, y) \quad (4.4)$$

Similarly, the y coordinate distance of the aberrated ray's intersection with the CCD plane to the ideal ray's intersection with the CCD plane is $$\varepsilon_y = -Z_{CCD}\frac{\partial}{\partial y}\Delta W(x, y) \quad (4.5)$$

Equation 4.2 is fundamental in that it relates the positional error of a target feature's aberrated image to the distance between the lens and the CCD plane and the optical path difference function of the wavefront. Obviously, the optical path difference function $\Delta W(x,y)$ must be quantified before the positional error can be calculated.

Complicating matters is the fact that we are interested in calculating the positional error of off-axis target points as well as on-axis points. Because of this, the aberrated wavefront needs to be expressed in terms of the exit pupil/aperture plane coordinates (x,y) and the non-aberrated image coordinates on the CCD plane $(x_o, y_o)$. A schematic showing both the aperture plane and CCD plane coordinate systems can be seen in FIG. 44B. Both Cartesian and polar coordinates are shown. The coordinates $(r,\theta)$ refer to the position of the sampling aperture while the coordinates (R,α) refer to the position of the ideal un-aberrated image position of a given target feature.

A classic approach to this problem is to perform a double expansion in terms of the exit pupil and imaging plane coordinates. Assuming that the optical system is rotationally symmetric, the wavefront will only be a function of the following three terms:

$$x^2+y^2, \ x_o^2+y_o^2, \ xx_o+yy_o \quad (4.6)$$

A power series expansion can then be performed as follows:

$$W = C_1 \cdot (x_o^2+y_o^2) + C_2 \cdot (x^2+y^2) + C_3 \cdot (xx_o+yy_o) + C_4 \cdot (x_o^2+y_o^2)^2 + C_5 \cdot (x^2+y^2)^2 + C_6 \cdot (xx_o+yy_o)^2 + C_7 \cdot (x_o^2+y_o^2)(x^2+y^2) + C_8 \cdot (X_o^2+y_o^2)(xx_o+yy_o) + C_9 \cdot (x^2+y^2)(xx_o+yy_o) + \ldots \quad (4.7)$$

where the terms $C_1, C_2, \ldots, C_9$ are constants. The first and fourth terms gives rise to a constant phase shift across the exit pupil, depending on the position of the image in the CCD plane. The second term is a longitudinal shift of the center of the wavefront sphere and therefore represents defocus. The third term is referred to as "tilt", as it describes a transverse shift of the center of the wavefront reference sphere. This term is nothing else but the ideal off-axis position of an off-axis target point. The terms $C_5$ through $C_9$ are named after Seidel (1865), and are more specifically known as spherical aberration, astigmatism, curvature of field, distortion, and coma. These terms are also known as third order terms, because their derivatives with respect to x and y have terms with powers of three. Clearly, the expansion can be continued to include fifth order, seventh order, etc. . . . terms. However, since the values of both (x,y) and ($x_o,y_o$) are less than one due to normalization, the higher order terms progressively have less and less effect on the wavefront value.

Removing the third term ($C_3$) in order to obtain the optical path difference of the wavefront, and taking the derivative of the expression with respect to the aperture plane coordinates x and y results in the following expressions:

$$\frac{\partial \Delta W}{\partial x} = 2C_2 \cdot x + 4C_5 \cdot x(x^2+y^2) + 2C_6 \cdot x_o(xx_o+yy_o) + 2C_7 \cdot x(x_o^2+y_o^2) + C_8 \cdot x_o(x_o^2+y_o^2) + C_9 \cdot (3x^2 x_o + x_o y^2 + 2yy_o x) \quad (4.8)$$

$$\frac{\partial \Delta W}{\partial y} = 2C_2 \cdot y + 4C_5 \cdot y(x^2+y^2) + 2C_6 \cdot y_o(xx_o+yy_o) + 2C_7 \cdot y(x_o^2+y_o^2) + C_8 \cdot y_o(x_o^2+y_o^2) + C_9 \cdot (3y^2 y_o + y_o x^2 + 2xx_o y) \quad (4.9)$$

Referring back to FIG. 44B, we can use a polar coordinates defined by $$x = r\cos\theta, y = r\sin\theta$$

$$x_o = R\cos\alpha, y_o = R\sin\alpha \quad (4.10)$$

Using these polar coordinates in equations 4.7 and 4.8 results in the following:

$$\frac{\partial \Delta W}{\partial x} = \quad (4.11)$$
$$2C_2 \cdot r\cos\theta + 4C_5 \cdot r^3\cos\theta + 2C_6 \cdot rR^2\cos\alpha(\cos\theta\cos\alpha + \sin\theta\sin\alpha) + 2C_7 \cdot rR^2\cos\theta + C_8 \cdot R^3\cos\alpha + C_9 \cdot (3r^2 R\cos^2\theta\cos\alpha + r^2 R\sin^2\theta\cos\alpha + 2r^2 R\sin\theta\cos\theta\sin\alpha)\ldots$$

$$\frac{\partial \Delta W}{\partial y} = \quad (4.12)$$
$$2C_2 \cdot r\sin\theta + 4C_5 \cdot r^3\sin\theta + 2C_6 \cdot rR^2\sin\alpha(\cos\theta\cos\alpha + \sin\theta\sin\alpha) + 2C_7 \cdot rR^2\cos\theta + C_8 \cdot R^3\cos\alpha + C_9 \cdot (3r^2 R\sin^2\theta\sin\alpha + r^2 R\cos^2\theta\sin\alpha + 2r^2 R\cos\theta\cos\alpha\sin\alpha)\ldots$$

Combining equations 4.4, 4.5, 4.8, and 4.9 allows for the calculation of the aberrated image position (whose coordinates on the CCD plane are $x_o+\epsilon_x$ and $y_o+\epsilon_y$) generated by a specific ray emanating from the wavefront (at coordinates x and y on the aperture plane). This calculation requires that the ideal non-aberrated image position be known (coordinates $x_o$ and $y_o$) as well as the aberration constants $C_2, C_5, C_6, \ldots, C_9$. In a practical application, an image will record the aberrated position of target features; fortunately, as long as the aberration constants are known the same equations can be used to solve for the non-aberrated target feature coordinates. It is important to note that these calculations can be applied to the AWS system under investigation if it is assumed that the sampling aperture is small enough so that any change in the wavefront across the aperture is negligible.

In the foregoing it was shown how geometrical aberration theory allows for the calculation of a target feature's aberrated image position based on the ideal image position, the position of the sampling aperture on the aperture plane, and on a set of aberration constants. Unfortunately, these aberration constants must be experimentally determined for each individual optical setup. A method developed to estimate these coefficients is described in further detail below.

The method developed herein includes a known three dimensional target for the calibration, which involves determining external parameters such as the relative orientation of the camera and calibration target coordinate systems as well as the camera's internal parameters. These internal parameters include the lens focal length, lens distance to the CCD sensor, rotating aperture characteristics, and of course the aberration constants. The approach first obtains estimates of some parameters using linear least squares fitting methods. The error in the image plane is not minimized in this step, but rather a quantity that can be minimized using linear methods. Subsequently, the initial estimates are used as a starting point for a non-linear minimization step that searches for the best fit between the observed image points and the image points predicted by the calibration model.

Figure 45A:
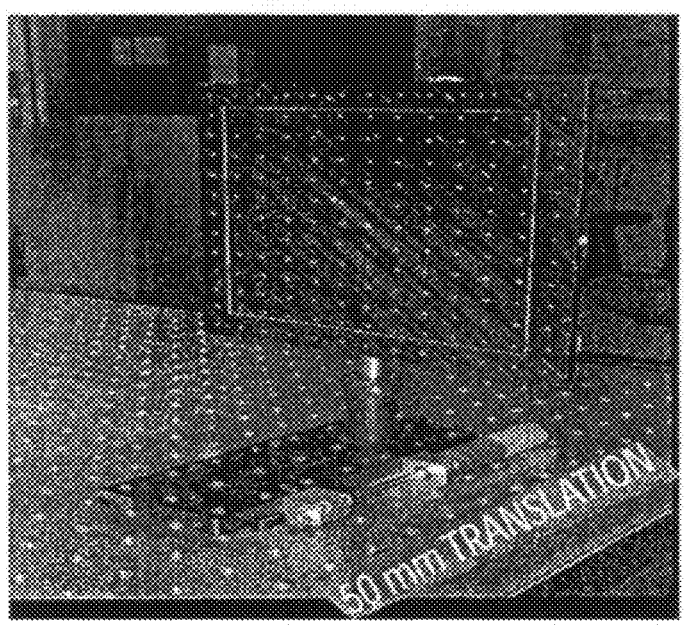
FIG. 45A illustrates the TSI machined calibration plate, with white circular target points.
Figure 45B:
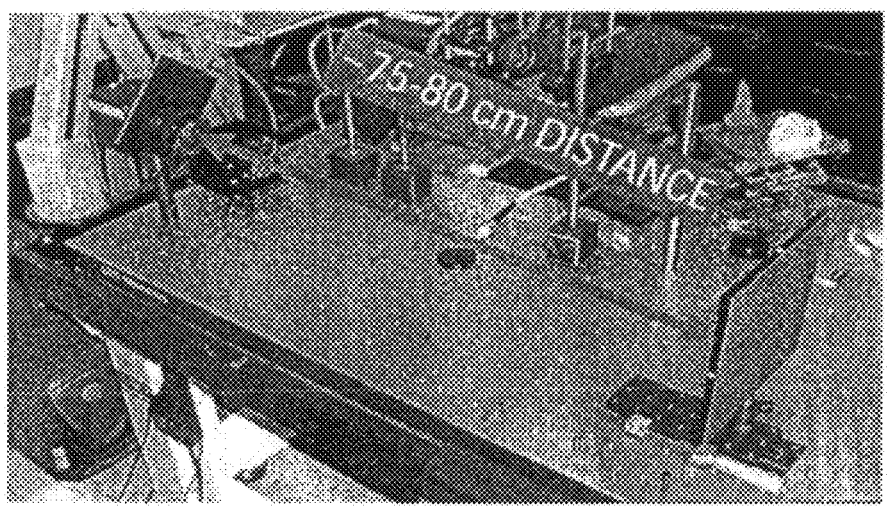
FIG. 45B illustrates a photo of the calibration plate (mounted on the 50 mm micrometer stage) placed approximately 75-80 cm from the AWS equipped camera.

The calibration target used in this work is a machined aluminum plate made by TSI Incorporated with accurately placed circular markers. This aluminum plate measures approximately 200×200 mm and has machined diagonal grooves of depth 0.97 mm. The circular markers are machined into the surface of the plate and are painted white on a black background. The 13×13 grid of points has an equal spacing of 15 mm, but only the central 11×11 points are used in the calibration process due to the field of view of the optical system. In order to increase the effective depth range of the target, the aluminum plate was mounted on a 50 mm micrometer stage with 0.5 micron precision. For a typical calibration, images of the calibration plate are taken at 20 or more depths within the 50 mm travel of the micrometer. The calibration plate and calibration setup geometry can be seen in FIG. 45. FIG. 45A illustrates the TSI machined calibration plate, with white circular target points. FIG. 45B illustrates a photo of the calibration plate (mounted on the 50 mm micrometer stage) placed approximately 75-80 cm from the AWS equipped camera.

Figure 46A:
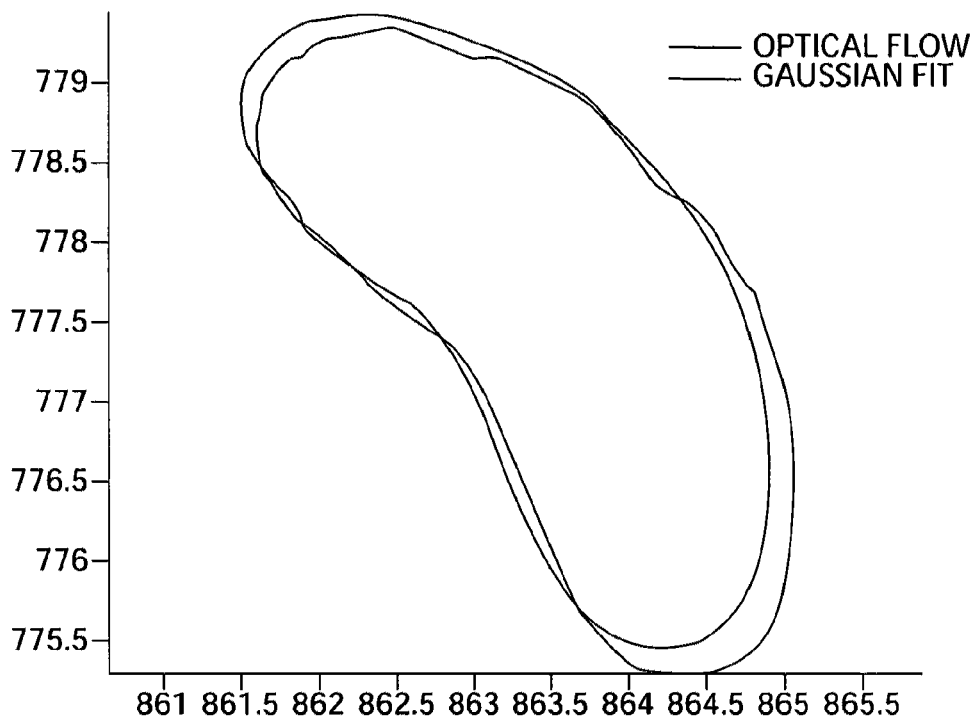
FIG. 46A illustrates Gaussian fitting and optical flow based tracking of target point paths.
Figure 46B:
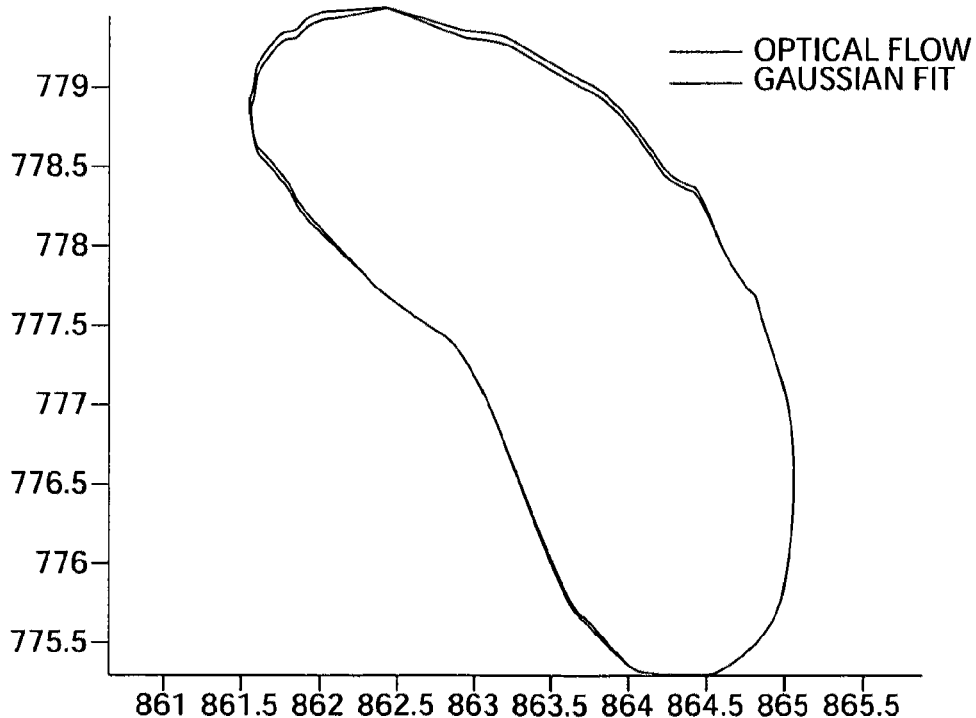
FIG. 46B illustrates Gaussian fitting and optical flow based tracking of target point paths.

At each depth position of the calibration plate, an image is captured at up to 90 evenly spaced rotating aperture sampling positions. Each calibration target point needs to be tracked along its path, and this is first done by fitting a Gaussian surface over its pixel intensity values. A second tracking pass is then performed by centering an 8×8 interrogation area above the first image of the target point, and then tracking this interrogation area from one image to the next using the gradient optical flow techniques developed above. These two different tracking approaches result in slightly different paths, mostly due to the fact that in the optical flow approach the interrogation area can only be centered on the target point image within integer pixel precision. If a best fit shift of the interrogation area path towards the Gaussian surface path is performed, however, a smoother overall path can be obtained as shown in FIG. 46. In FIG. 46A, the Gaussian fit path and the optical flow path are plotted together. It can be seen that the optical flow path is smoother, but offset from the Gaussian fit path due to the interrogation area's initial placement being limited to a precision of one pixel. In FIG. 46B, the optical flow path is shifted towards the Gaussian path by a best fit amount. This shifted optical flow path is taken to be the correct tracking of the target point. All dimensions are in pixels.

Figure 47A:
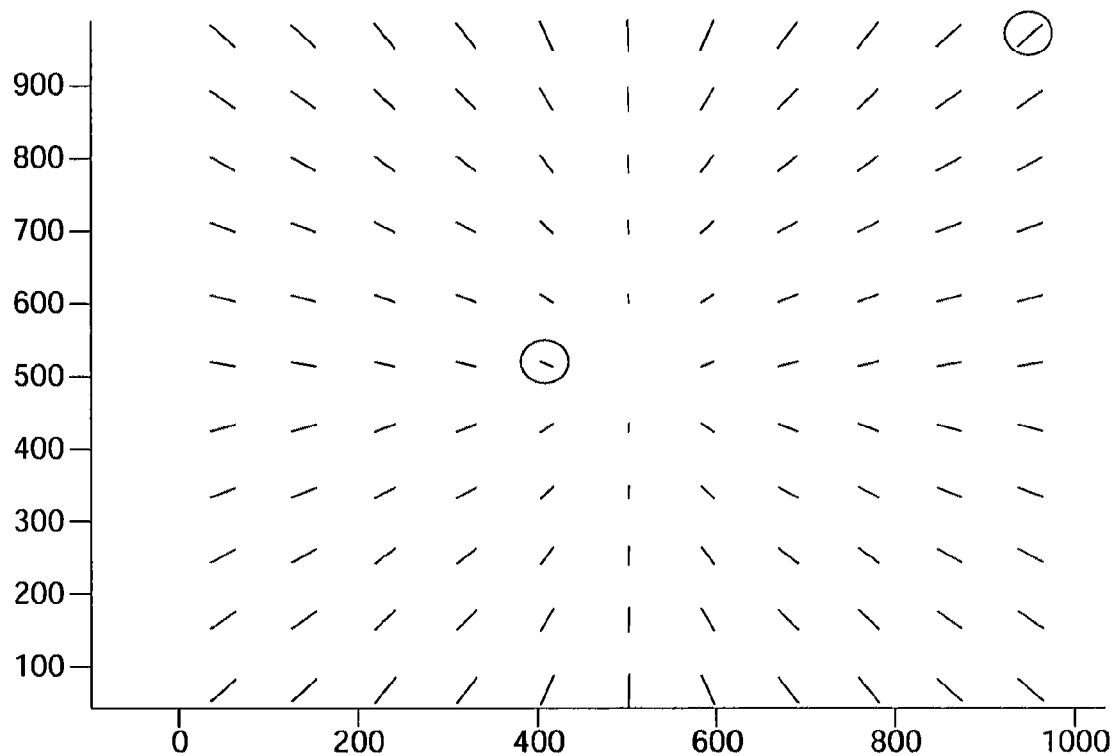
FIG. 47A represents the traces from all target points on the 11×11 point grid, rotating through 90 aperture sampling positions, and translating through 22 depth positions on the micrometer stage.
Figure 47B:
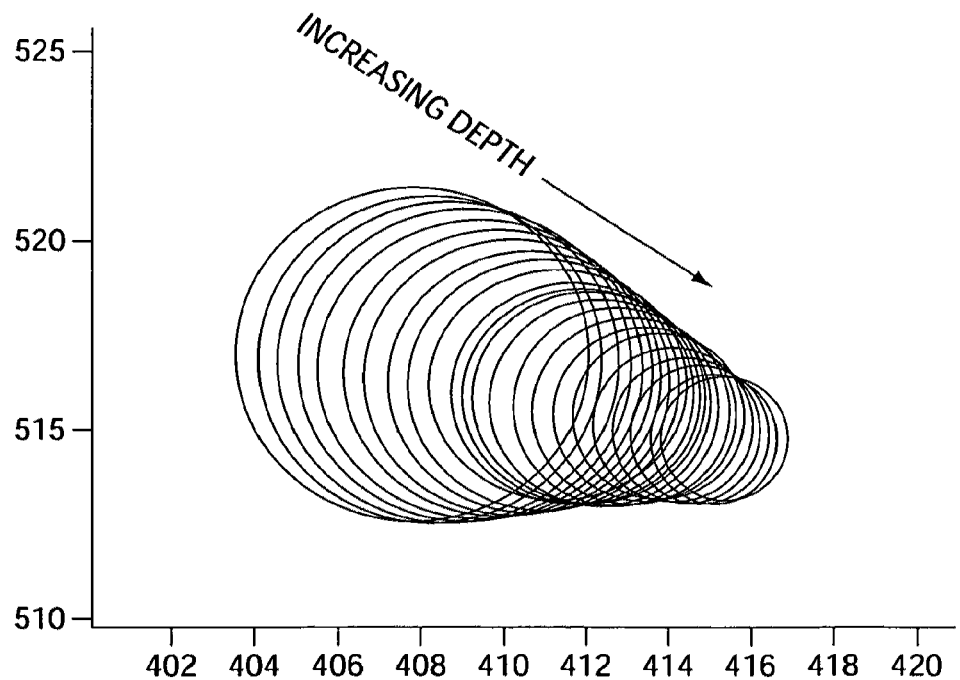
FIG. 47B illustrates the near-axis traces.
Figure 47C:
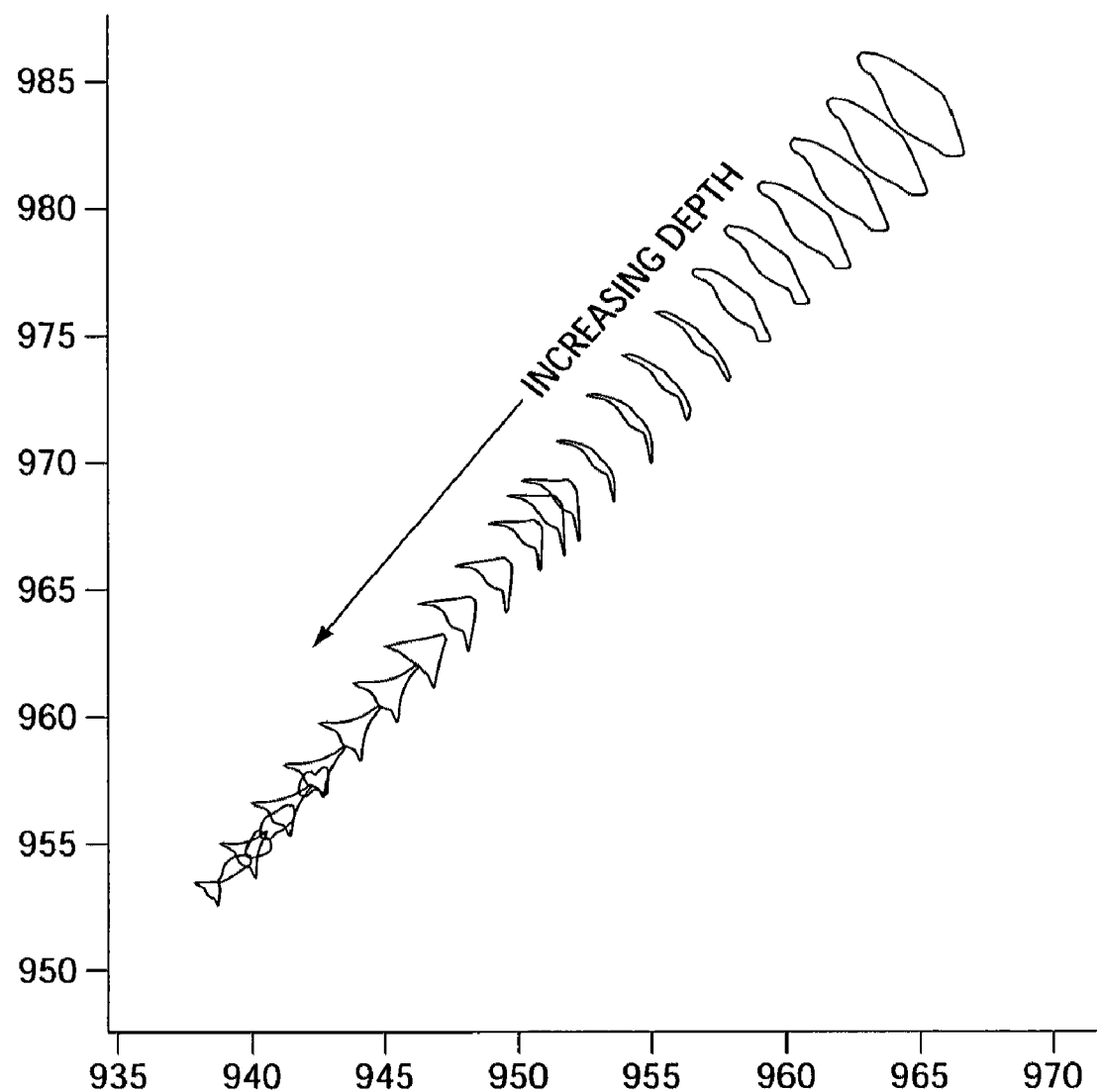
FIG. 47C illustrates the off-axis traces.

A full calibration target dataset can be seen in FIG. 47, which shows all the paths taken by each target point in the 11×11 point grid, over 22 depth positions on the micrometer stage, and 90 sampling positions on the circular aperture path. FIG. 47A represents the traces from all target points on the 11×11 point grid, rotating through 90 aperture sampling positions, and translating through 22 depth positions on the micrometer stage. The near-axis traces and off-axis traces are shown in greater detail in FIGS. 47B and 47C, respectively. The on-axis point can be seen to rotate in a circle, with the diameter of the circle decreasing as the point moves further away from the camera. The off-axis point, in contrast, can be seen to move in a progressively more distorted pattern as the point is moved farther from the camera. All dimensions are in pixels.

An estimate of some of the internal and external parameters may first be made by assuming that all aberration coefficients are equal to zero. For this initial linear estimate, the position of each target point image is taken to be the center of mass of the surface defined by the target's image path. This "true" image position is matched up to its corresponding target point, and calculations are performed that estimate the rotation and translation matrices relating the camera and target coordinate systems, as well as the distance separating the lens from the CCD plane.

We first start by relating the image coordinate system to the camera coordinate system using the perspective projection equations:

$$\frac{x_I - x_o}{Z_{CCD}} = \frac{x_C}{z_C}, \frac{y_I - y_o}{Z_{CCD}} = \frac{y_C}{z_C} \quad (4.13)$$

where $(x_1, y_1)$ are coordinates on the CCD plane, $(x_o, y_o)$ is the intersection of the optical axis with the CCD plane, $Z_{CCD}$ is the distance between the lens and the CCD plane, and $(x_C, y_C, z_C)$ are target point coordinates in the camera frame. The latter coordinate system can be related to the target's coordinate system with a rotation and a translation matrix as follows:

$$\begin{pmatrix} x_C \\ y_C \\ z_C \end{pmatrix} = \begin{pmatrix} r_{11} & r_{12} & r_{13} \\ r_{21} & r_{22} & r_{23} \\ r_{31} & r_{32} & r_{33} \end{pmatrix} \begin{pmatrix} x_S \\ y_S \\ z_S \end{pmatrix} + \begin{pmatrix} t_x \\ t_y \\ t_z \end{pmatrix} \quad (4.14)$$

where $(x_S, y_S, z_S)$ are target point coordinates in the scene or target reference frame. Combining the two expressions in equation 4.13 yields $$\frac{x'_I}{y'_I} = \frac{x_C}{y_C} \quad (4.15)$$

where $x'_I = x_I - x_o$ and $y'_I = y_I - y_o$. Inserting the relationship between camera and target coordinate systems defined by equation 4.14 into equation 4.15 yields $$(x_S y'_I) r_{11} + (y_S y'_I) r_{12} + (z_S y'_I) r_{13} + y'_I t_x - (x_S x'_I) r_{21} - (y_S x'_I) r_{22} - (z_S x'_I) r_{23} - x'_I t_y = 0 \quad (4.16)$$

This equation is a linear homogeneous equation in the following eight unknowns:

$$r_{11}, r_{12}, r_{13}, r_{21}, r_{22}, r_{23}, t_x, t_y$$

Each correspondence between a target point's image coordinates and target frame's coordinates yields one distinct version of 4.16. Since equation 4.16 is homogeneous, any one of the unknown variables can be arbitrarily set to one, and the remaining seven unknowns can be solved for if at least 7 target point correspondences are known. The scale factor required to estimate the actual value of all eight variables can be found by enforcing the normal condition of the rotation matrix rows:

$$r_{11}^2 + r_{12}^2 + r_{13}^2 = 1 \text{ and } r_{21}^2 + r_{22}^2 + r_{23}^2 = 1 \quad (4.17)$$

These conditions lead to the scale factor $$c = \frac{1}{\sqrt{r'^2_{21} + r'^2_{22} + r'^2_{23}}} \quad (4.18)$$

where the primed terms refer to the solved variables of equation 4.16 where $t_y$ is set equal to one. With the eight parameters of equation 4.16 estimated, the final parameters $Z_{CCD}$ and $t_z$ can be estimated. Combining equations 4.13 and 4.14 yields:

$$\frac{x'_I}{Z_{CCD}} = \frac{r_{11} x_S + r_{12} y_S + r_{13} z_S + t_x}{r_{31} x_S + r_{32} y_S + r_{33} z_S + t_z} \quad (4.19)$$

$$\frac{y'_I}{Z_{CCD}} = \frac{r_{21} x_S + r_{22} y_S + r_{23} z_S + t_y}{r_{31} x_S + r_{32} y_S + r_{33} z_S + t_z}$$

Cross multiplying both equations results in the following two linear equations:

$$(r_{11} x_S + r_{12} y_S + r_{13} z_S + t_x) Z_{CCD} - x'_I t_z = (r_{31} x_S + r_{32} y_S + r_{33} z_S + t_z) x'_I$$

$$(r_{21} x_S + r_{22} y_S + r_{23} z_S + t_y) Z_{CCD} - y'_I t_z = (r_{31} x_S + r_{32} y_S + r_{33} z_S + t_z) y'_I \quad (4.20)$$

Once again, using two or more correspondences between target points' image and scene coordinates yields an estimate for $Z_{CCD}$ and $t_z$. With these two parameters found, an estimate for all the external parameters and the internal parameter $Z_{CCD}$ are found. In the next steps, a non-linear optimization of all the parameter values will be performed.

In this second part of the calculation, the error between the actual image positions and the predicted image positions for the known target coordinates is minimized using non-linear methods. The approach used here is a modified Levenberg-Marquardt method. The values of the variables that were estimated in the first part of the calculation are used here as starting values in the iterative optimization.

Besides refining the estimates of the external parameters, the distance of the lens to the CCD plane, and some of the aberration coefficients, this part of the calculation also estimates the intersection of the optical axis with the CCD sensor, the remaining aberration coefficients, the exact radius of rotation of the sampling aperture, the exact angular position of the sampling aperture for the first image, the relative orientation of the rotating aperture axis and the optical axis, and the position of the in-focus plane. The defocus aberration constant for each target point is also found, and this can be related to the target's depth through equation 1.2.

$$C_{2,i} = Z_{CCD} \times \left( \frac{1}{z_{c,i}} - \frac{1}{Z_{fp}} \right) \quad (4.21)$$

where the index i represents each target point. There are several sources of error in the calibration procedure which will place a lower limit to the agreement between the re-projected image positions predicted by the model and the image positions actually measured on the CCD plane. The two largest of these sources are the error in determining the exact position of the target point images on the CCD plane and machining errors in the target itself.

The first source of error is the actual measurement of the position of the target point images themselves. By experimenting with synthetic images, it was found that the Gaussian fit algorithm has an accuracy of approximately 0.05-0.10 pixels depending on the exact noise level in the camera. The use of the optical flow approach as described in above reduces this error to approximately 0.01-0.05 pixels.

The other major source of error lies in the manufacture of the target plate itself. The machining tolerances are most likely on the order of 0.0005-0.001 inches. With the target being approximately 75 cm from the camera, this range of machining error translates into an image position error of approximately 0.075-0.150 pixels on the CCD plane. Due to these sources of error, the minimum re-projection error is expected to range between 0.075 and 0.20 pixels.

The accuracy of the wavefront model described by equation 4.7 depends very much on the number of terms used in the expansion. The re-projection error, as mentioned above, is the difference between the target point image plane location predicted by the model and the actual location of the target point on the image plane.

This error is an indicator of how well the calibration model is able to fit the image data. The re-projection error can be seen plotted as a function of the number of terms in the wavefront model expansion in FIG. 48. The re-projection error can be seen to asymptotically decrease as the number of terms in the expansion is increased. This data was calculated using 18 equally spaced sampling positions on the circular sampling path, using every other point on the target plate, and using 20 depth values on the target plate micrometer stage. The plotted RMS error values spans all of these image points.

Figure 48:
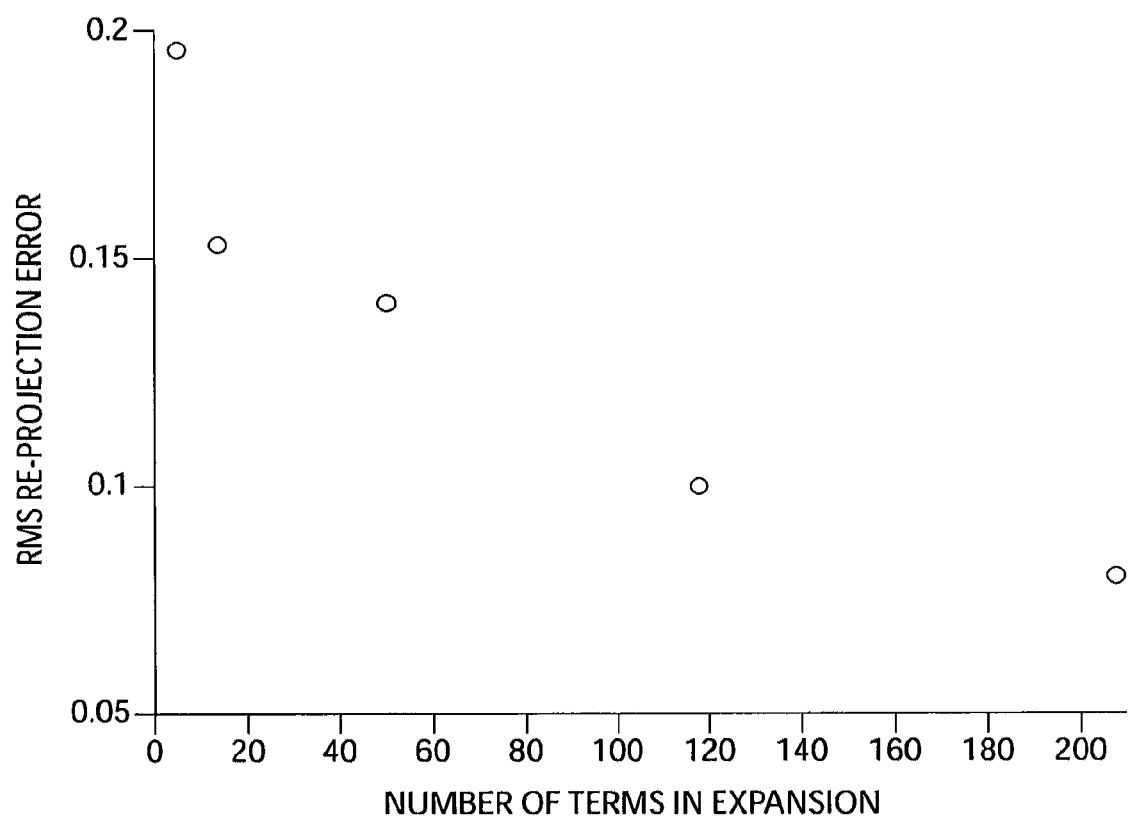
FIG. 48 is a plot showing dependence of the re-projection error on the number of terms used in the wavefront expansion.

Clearly, FIG. 48 shows a diminishing returns effect as the wavefront expansion is carried out to higher and higher terms.

It should be noted that the increased computational cost of the aberration coefficient determination and the risk of the model over-fitting the data both increase as higher and higher order terms are used.

Figure 49A:
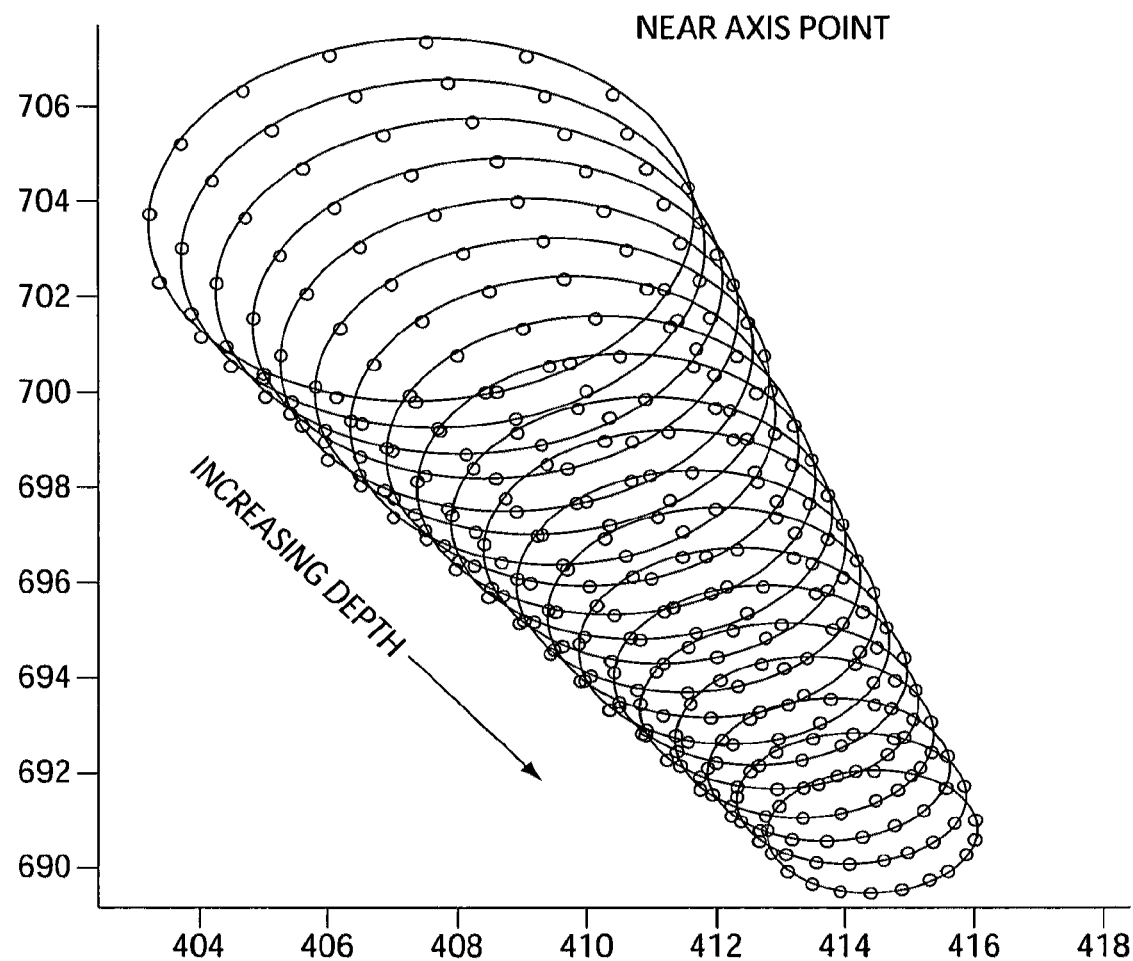
FIG. 49A shows actual and re-projected paths of a near-axis target point.
Figure 49B:
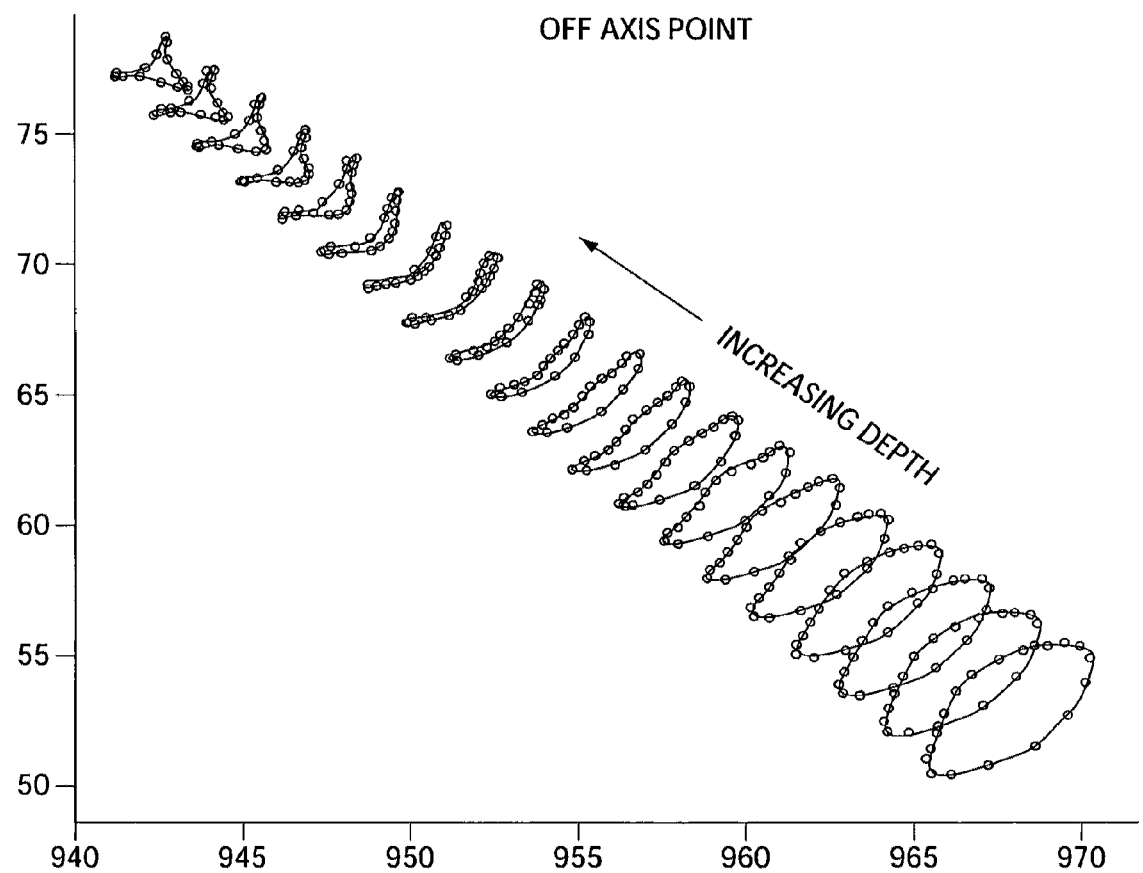
FIG. 49B shows actual and re-projected paths of an off-axis target point.

A comparison of the actual image data with the model's re-projected target positions can be seen in FIG. 49. Here, actual and re-projected image data can be seen both for a target point located near the optical axis, and for a target point located far from the axis. FIG. 49A shows the actual and re-projected paths of a near-axis target point, while the FIG. 49B shows the actual and re-projected paths of an off-axis target point. Eighteen sampling positions on the aperture plane were used, and twenty depth positions on the translation stage were used. All dimensions are in pixels. It can be easily seen how the ideal circular image path is distorted by aberrations, and also how well the wavefront aberration model matches the data.

In the foregoing, the geometrical optical theory behind the calibration model was explained and results showing how well the calculated model could fit the calibration target image data were presented in Figures 4.8 and 4.9. However, one cannot judge the performance of the calibration model only on how well it can fit the raw data that was used to calculate the model's coefficients in the first place. The calculated calibration model may be used to extract quantitative 3D data from images of "new" objects whose 3D information is known but which were not used to calculate the model coefficients. A direct comparison of the calculated and known 3D surface data will shed light on how well the calibration model works in conjunction with the tracking algorithms discussed above. It is also important to note that all the new object data shown was captured more than one month after the images of the calibration plate (used to calculate the aberration coefficients) were captured. The 3D surface data comparisons will therefore also shed light on the robustness of the AWS hardware and its resistance to thermal and mechanical disturbances which can drive the system out of calibration.

The first object with which the calibrated AWS system was tested was a flat aluminum plate. This flat surface was covered with an adhesive sheet of paper on which was printed a black and white speckle pattern. A typical image captured by the system can be seen in FIG. 50. An adhesive sheet with a printed dot pattern was affixed to a machined, flat aluminum plate and images were captured from 36 evenly spaced sampling positions on the circular aperture path. Thirty images were captured along the sampling circle, and the tracking algorithm described above was used along with the calibration model to calculate the 3D depth and position of the interrogation areas. The number of terms used in the wavefront expansion was fifty, since using a larger number or a smaller number of terms resulted in worse 3D surface results. This fact reinforces the idea that using too many terms in the aberration model can lead to over-fitting the data.

Figure 51A:
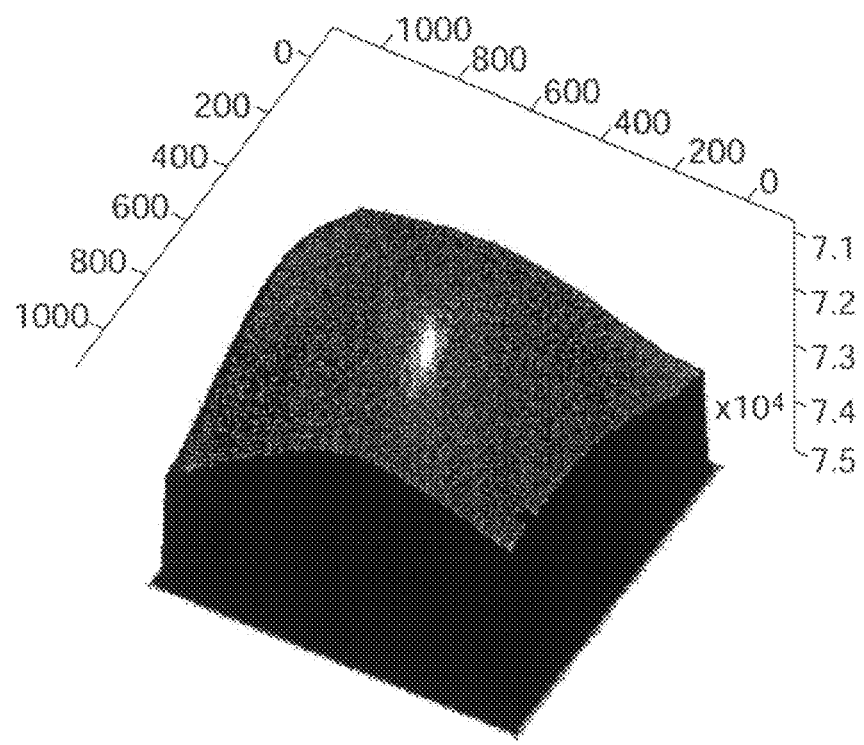
FIG. 51A illustrates a 3D surface model of a flat plate without calibration.
Figure 51B:
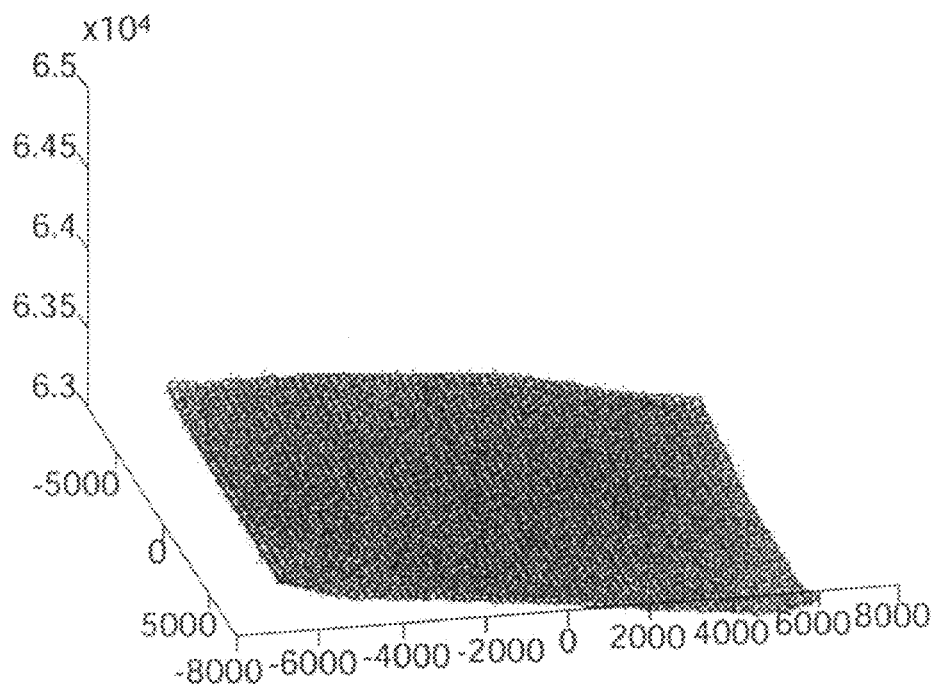
FIG. 51B illustrates a 3D surface model of a flat plate with calibration.

The resulting 3D surface model can also be seen in FIGS. 51A and 51B, where it can be compared to the uncalibrated surface model generated from the same images. The uncalibrated model's deviation from flatness is 1000 pixels (12 mm), while the calibrated model's deviation is approximately 15 pixels (0.18 mm). All dimensions are labeled in pixels, and the calibrated model's z dimension range is actually smaller, magnifying any deviation from flatness as compared to the uncalibrated model. Placing a best fit plane through the calibrated 3D surface and measuring the standard deviation of the distance of the calculated points to this plane resulted in a value of approximately 15 pixels. This corresponds to a distance of 0.18 millimeters, and is significantly improved over the uncalibrated standard deviation value of 12 millimeters.

Figure 52A:
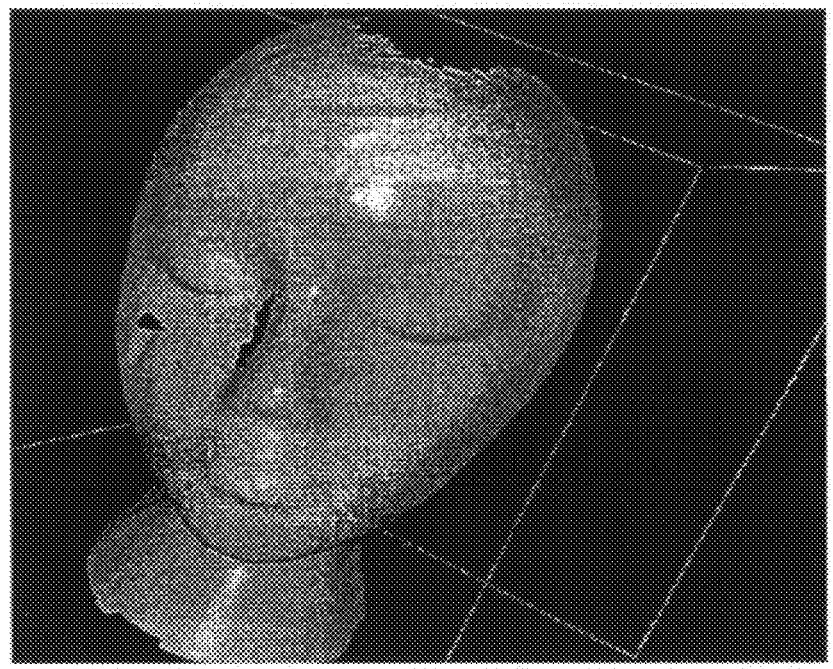
FIG. 52A is a surface model generated by a laser scanner.
Figure 52B:
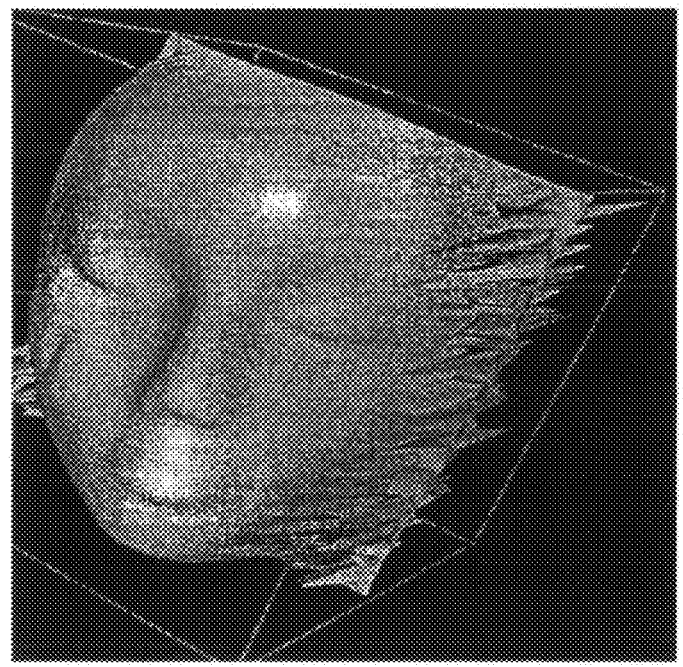
FIG. 52B illustrates a surface model generated by the AWS system.

Much more complicated than the flat plate described above is a human size mannequin head. A ground truth 3D surface model of this target was made using a laser scanner was used to evaluate the accuracy of the calibrated 3D model created by the AWS system. Both the laser scanner and AWS surface models can be seen in FIGS. 52A and 52B, respectively.

Figure 53A:
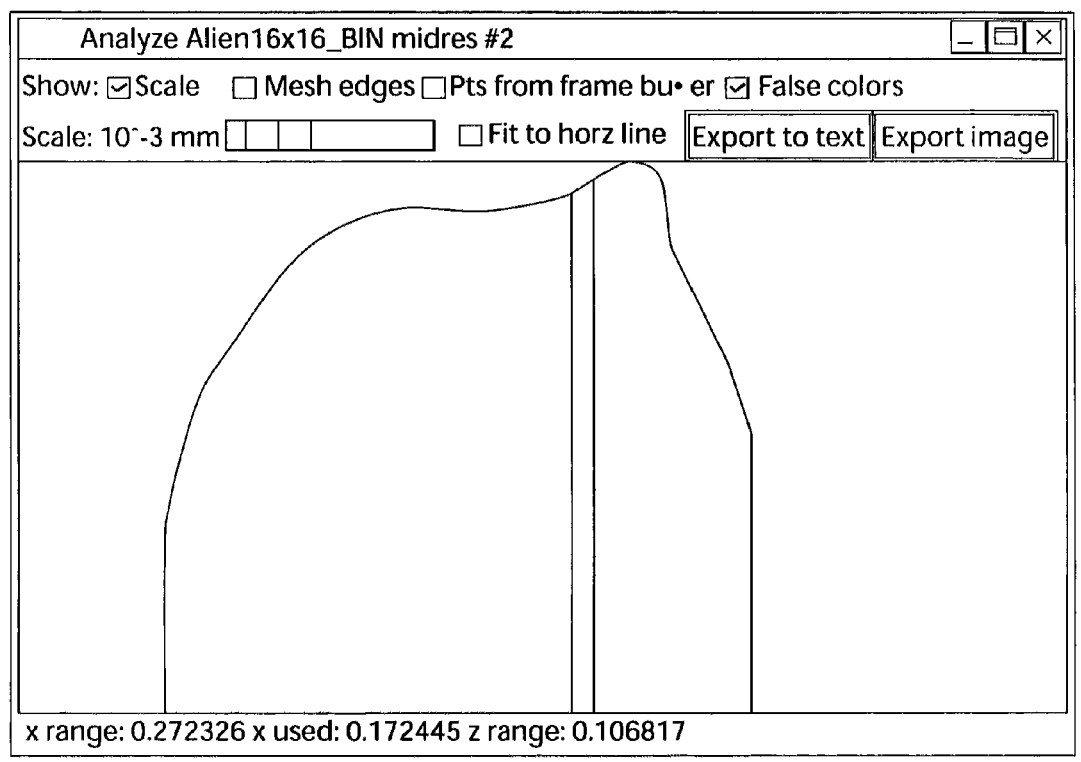
FIG. 53A illustrates a horizontal cross section of a 3D surface model.
Figure 53B:
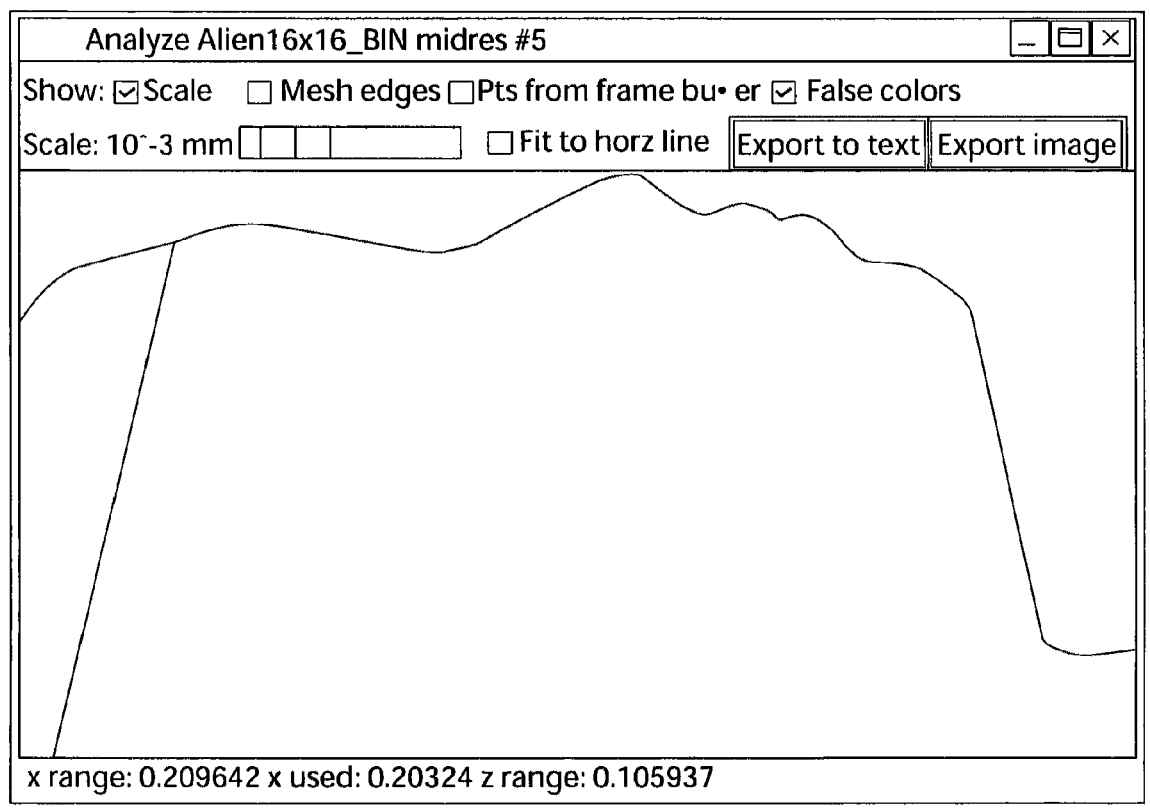
FIG. 53B shows a sagittal cross-section of a 3D surface model.

The AWS model was generated using 30 sampling positions, and a total of 4096 3D data points were calculated. The main difference between the laser scanner model and the AWS model is that the former is a 360 degree surface model, which was generated by rotating the model on a turntable. The AWS model only shows the frontal view of the target. The AWS model also exhibits some noise near the edges, though this could be removed either through pre or post processing relatively easily. The most important difference lies in the spatial resolution of the 3D surface models, which is clearly higher for the laser scanner model on the left. A quantitative comparison of the two models can be made by taking cross sections of the two models and comparing their spatial positions. First, the two models need to be registered to each other, and this can be done using the Iterative Closest Point (ICP) algorithm, and this work used the implementation of this algorithm in the freeware program Scanalyze, developed at the Stanford Computer Graphics Laboratory. Two typical cross-sections showing the registered AWS and laser scanner models can be seen in FIGS. 53A and 53B. FIG. 53A shows a horizontal cross-section while the FIG. 53B shows a sagittal cross-section. The size of the graph grid in both cases is one millimeter. These plots show that for most of the target surface the two models lie within one millimeter of each other. For certain high slope regions, this discrepancy can rise up to approximately two millimeters.

Figure 54A:
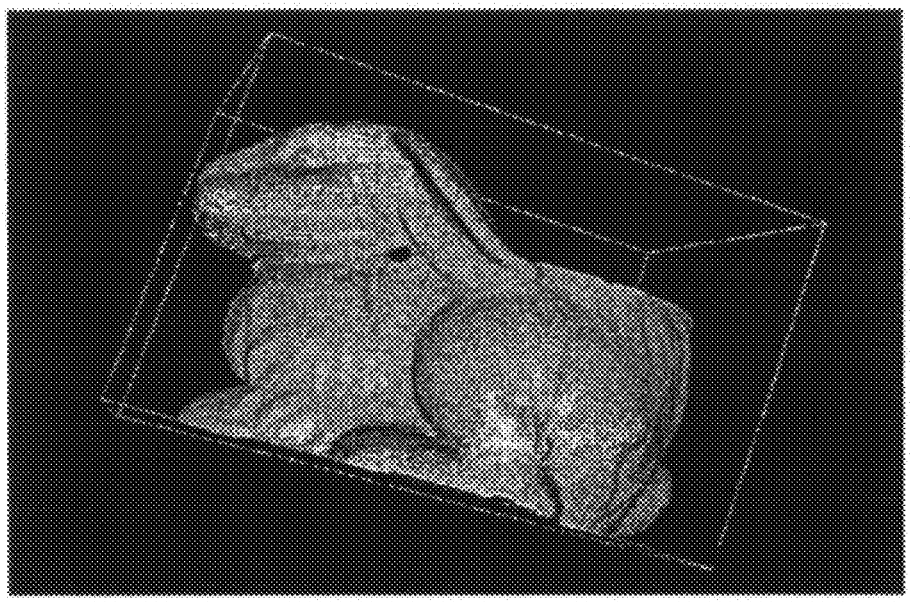
FIG. 54A illustrates a 3D surface model of a bunny rabbit generated by a laser scanner.
Figure 54B:
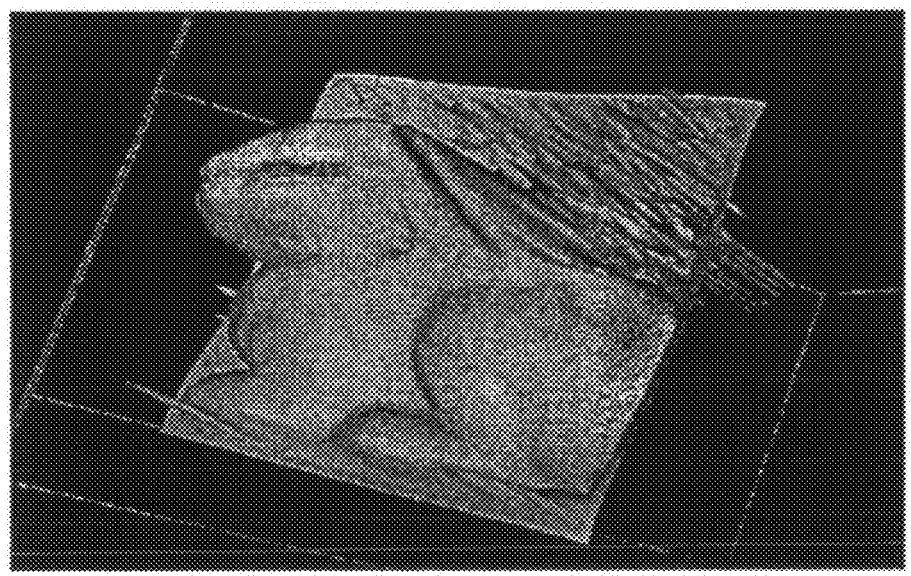
FIG. 54B illustrates a 3D surface model of a bunny rabbit generated by the AWS system.
Figure 55:
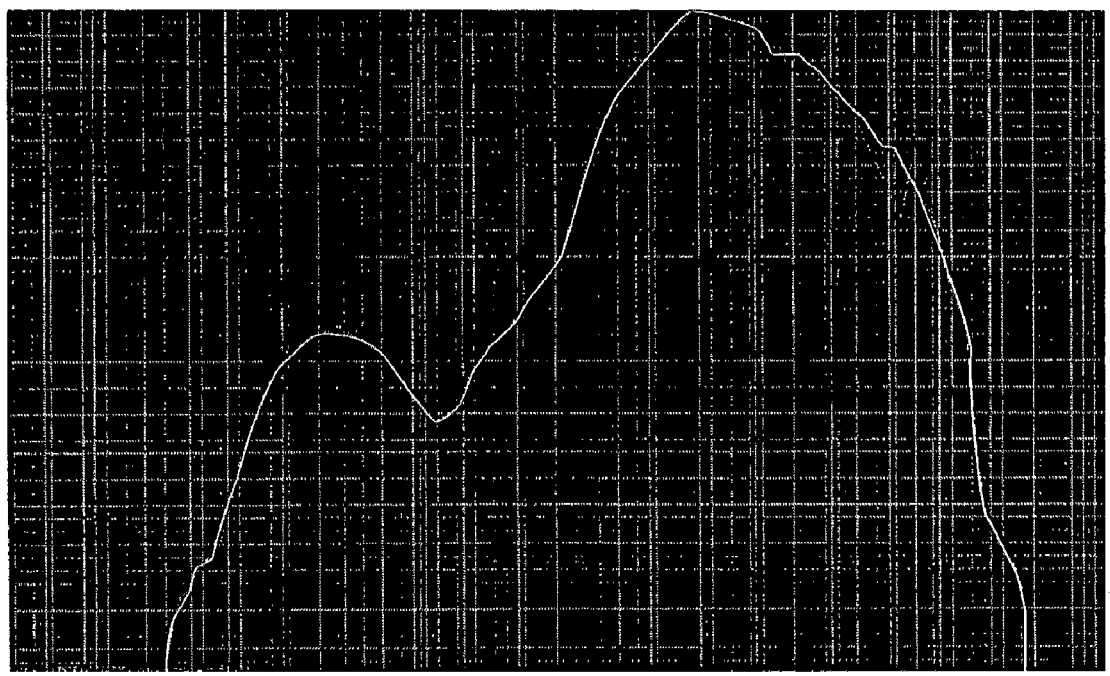
FIG. 55 illustrates cross sections of 3D surface models, comparing performance of a commercial laser scanner and the AWS system.

Scans of a bunny rabbit model (about 20 cm×10 cm×10 cm in dimension) were also taken using both the laser scanner and the AWS system. These scans can be seen in FIGS. 54A and 54B. Clearly, the spatial resolution of the laser scanner is higher than that of the AWS system (4096 3D points in this example), but the latter definitely captures the larger scale features of the target. A depth comparison of the ICP matched surface models is plotted in FIG. 55, where it can be seen that the AWS result again follows the laser scan model within approximately 1-2 millimeters.

Figure 56:
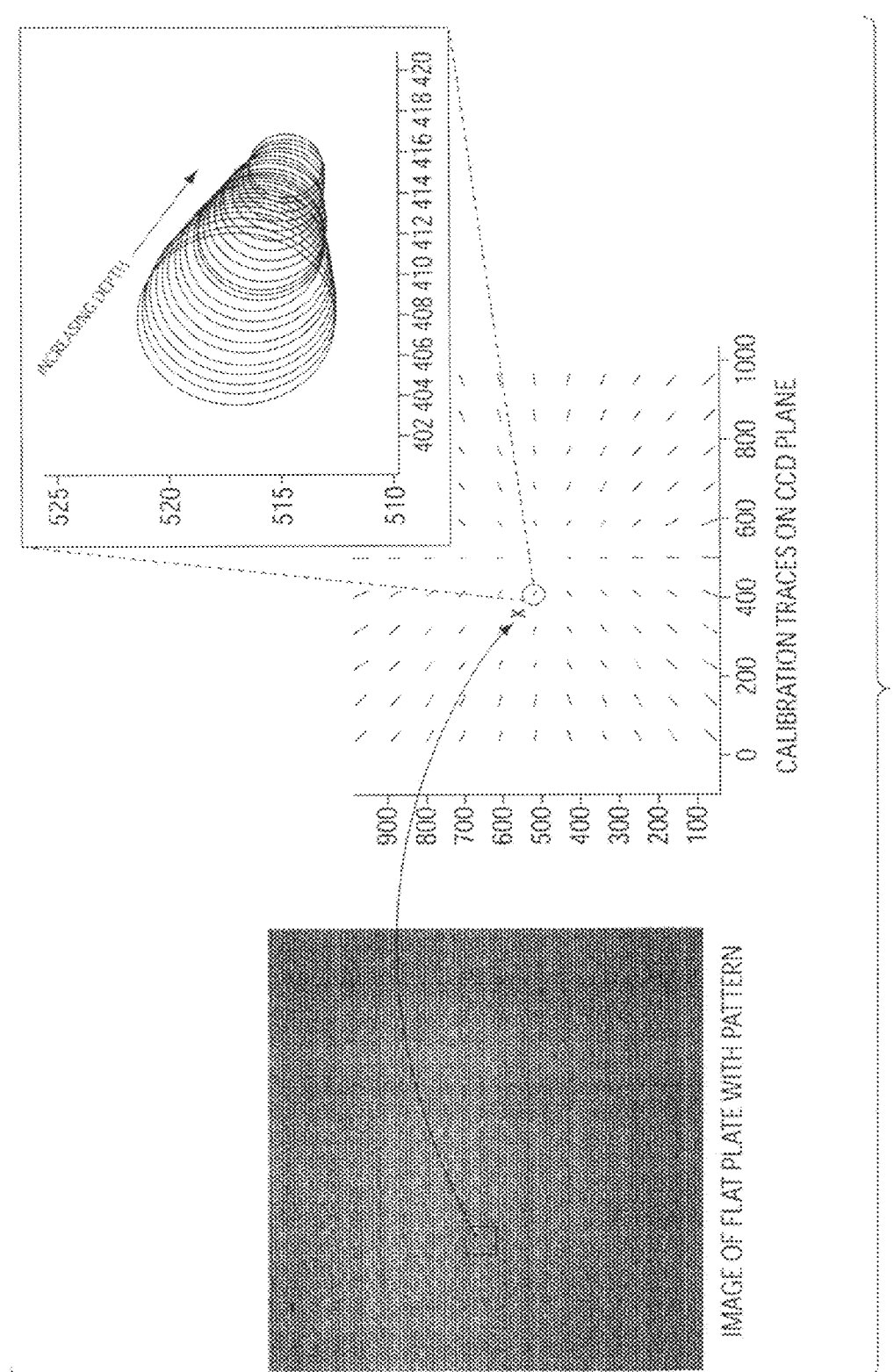
FIG. 56 illustrates a schematic showing an interpolation approach to calibration.

The effort to develop a calibration model such as the one described above can be circumvented by acquiring a large set of known 3D data with the AWS system and using such a database in order to interpolate the world coordinates of a new unknown target point. Using the tracking algorithm developed in the foregoing, and moving the known target plate through the micrometer stage's 50 mm of depth allowed for the generation of a database for the 3D volume defined by the plate and the translation distance. In this database, the world coordinates were known for each of the 11×11 target points, for the motion defined by each image pair in the circular sampling pattern, and for each depth position chosen along the 50 mm micrometer stage translation. The world coordinates of a new incoming target point would then be interpolated along the image X position, Y position, and x and y displacement variables. There is one such interpolation possible for each image pair in the x and the y directions, and the results over all image pairs in the sampling circle can be averaged. This interpolation is shown schematically in FIG. 56. The 3D data collected from the known calibration target is used to perform a linear interpolation in the x position, y position, and x and y displacement variables in order to calculate the depth of an unknown interrogation area. All dimensions are in pixels.

Figure 50:
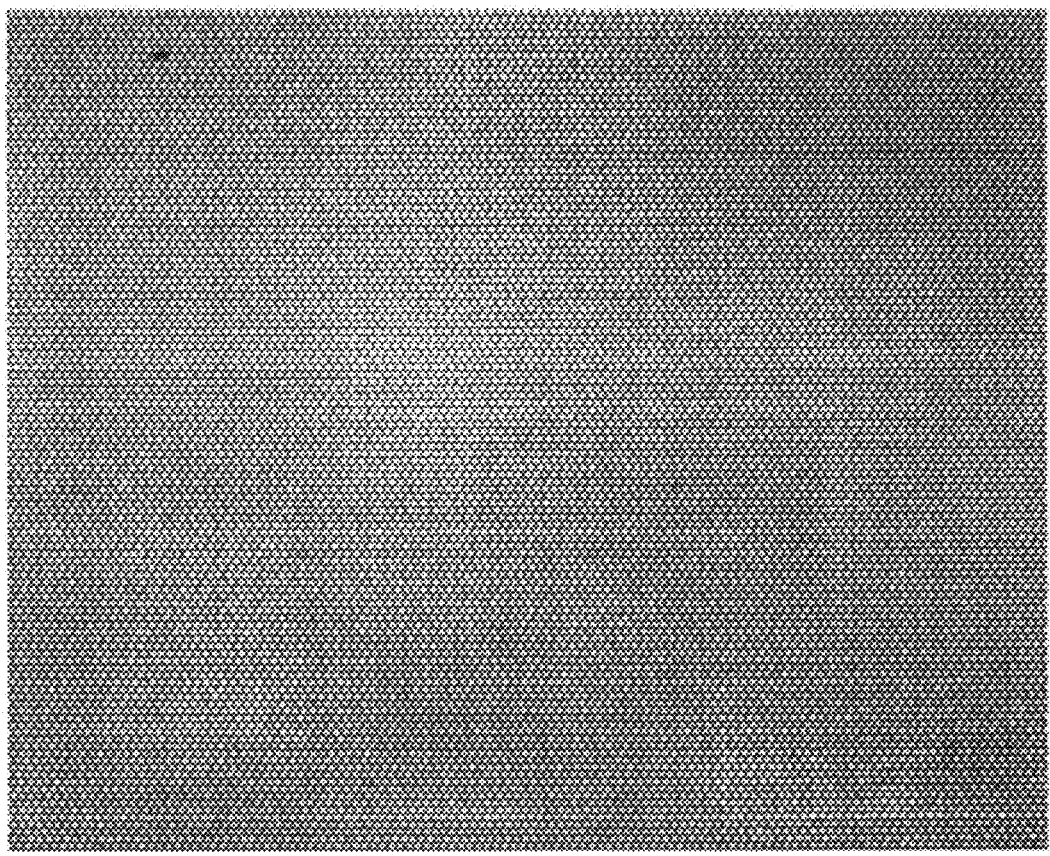
FIG. 50 is an image of a flat plate used for AWS system testing.
Figure 57A:
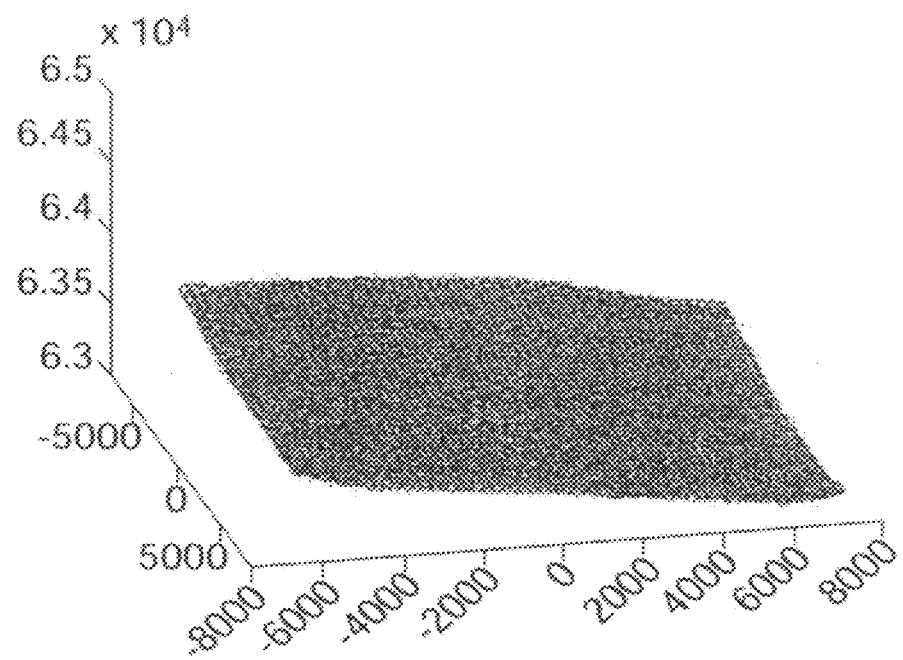
FIG. 57A illustrates a 3D surface model of a flat plate generated using the aberration model.
Figure 57B:
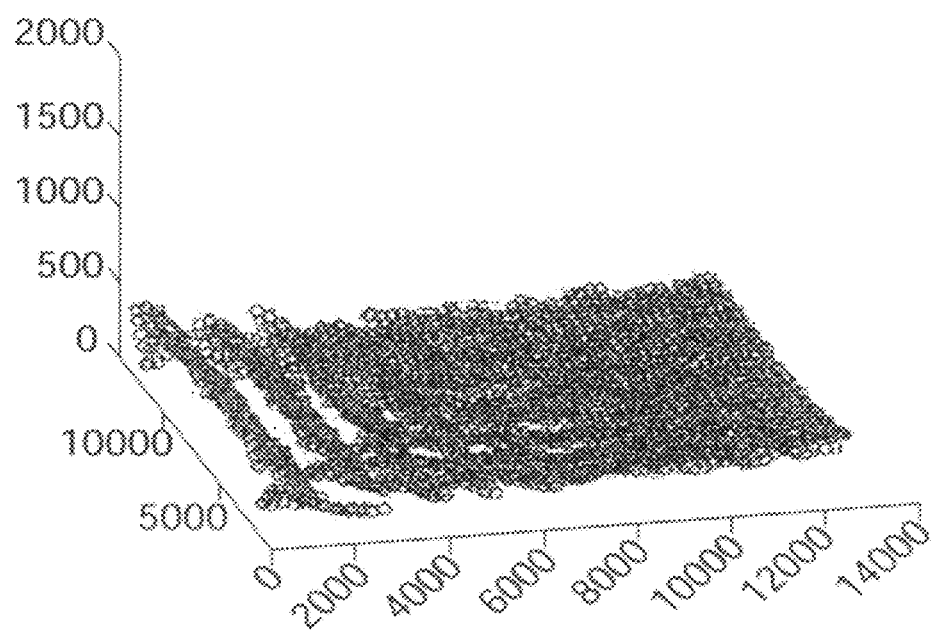
FIG. 57B illustrates a 3D surface model of a flat plate generated using the linear interpolation approach.

Using the same images of a flat plate shown in FIG. 50, the above described method was performed using linear interpolation. The resulting 3D surface data can be seen in FIGS. 57A and 57B, showing a comparison of 3D surface model of a flat plate generated using the aberration model (FIG. 57A) and the linear interpolation approach (FIG. 57B). The standard deviations from flatness are approximately 15 pixels and 60 pixels, respectively. All dimensions are in pixels. The absolute depth value differs between the two models due to the fact that the interpolation approach measures a target's position relative to the calibration volume, while the aberration model approach measures a target's distance relative to the camera. The quality of the interpolation based surface model can be seen to be worse than the aberration model generated data, and the standard deviation from flatness of the former is more than four times greater than the latter.

An explanation for this difference in performance can be found by examining the nature of the wavefront as described by the calculated aberration model itself. Both the expected x and y displacements of a given image pair in the circular sampling pattern can be synthetically examined using the calculated aberration model. In order to check the feasibility of using linear interpolation to calculate depth, the expected x and y displacements can be plotted as a function of the interrogation area's x position on the image plane.

Figure 58A:
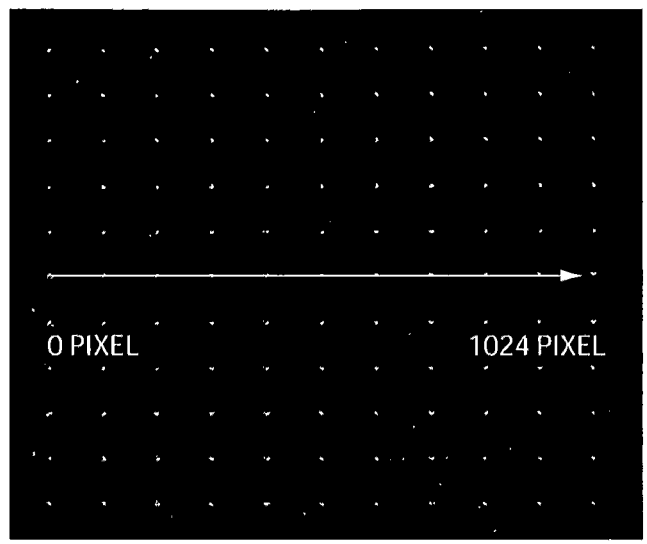
FIG. 58A shows interrogation area's X position along a line located half way down the image.
Figure 58B:
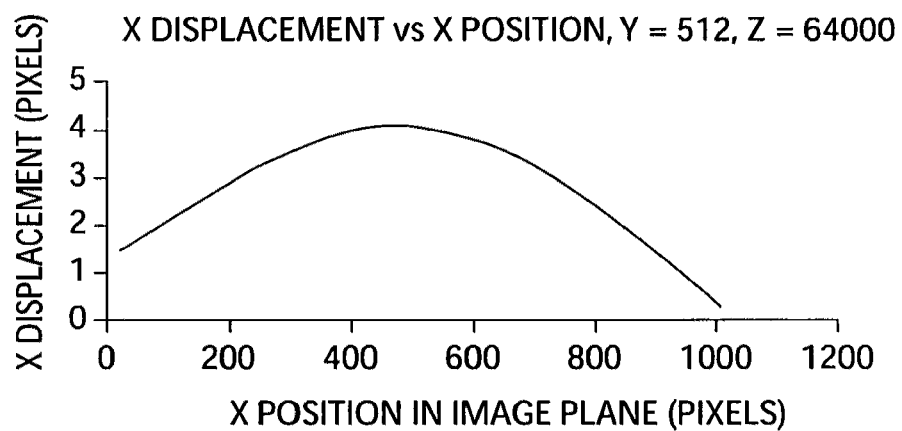
FIG. 58B illustrates predicted X displacement (top and bottom, respectively) for the interrogation area in FIG. 58A.
Figure 58C:
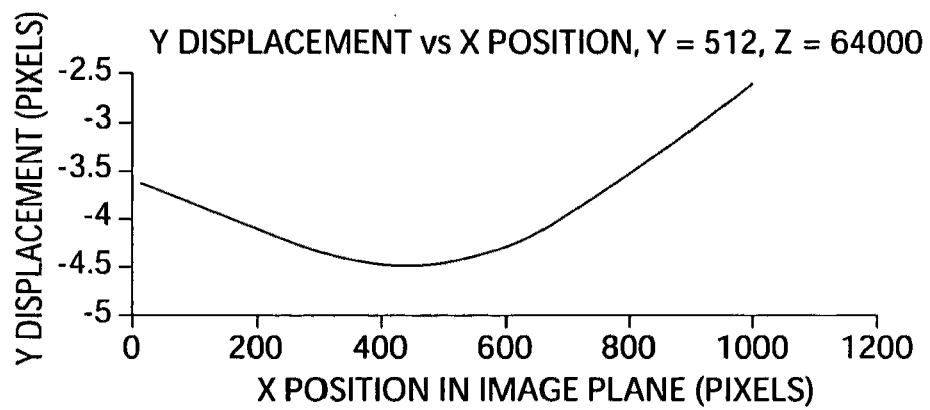
FIG. 58C illustrates predicted Y displacement for the interrogation area in FIG. 58A.

The results of these calculations are shown in FIGS. 58A, 58B and 58C. This figure shows that for interrogation areas imaged onto a horizontal line located halfway down the image vertically, both the expected x and y displacements behave in a decidedly non-linear way. An even more obvious non-linear behavior can be seen if the expected x and y displacements of interrogation areas located on a line located at the bottom of the image are examined, as shown in FIGS. 58A, 58B and 58C, which illustrates predicted X and Y displacement (FIG. 58B and FIG. 58A, respectively) for an interrogation area, as a function of the interrogation area's X position along a line located half way down the image (as shown in FIG. 58A). All measurements are in pixels. This increased non-linear behavior can be explained by the increasing impact of the aberration terms in the wavefront equation as $x_o$ and $y_o$ increase (equations 4.11 and 4.12).

Figure 59A:
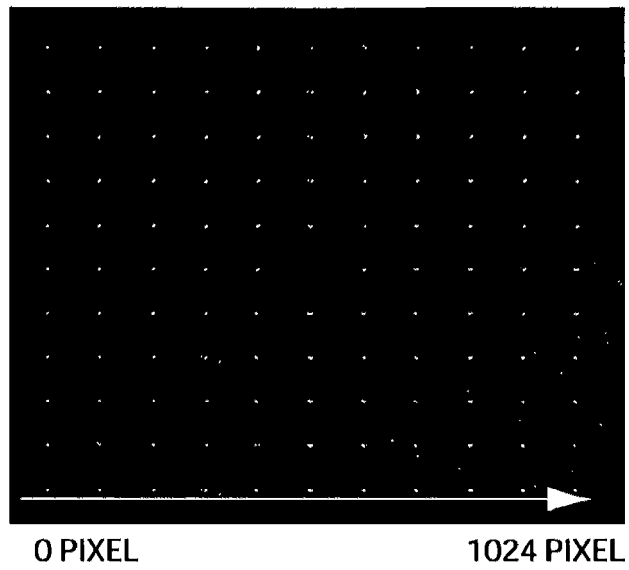
FIG. 59A shows interrogation area's X position along a line located half at the bottom of the image.
Figure 59B:
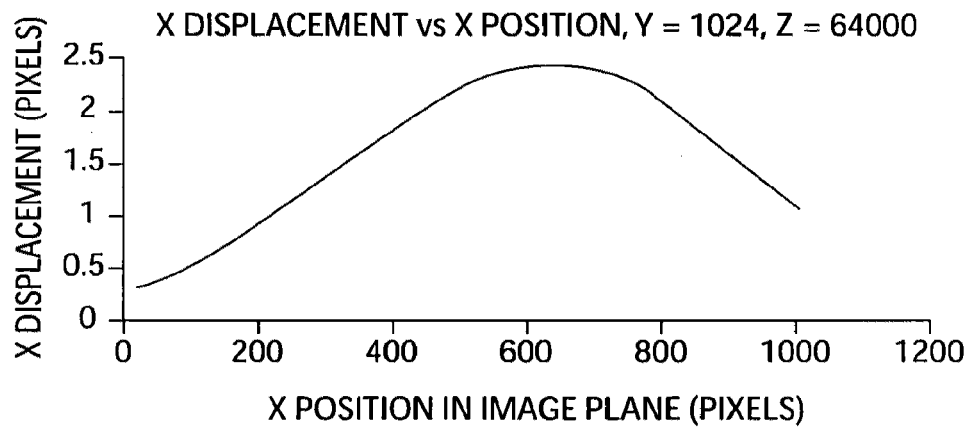
FIG. 59B illustrates predicted X displacement (top and bottom, respectively) for the interrogation area in FIG. 59A.
Figure 59C:
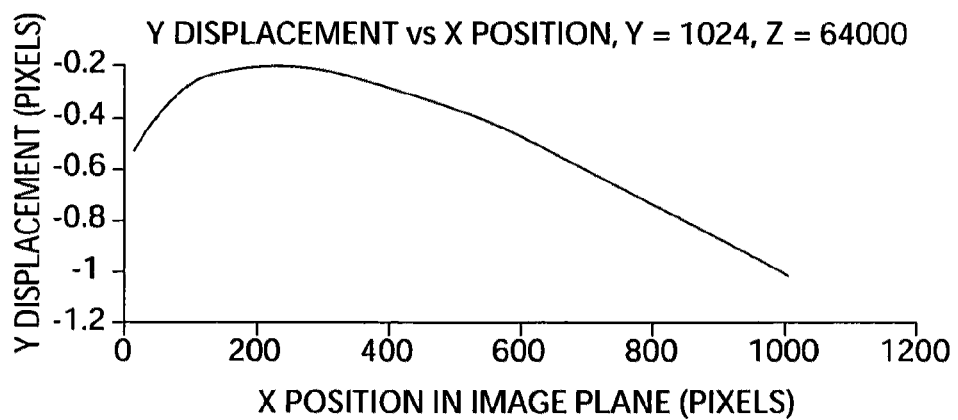
FIG. 59C illustrates predicted Y displacement for the interrogation area in FIG. 59A.

The calculations used to generate FIGS. 58 and 59 show that the spacing between known target points must be small. If the spacing is too large, the piecewise linear interpolation between points will not be a good estimate of the underlying function and 3D surface errors will result. Since the distance between the images of the aluminum target plate points is about 100 pixels on the image plane, the spatial interpolation is too coarse for the non-linearity of the wavefront and the poor 3D surface model shown in FIGS. 57A and 57B is the inevitable result.

The interpolation approach could be made to be much more accurate by increasing the density of the known target points. This increased density would allow the piece-wise linear approximation to approximate the function more closely. This increased density could only be achieved with a more complex and costly calibration target, however.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, it should be appreciated that one embodiment of the invention is directed to a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. The invention is capable of other embodiments and of being practiced or of being carried out in various ways. In particular, various aspects of the present invention may be implemented in connection with any type, collection or configuration networks. No limitations are placed on the network implementation. Accordingly, the foregoing description and drawings are by way of example only.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

What is claimed is:

1. A method of determining motion of at least one feature present in a plurality of images of a scene, the plurality of images captured by a single camera, each of the plurality of images resulting from light passing through an aperture positioned at a different location for each of the plurality of images, the method comprising:
   determining the motion, in integer pixel units using a first tracking algorithm, of the at least one feature between a first image of the plurality of images and a second image of the plurality of images to obtain an integer pixel measurement of the motion;
   determining the motion, in sub-pixel units using a second tracking algorithm and the integer pixel measurement of the motion, between the at least one feature in the first image and the second image to obtain a sub-pixel measurement, wherein the second tracking algorithm comprises a gradient optical flow method; and
   combining the integer pixel measurement and the sub-pixel measurement to form, at least in part, an estimate of the motion of the at least one feature.

2. The method of claim 1, wherein the first tracking algorithm includes sparse image array correlation.

3. The method of claim 1, wherein the aperture is a rotating aperture capable of being rotated to at least a first position corresponding to the first image and a second position corresponding to the second image, and wherein determining the motion includes determining a diameter of rotation of the at least one feature between the first image and the second image.

4. The method of claim 1, wherein the gradient optical flow method comprises a linear bias compensation technique.

5. The method of claim 1, wherein the gradient optical flow method comprises an illumination compensation technique.

6. The method of claim 1, wherein the integer pixel measurement includes a vector distance in the X and Y directions.

7. The method of claim 6, wherein the sub-pixel measurement includes a vector distance in the X and Y directions.

8. A system for determining motion of at least one feature present in a plurality of images of a scene, the plurality of images captured by a single camera, each of the plurality of images resulting from light passing through an aperture positioned at a different location for each of the plurality of images, the system comprising:
   at least one computer readable medium for storing at least a portion of a first image of the plurality of images and at least a portion of a second image of the plurality of images; and
   at least one processor capable of accessing the at least one computer readable medium and configured to:
      determine the motion, in integer pixel units using a first tracking algorithm, of the at least one feature between the first image and the second image to obtain an integer pixel measurement of the motion;
      determine the motion, in sub-pixel units using a second tracking algorithm and the integer pixel measurement of the motion, between the at least one feature in the first image and the second image to obtain a sub-pixel measurement, wherein the second tracking algorithm comprises a gradient optical flow method; and
      combine the integer pixel measurement and the sub-pixel measurement to form, at least in part, an estimate of the motion of the at least one feature.

9. The system of claim 8, wherein the first tracking algorithm includes sparse image array correlation.

10. The system of claim 8, wherein the integer pixel measurement includes a vector distance in the X and Y directions.

11. The system of claim 10, wherein the sub-pixel measurement includes a vector distance in the X and Y directions.

12. The system of claim 8, wherein the aperture is a rotating aperture capable of being rotated to at least a first position corresponding to the first image and a second position corresponding to the second image, and wherein determining the motion includes determining a diameter of rotation of the at least one feature between the first image and the second image.

13. The system of claim 8, wherein the gradient optical flow method comprises a linear bias compensation technique.

14. The system of claim 8, wherein the gradient optical flow method comprises an illumination compensation technique.

15. At least one non-transitory computer readable medium storing processor-executable instructions that, when executed by at least one processor, cause the at least one processor to perform a method for determining motion of at least one feature present in a plurality of images of a scene, the plurality of images captured by a single camera, each of the plurality of images resulting from light passing through an aperture positioned at a different location for each of the plurality of images, the method comprising: determining the motion, in integer pixel units using a first tracking algorithm, of the at least one feature between a first image of the plurality of images and a second image of the plurality of images to obtain an integer pixel measurement of the motion; determining the motion, in sub-pixel units using a second tracking algorithm and the integer pixel measurement of the motion, between the at least one feature in the first image and the second image to obtain a sub-pixel measurement, wherein the second tracking algorithm comprises a gradient optical flow method; and combining the integer pixel measurement and the sub-pixel measurement to form, at least in part, an estimate of the motion of the at least one feature.

16. The at least one computer readable medium of claim 15, wherein the first tracking algorithm includes sparse image array correlation.

17. The at least one computer readable medium of claim 15, wherein the aperture is a rotating aperture capable of being rotated to at least a first position corresponding to the first image and a second position corresponding to the second image, and wherein determining the motion includes determining a diameter of rotation of the at least one feature between the first image and the second image.

18. The at least one computer readable medium of claim 15, wherein the gradient optical flow method comprises an illumination compensation technique.

19. The at least one computer readable medium of claim 15, wherein the integer pixel measurement includes a vector distance in the X and Y directions.

20. The at least one computer readable medium of claim 19, wherein the sub-pixel measurement includes a vector distance in the X and Y directions.

* * * * *